United States Patent
Kim et al.

(10) Patent No.: US 11,469,862 B2
(45) Date of Patent: Oct. 11, 2022

(54) APPARATUS AND BUFFER CONTROL METHOD THEREOF IN WIRELESS COMMUNICATION SYSTEM

(71) Applicant: Samsung Electronics Co., Ltd., Suwon-si (KR)

(72) Inventors: Donggun Kim, Seoul (KR); Soenghun Kim, Suwon-si (KR); Jaehyuk Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/530,573

(22) Filed: Aug. 2, 2019

(65) Prior Publication Data
US 2019/0356429 A1   Nov. 21, 2019

Related U.S. Application Data

(63) Continuation of application No. 15/942,972, filed on Apr. 2, 2018.

(30) Foreign Application Priority Data

Mar. 31, 2017 (KR) .......................... 10-2017-0041702
May 11, 2017 (KR) .......................... 10-2017-0058498

(51) Int. Cl.
*H04L 49/9057* (2022.01)
*H04L 1/18* (2006.01)
(Continued)

(52) U.S. Cl.
CPC ............ *H04L 1/1874* (2013.01); *H04L 1/188* (2013.01); *H04L 47/11* (2013.01); *H04L 47/30* (2013.01);
(Continued)

(58) Field of Classification Search
CPC ....... H04L 1/1874; H04L 1/188; H04L 47/11; H04L 47/30; H04L 49/9015;
(Continued)

(56) References Cited

U.S. PATENT DOCUMENTS 7,539,197 B2   5/2009 Lee et al.
7,724,640 B2   5/2010 Larsson
(Continued)

FOREIGN PATENT DOCUMENTS

CN   101431700 A   5/2009
CN   101448249 A   6/2009
(Continued)

OTHER PUBLICATIONS

ZTE et al., 'Consideration on the RLC without concatenation', R2-1700156, 3GPP TSG-RAN WG2 NR Ad Hoc, Spokane, USA, Jan. 7, 2017.
(Continued)

*Primary Examiner* — Hanh N Nguyen
(74) *Attorney, Agent, or Firm* — Jefferson IP Law, LLP

(57) ABSTRACT

A 5G communication system or pre-5G communication system for supporting a higher data rate than that of a beyond 4G communication system such as an LTE is provided. A method by an apparatus for controlling buffers in a wireless communication system comprises storing information related to a packet in at least one of a first buffer or a second buffer, transmitting data generated based on the packet, and, when an acknowledgement signal is received for the data, discarding the information.

10 Claims, 31 Drawing Sheets

(51) Int. Cl.
  *H04L 47/30* (2022.01)
  *H04L 47/11* (2022.01)
  *H04L 49/9047* (2022.01)
  *H04L 49/9015* (2022.01)
  *H04W 80/02* (2009.01)

(52) U.S. Cl.
  CPC ...... *H04L 49/9015* (2013.01); *H04L 49/9047* (2013.01); *H04L 49/9057* (2013.01); *H04W 80/02* (2013.01)

(58) Field of Classification Search
  CPC . H04L 49/9047; H04L 49/9057; H04L 47/28; H04L 49/90; H04L 47/34; H04W 12/033; H04W 28/0268; H04W 28/06; H04W 28/065
  See application file for complete search history.

(56) References Cited

U.S. PATENT DOCUMENTS

| | | | |
|---|---|---|---|
| 7,787,377 | B2 | 8/2010 | Hannu et al. |
| 8,000,348 | B2* | 8/2011 | Otonari ................... H04L 49/90 370/474 |
| 8,300,663 | B2 | 10/2012 | Chion et al. |
| 8,625,503 | B2* | 1/2014 | Chun ................ H04W 28/0268 370/329 |
| 8,724,587 | B2 | 5/2014 | Wang et al. |
| 8,869,002 | B2* | 10/2014 | Kikuchi ................ H04L 69/324 714/48 |
| 9,072,015 | B2* | 6/2015 | Cho ....................... H04W 76/27 |
| 9,781,630 | B2* | 10/2017 | Yi ........................ H04W 28/065 |
| 9,838,282 | B2 | 12/2017 | Dudda et al. |
| 9,954,789 | B2* | 4/2018 | Basu Mallick ......... H04L 47/32 |
| 2003/0152094 | A1 | 8/2003 | Colavito et al. |
| 2005/0213605 | A1* | 9/2005 | Kim ..................... H04W 28/06 370/310 |
| 2008/0130619 | A1 | 6/2008 | Cha et al. |
| 2008/0226074 | A1* | 9/2008 | Sammour ........... H04W 12/033 380/270 |
| 2009/0010278 | A1* | 1/2009 | Torsner ................. H04L 1/0007 370/466 |
| 2009/0318152 | A1 | 12/2009 | Maheshwari |
| 2010/0312846 | A1 | 12/2010 | Lu et al. |
| 2011/0188377 | A1 | 8/2011 | Kim et al. |
| 2012/0219018 | A1 | 8/2012 | Shi |
| 2012/0287790 | A1 | 11/2012 | Huang et al. |
| 2014/0341013 | A1 | 11/2014 | Kumar et al. |
| 2016/0308776 | A1* | 10/2016 | Ozturk .................. H04L 47/365 |
| 2016/0352643 | A1* | 12/2016 | Xiao ....................... H04L 47/28 |
| 2017/0085492 | A1 | 3/2017 | Xiao et al. |
| 2018/0205662 | A1 | 7/2018 | Kim et al. |
| 2018/0295644 | A1 | 10/2018 | Yi et al. |
| 2020/0213242 | A1* | 7/2020 | Zheng .................... H04L 47/34 |

FOREIGN PATENT DOCUMENTS

| | | |
|---|---|---|
| CN | 101631353 A | 1/2010 |
| CN | 101699898 A | 4/2010 |
| CN | 101729524 A | 6/2010 |
| CN | 102790998 A | 11/2012 |
| KR | 10-2003-0046006 A | 6/2003 |
| KR | 10-2007-0096921 A | 10/2007 |
| WO | 2015/008966 A1 | 1/2015 |
| WO | 2015/116866 A1 | 8/2015 |
| WO | 2018/131990 A1 | 7/2018 |

OTHER PUBLICATIONS

Sequans Communications, 'RLC AM operation for NR', R2-1703635, 3GPP TSG-RAN WG2 #97bis, Spokane, USA, Mar. 25, 2017.
Huawei: "Correction to PDCP discard", 3GPP Draft; R2-084049 Corretion to PDCP Discard, 3rd Generation Partnership Project (3GPP), Mobile Competence Centre; 650, Route Des Lucioles ; F-06921 Sophia-Antipolis Cedex ; France, No. Jeju; Aug. 12, 2008, Aug. 12, 2008 (Aug. 12, 2008), XP050319209, [retrieved on Aug. 12, 2008].
Samsung, "T-reordering in NR RLC UM", 3GPP Draft, R2-1703579, T-Reoroering in NR RLC UM, 3rd Generation Partnership Project (3GPP), Mobile Competence Centre: 650, Route Des Lucioles F-06921, Sophia-Antipolis Cedex, France, 3GPP TSG-RAN WG2 Meeting #97bis, Spokane, USA, Apr. 3-7, 2017, Mar. 25, 2017, XP051254516, Retrieved from the Internet: URL: http://www.3gpp.orglftp/tsg_ran/WG2_RL2/TSGR2_97bis/Oocs/.
Extended European Search Report dated Jun. 26, 2019, issued in European Patent Application No. 19171401.3.
European Office Action dated Oct. 22, 2020, issued in European Application No. 19171401.3-1215.
European Office Action dated Sep. 23, 2021, issued in European Application No. 19171401.3-1215.
Ericsson, "Sending small amounts of data via WLAN while UL is configured to LTE", R2-1701620, 3GPP TSG-RAN WG2 Meeting #97, Athens, Greece, Feb. 4, 2017.
Chinese Office Action dated Aug. 29, 2022, issued in Chinese Patent Application No. 201880023557.3.

\* cited by examiner

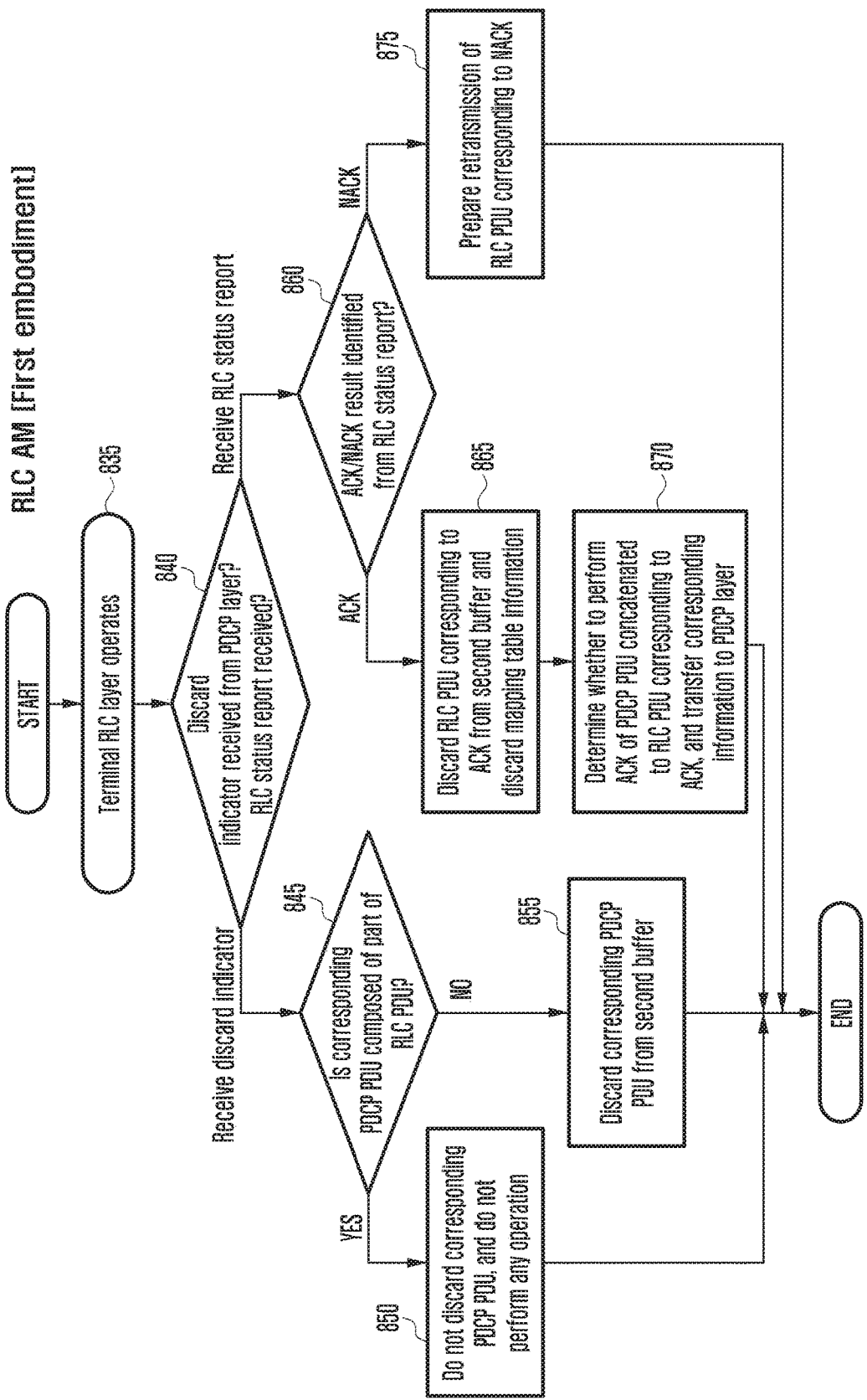

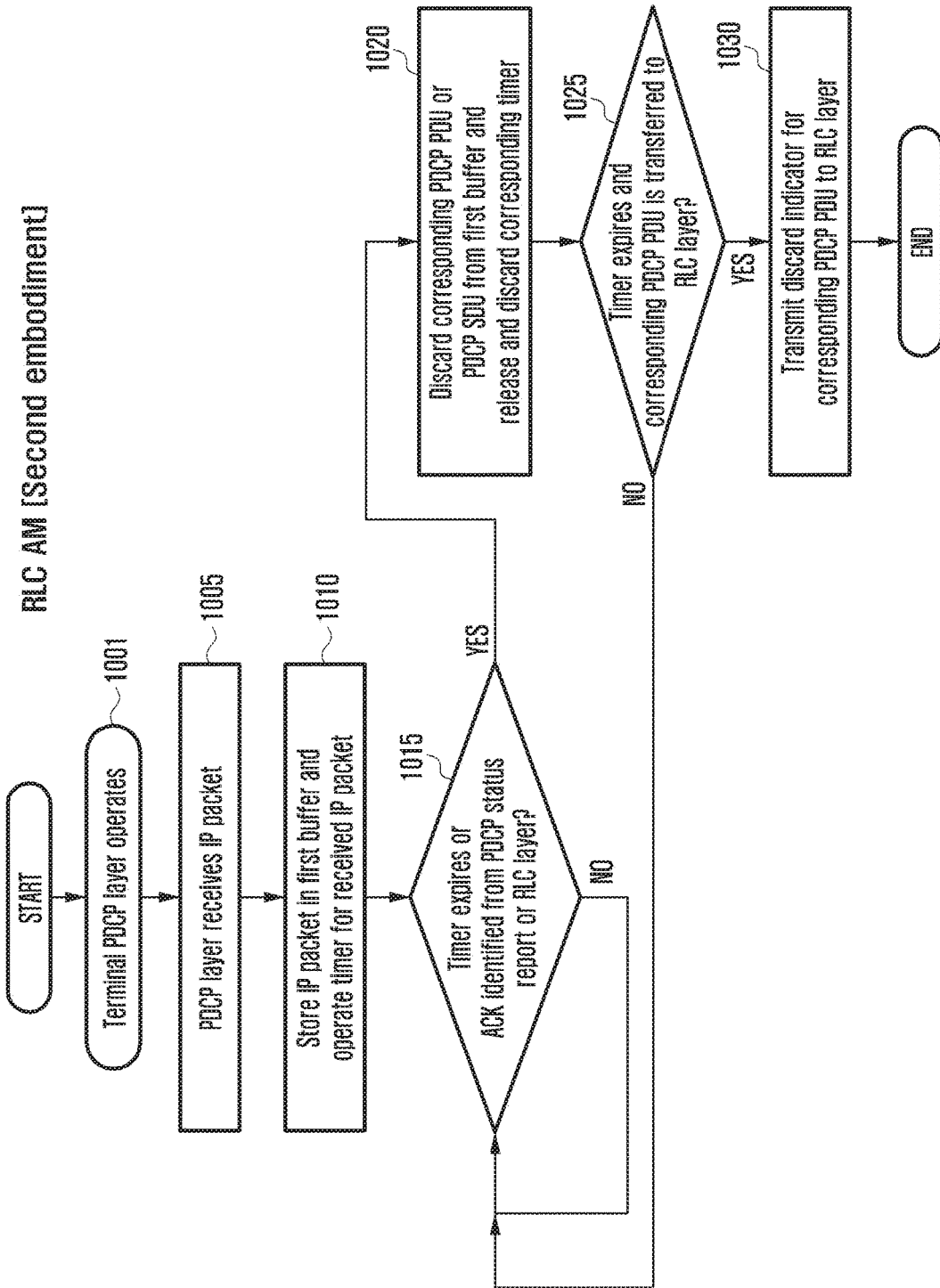

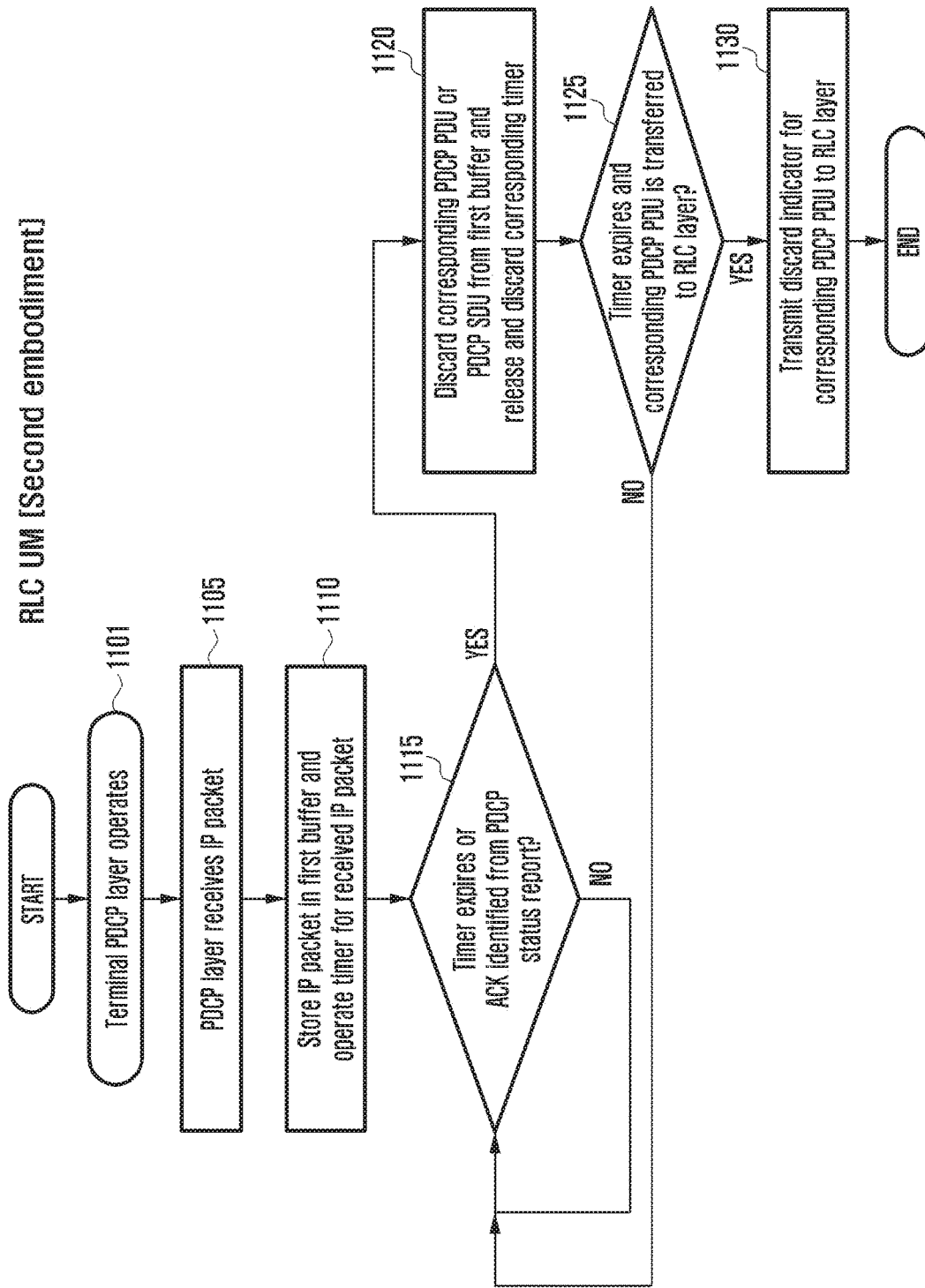

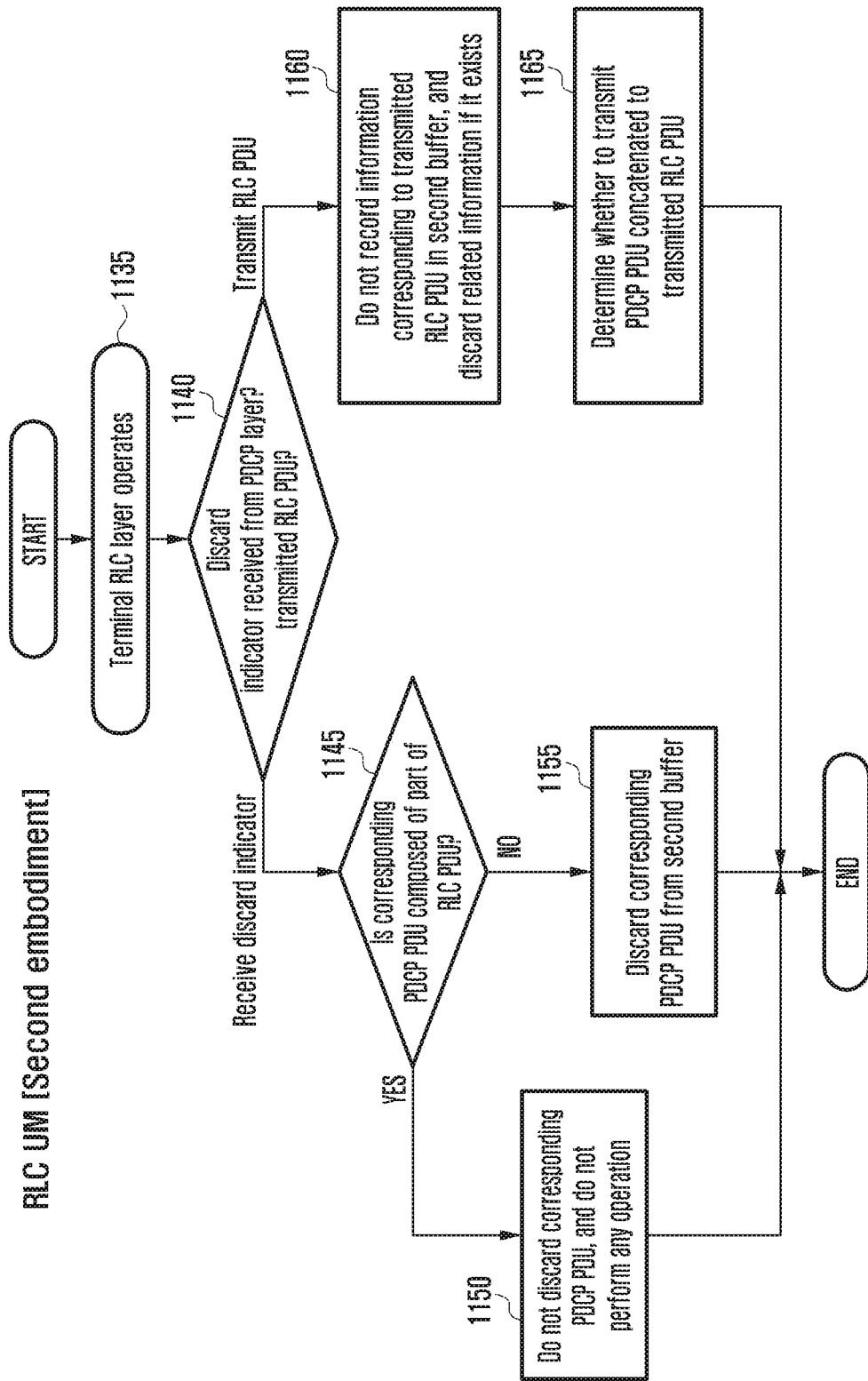

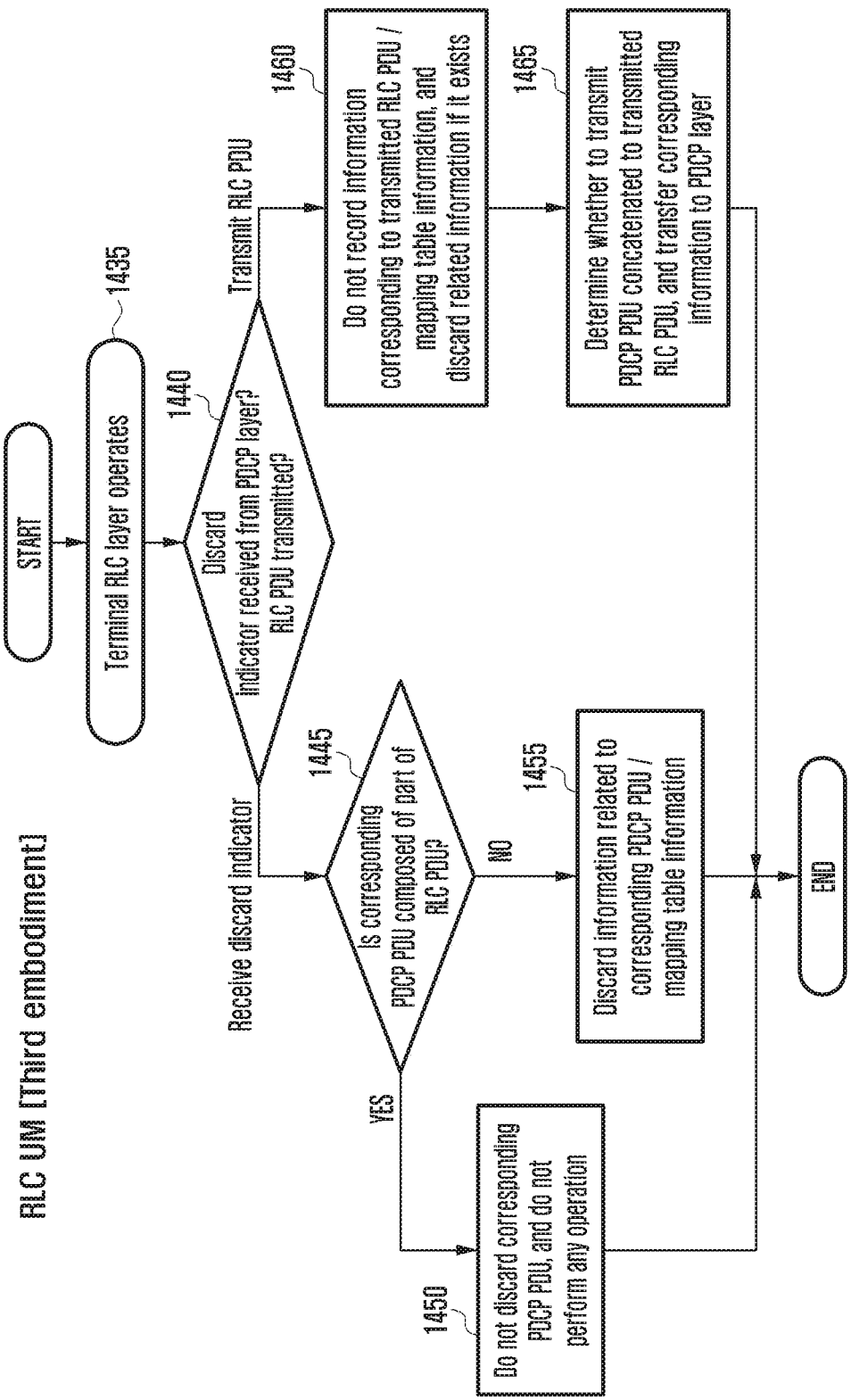

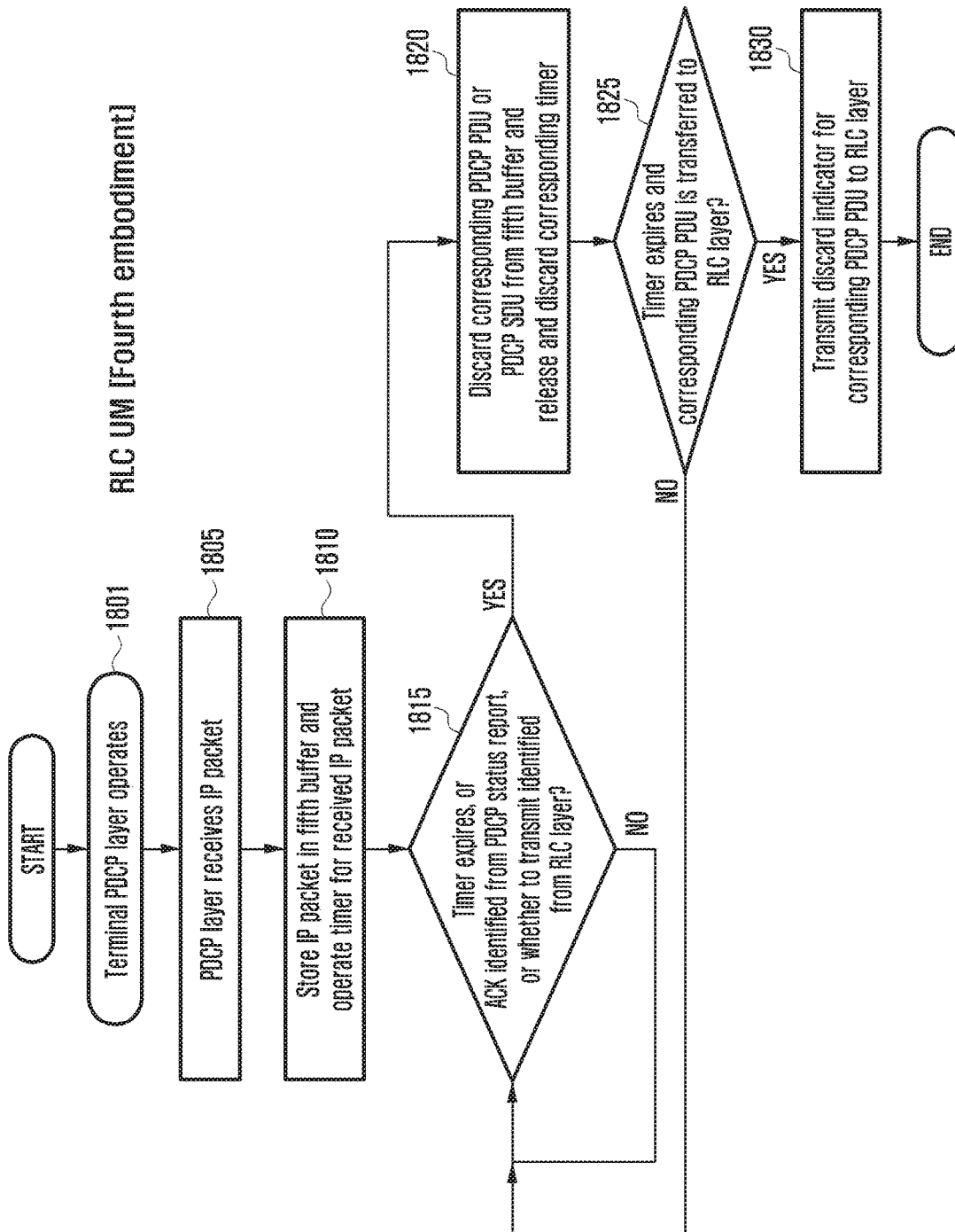

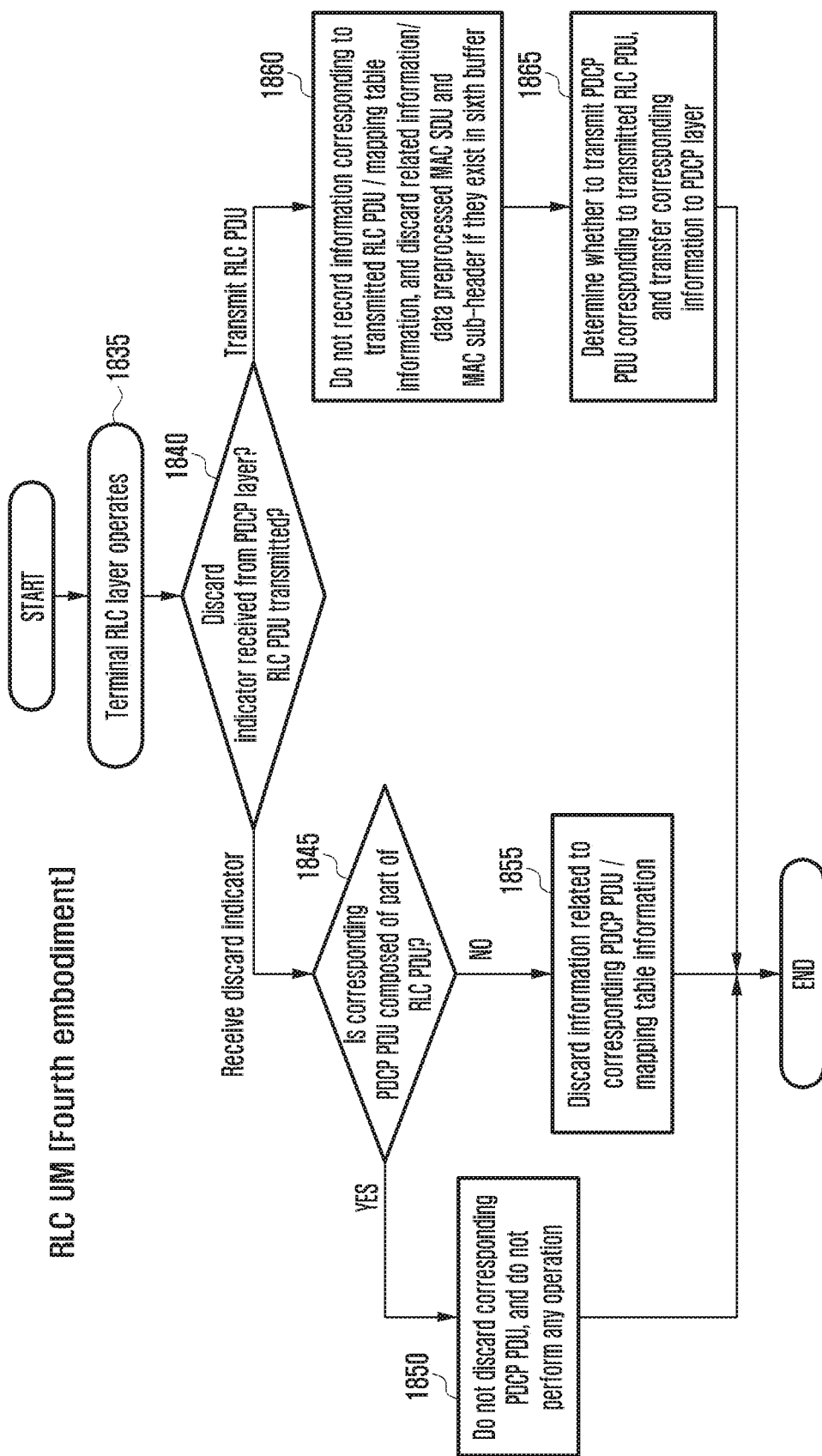

APPARATUS AND BUFFER CONTROL METHOD THEREOF IN WIRELESS COMMUNICATION SYSTEM

CROSS-REFERENCE TO RELATED APPLICATION(S)

This application is a continuation application of prior application Ser. No. 15/942,972, filed on Apr. 2, 2018, which was based on and claimed priority under 35 U.S.C § 119(a) of a Korean patent application number 10-2017-0041702, filed on Mar. 31, 2017, in the Korean Intellectual Property Office, and a Korean patent application number 10-2017-0058498, filed on May 11, 2017, in the Korean Intellectual Property Office, the disclosure of each of which is incorporated by reference herein in its entirety.

TECHNICAL FIELD

The disclosure relates to operations of a terminal and a base station in a next-generation mobile communication system. More particularly, the disclosure relates to a method for a terminal and a base station to efficiently manage a buffer, and a method and an apparatus capable of accelerating retransmission during the retransmission.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'.

The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. On the other hand, in the next-generation mobile communication system, there is a need for a method for a base station to efficiently manage a buffer and a method capable of accelerating retransmission.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for efficiently managing a buffer and implementation methods thereof in different buffer structures. Further, the disclosure proposes methods for accelerating retransmission and efficiently managing a buffer in a next-generation mobile communication system, and implementation methods thereof in different buffer structures.

In accordance with an aspect of the disclosure, a method by an apparatus for controlling buffers in a wireless communication system is provided. The method includes storing information related to a packet in at least one of a first buffer or a second buffer, transmitting data generated based on the packet, and, when an acknowledgement signal is received for the data, discarding the information.

In accordance with another aspect of the disclosure, a method by an apparatus for controlling buffers in a wireless communication system is provided. The method includes storing first information related to a first packet in a third buffer; storing second information related to a second packet in a fourth buffer, wherein the second information is generated by preprocessing the first packet before acquiring resource information for transmitting the first packet; identifying mapping information between location information of the third buffer and location information of the fourth buffer, and when the resource information is received, transmitting data corresponding to the second packet based on the resource information.

In accordance with another aspect of the disclosure, an apparatus in a wireless communication system is provided. The apparatus includes a transceiver and at least one processor configured to store information related to a packet in the at least one of the first buffer or the second buffer, transmit data generated based on the packet, and, when an acknowledgement signal is received for the data, discard the information.

In accordance with another aspect of the disclosure, an apparatus in a wireless communication system is provided. The apparatus includes a transceiver and at least one processor configured to store first information related to a first packet in a third buffer, store second information in a fourth buffer, the second information being related to a second packet that is generated by preprocessing the first packet before acquiring resource information for transmitting the first packet, identify a mapping information between location information of the third buffer and location information of the fourth buffer, and, when the resource information is received, transmit data corresponding to the second packet based on the resource information.

According to the embodiments of the disclosure, it is possible to heighten efficiency of the buffer management of the terminal and to increase the data rate.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIGS. 8A and 8B are diagrams illustrating the operation of a terminal in which an LTE system terminal manages buffers in an RLC AM mode in according to an embodiment of the disclosure;

FIGS. 10A and 10B are diagrams illustrating operation of a terminal in which an LTE system terminal manages buffers in an RLC AM mode in according to an embodiment of the disclosure;

FIGS. 11A and 11B are diagrams illustrating operation of a terminal in which an LTE system terminal manages buffers in an RLC UM mode in according to an embodiment of the disclosure;

FIGS. 14A and 14B are diagrams illustrating operation of a terminal in which an LTE system terminal manages buffers in an RLC UM mode according to an embodiment of the disclosure;

FIGS. 18A and 18B are diagrams illustrating operation of a terminal in which a next-generation mobile communication system terminal manages buffers in an RLC UM mode according to an embodiment of the disclosure;

Throughout the drawings, it should be noted that like reference numbers are used to depict the same or similar elements, features, and structures.

DETAILED DESCRIPTION

Figure 1:
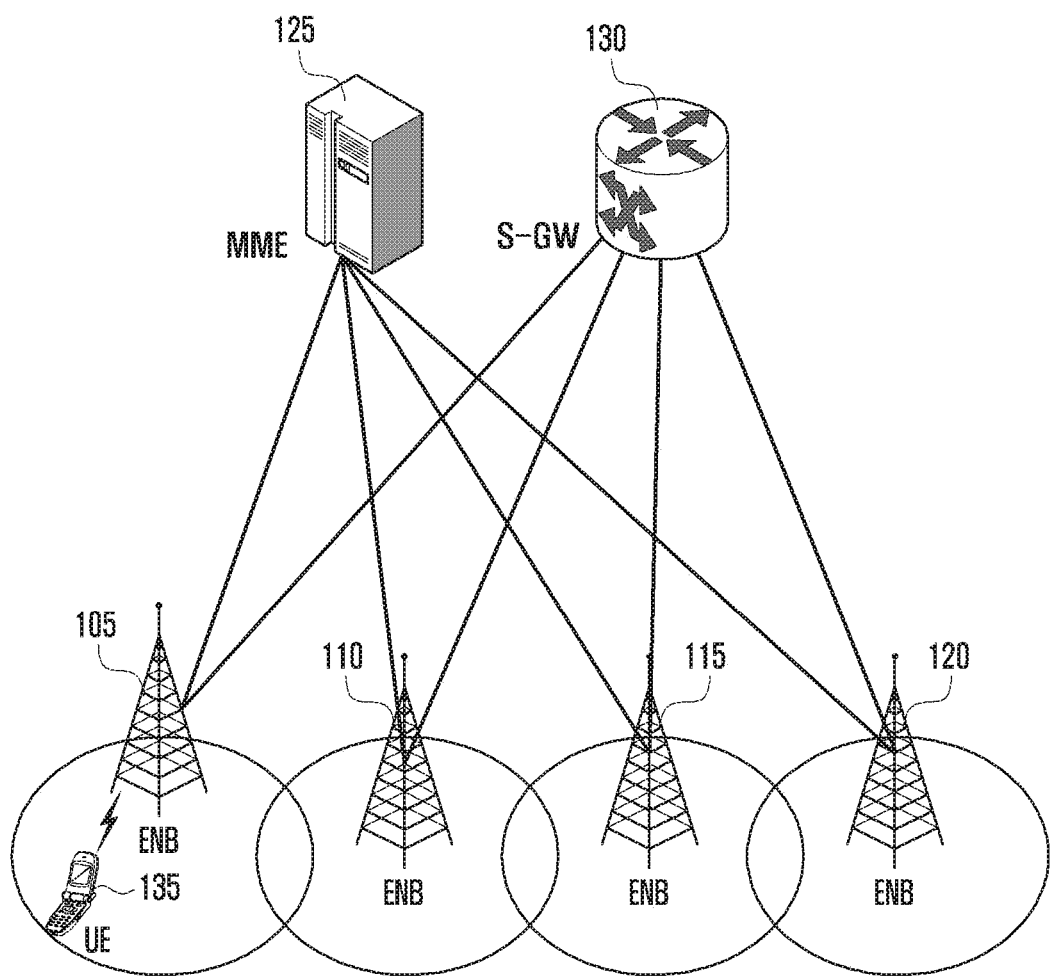
FIG. 1 is a diagram illustrating the structure of a long term evolution (LTE) system according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents It is to be understood that the singular forms "a," "an," and "the" include plural referents unless the context clearly dictates otherwise. Thus, for example, reference to "a component surface" includes reference to one or more of such surfaces.

In describing the disclosure, related well-known functions or configurations incorporated herein are not described in detail in the case where it is determined that they obscure the subject matter of the disclosure in unnecessary detail. Hereinafter, embodiments of the disclosure will be described with reference to the accompanying drawings.

Hereinafter, terms for identifying a connection node, terms for calling network entities, terms for calling messages, terms for calling an interface between network entities, and terms for calling various pieces of identification information, as used in the following description, are exemplified for convenience in explanation. Accordingly, the disclosure is not limited to the terms to be described later, but other terms for calling subjects having equal technical meanings may be used.

Hereinafter, for convenience in explanation, terms and titles that are defined in the $3^{rd}$ generation partnership project long term evolution (LTE) standards are used in the disclosure. However, the disclosure is not limited by the terms and titles, but can be equally applied to systems following other standards.

In a next-generation mobile communication system, it is necessary to support a peak data rate of 20 Gbps in a downlink and a peak data rate of 10 Gbps in an uplink, and quite a short delay response time is required. Accordingly, in case of a terminal being serviced in the next-generation mobile communication system, quite a high transmission/reception data processing speed is necessary. Accordingly, a method for accelerating data processing of a terminal is important. Further, in order to support the high data rate and to accelerate the data processing speed, efficient buffer management is also important. In a mobile communication system, one of the biggest causes of greatly lowering the data rate is a latency due to retransmission. Accordingly, in order to support the high data rate in the next-generation mobile communication system, it is necessary to accelerate the retransmission.

An LTE system has a data processing structure different from that of the next-generation mobile communication system. Specifically, in the LTE system, an radio link control (RLC) layer perform an RLC concatenation function, and thus a terminal is unable to perform a certain data preprocessing until it receives an uplink transmission resource from a network. If the uplink transmission source is received, the terminal makes and transmits one RLC packet data unit (PDU) to a media access control (MAC) layer through concatenation of packet data convergence protocol (PDCP PDUs transmitted from a PDCP layer to proceed with data transmission.

In contrast, in the next-generation mobile communication system, an RLC layer does not have an RLC concatenation function, and thus a terminal has a data processing structure capable of making and transmitting an RLC PDU to a MAC layer by processing PDCP PDUs transmitted from a PDCP layer through the RLC layer before receiving an uplink transmission resource, and pre-generating a MAC subheader and MAC service data unit (SDUs).

Accordingly, it is necessary to implement a method for efficiently managing buffers and a method for accelerating retransmission in different methods in accordance with different data processing structures.

FIG. 1 is a diagram illustrating the structure of an LTE system according to an embodiment of the disclosure.

Referring to FIG. 1, as illustrated, a radio access network (RAN) of an LTE system is composed of evolved node ENBs) 105, 110, 115, and 120 (also referred to as base stations), a mobility management entity (MME) 125, and a serving-gateway (S-GW) 130. A terminal or a user equipment (UE) 35 accesses an external network through the ENBs 105 to 120 and the S-GW 130.

In FIG. 1, the ENB 105 to 120 corresponds to an existing node B of a UMTS. The ENB is connected to the UE 135 on a radio channel, and plays a more complicated role than that of the existing node B. In the LTE system, since all user traffic includes a real-time service, such as a voice over (VoIP) through an internet protocol (IP) are serviced on shared channels, devices performing scheduling through consolidation of state information, such as a buffer state, an available transmission power state, and a channel state of each UE, are necessary, and the ENBs 105 to 120 correspond to such scheduling devices. In general, one ENB controls a plurality of cells. For example, in order to implement a transmission speed of 100 Mbps, the LTE system uses, for example, orthogonal frequency division multiplexing (OFDM) in a bandwidth of 20 MHz as a radio access technology. Further, the LTE system adopts an adaptive modulation & coding (AMC) scheme that determines a modulation scheme and a channel coding rate to match the channel state of the terminal. The S-GW 130 provides a data bearer, and generates or removes the data bearer under the control of the MME 125. The MME controls mobility management of the terminal and various control functions, and is connected to the plural base stations.

Figure 2:
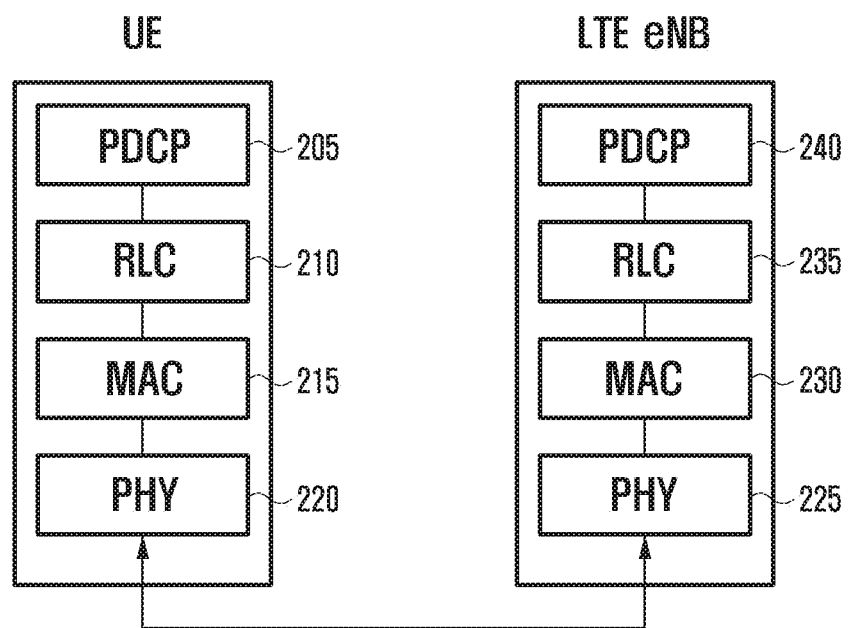
FIG. 2 is a diagram illustrating a radio protocol structure of an LTE system according to an embodiment of the disclosure.

FIG. 2 is a diagram illustrating a radio protocol structure of an LTE system according to an embodiment of the disclosure.

Referring to FIG. 2, in an UE or an ENB, a radio protocol of an LTE system is composed of a PDCP 205 or 240, a RLC 210 or 235, and a MAC 215 or 230. The PDCP 205 or 240 takes charge of IP header compression/decompression operations. The main functions of the PDCP are summarized as follows.
    Header compression and decompression: robust header compression (ROHC) only
    Transfer of user data
    In-sequence delivery of upper layer PDUs at a PDCP reestablishment procedure for a radio resource control (RRC) acknowledged mode (AM)
    For split bearers in dual connectivity (DC) (only support for an RLC AM): PDCP PDU routing for transmission and PDCP PDU reordering for reception
    Duplicate detection of lower layer SDUs at a PDCP reestablishment procedure for an RLC AM
    Retransmission of PDCP SDUs at handover and, for split bearers in DC, of PDCP PDUs at a PDCP data-recovery procedure, for an RLC AM
    Ciphering and deciphering
    Timer-based SDU discard in an uplink The RLC 210 or 235 reconfigures a PDCP PDU with a proper size and performs an automatic repeat request (ARQ) operation and the like. The main functions of the RLC are summarized as follows.
    Transfer of upper layer PDUs
    Error correction through an ARQ (only for AM data transfer)
    Concatenation, segmentation, and reassembly of RLC SDUs (only for UM and AM data transfer)
    Re-segmentation of RLC data PDUs (only for UM and AM data transfer)
    Reordering of RLC data PDUs (only for UM and AM data transfer)
    Duplicate detection (only for UM and AM data transfer)
    Protocol error detection (only for AM data transfer)
    RLC SDU discard (only for UM and AM transfer)
    RLC reestablishment The MAC 215 or 230 is connected to several RLC layer devices configured in one terminal, and performs multiplexing/demultiplexing of RLC PDUs into/from MAC PDU. The main functions of the MAC are summarized as follows.
    Mapping between logical channels and transport channels
    Multiplexing/demultiplexing of MAC SDUs belonging to one or different logical channels into/from transport blocks (TB) transferred to/from the physical layer on transport channels
    Scheduling information reporting
    Hybrid automatic repeat request (HARQ) function (error correction through HARQ)
    Priority handling between logical channels of one UE
    Priority handling between UEs by means of dynamic scheduling
    Multimedia broadcast multicast service (MBMS) service identification
    Transport format selection
    padding The physical layer 220 or 225 performs channel coding and modulation of upper layer data to configure and transmit OFDM symbols to a radio channel, or performs demodulation and channel decoding of the OFDM symbols received on the radio channel to transfer the demodulated and channel-decoded data to an upper layer.

Figure 3:
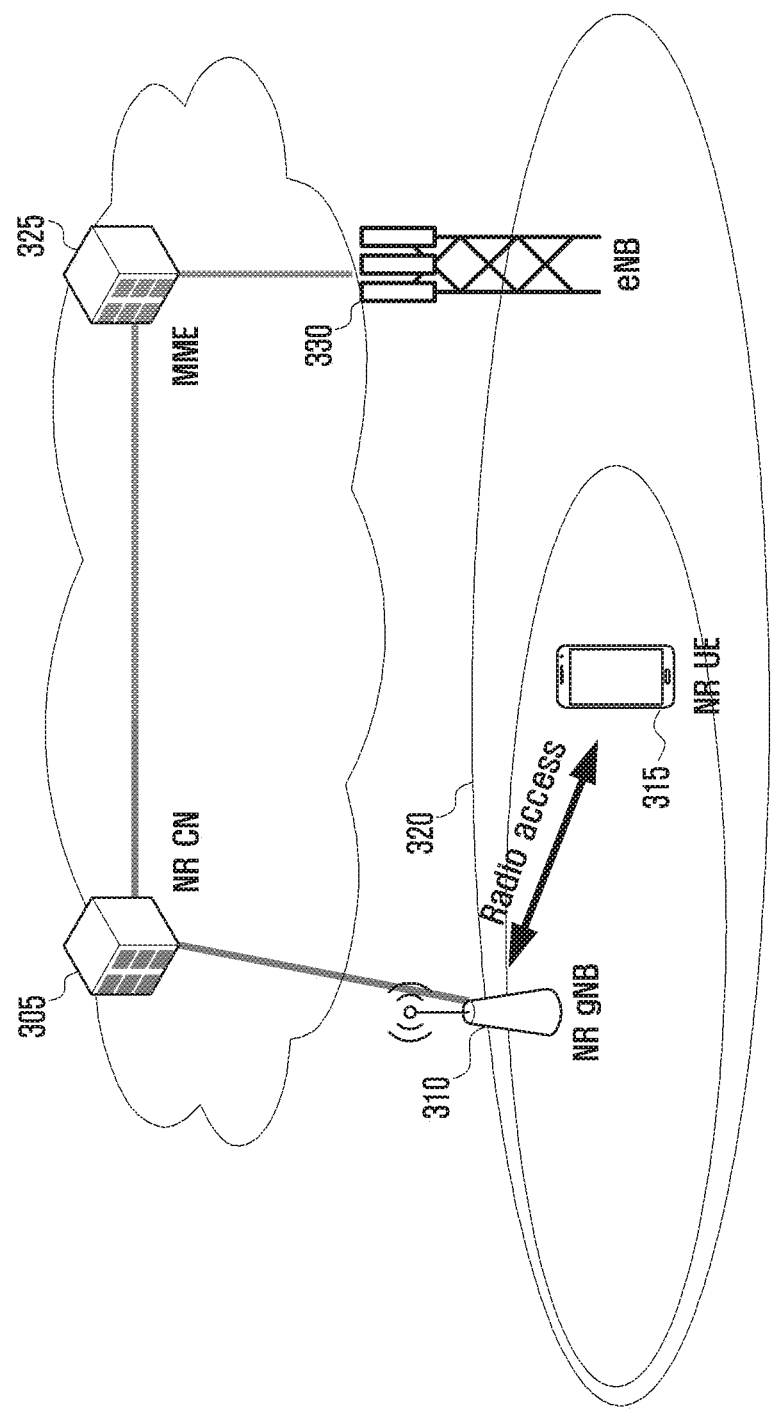
FIG. 3 is a diagram illustrating the structure of a next-generation mobile communication system according to an embodiment of the disclosure.

FIG. 3 is a diagram illustrating the structure of a next-generation mobile communication system according to an embodiment of the disclosure.

Referring to FIG. 3, as illustrated, a RAN of a next-generation mobile communication system (NR or 5G) is composed of a new radio node B (NR gNB or NR ENB) 310 and a new radio core network (NR CN) 305. A new radio user equipment (NR UE or terminal) 315 accesses to an external network through the NR gNB 310 and the NR CN 305.

In FIG. 3, the NR gNB 310 corresponds to an ENB of the existing LTE system. The NR gNB is connected to the NR UE 315 on a radio channel, and thus it can provide a more superior service than the service of the existing node B. Since all user traffic is serviced on shared channels in the next-generation mobile communication system, a device that performs scheduling through consolidation of status information, such as a buffer state, an available transmission power state, and a channel state of each UE, is necessary, and the NR gNB 310 takes charge of this. One NR gNB generally controls a plurality of cells. In order to implement ultrahigh-speed data transmission as compared with the existing LTE, the NR gNB or cell may have the existing maximum bandwidth or more, and a beamforming technology may be additionally included in consideration of OFDM as a radio connection technology. Further, an AMC scheme determining a modulation scheme and a channel coding rate to match the channel state of the UE is adopted.

The NR CN 305 performs functions of mobility support, bearer configuration, and quality of service (QoS) configuration. The NR CN is responsible for terminal mobility management and various kinds of control functions, and is connected to a plurality of ENBs. Further, the next-generation mobile communication system may also be configured to communicate with the existing LTE system within region 320, and the NR CN is connected to an MME 325 through a network interface. The MME is connected to an ENB 330 that is an existing base station.

Figure 4:
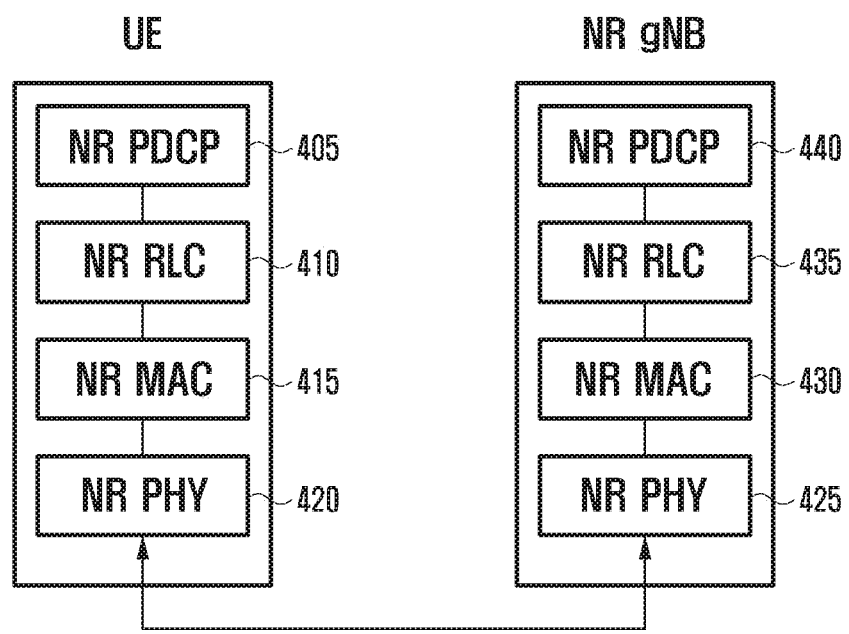
FIG. 4 is a diagram illustrating a radio protocol structure of a next-generation mobile communication system according to an embodiment of the disclosure.

FIG. 4 is a diagram illustrating a radio protocol structure of a next-generation mobile communication system according to an embodiment of disclosure.

Referring to FIG. 4, in a UE or an NR ENB, a radio protocol of the next-generation mobile communication system is composed of an NR PDCP 405 or 440, an NR RLC 410 or 435, and an NR MAC 415 or 430. The main function of the NR PDCP 405 or 440 may include parts of the following functions.

Header compression and decompression: ROHC only
Transfer of user data
In-sequence delivery of upper layer PDUs
PDCP PDU reordering for reception
Duplicate detection of lower layer SDUs
Retransmission of PDCP SDUs
Ciphering and deciphering
Timer-based SDU discard in an uplink As described above, reordering of the NR PDCP devices may mean reordering of PDCP PDUs received from a lower layer based on PDCP sequence numbers (SNs). The reordering may include delivery of data to an upper layer in the order of reordering, recording of lost PDCP PDUs through reordering, status report for the lost PDCP PDUs to a transmission side, and retransmission request for the lost PDCP PDUs.

The main functions of the NR RLC 410 or 435 may include parts of the following functions.

Transfer of upper layer PDUs
In-sequence delivery of upper layer PDUs
Out-of-sequence delivery of upper layer PDUs
Error correction through an ARQ
Concatenation, segmentation, and reassembly of RLC SDUs
Re-segmentation of RLC data PDUs
Reordering of RLC data PDUs
Duplicate detection
Protocol error detection
RLC SDU discard
RLC reestablishment As described above, in-sequence delivery of NR RLC devices may mean in-sequence delivery of RLC SDUs received from a lower layer to an upper layer. In the case where one RLC SDU is segmented into several RLC SDUs to be received, the in-sequence delivery of the NR RLC devices may include reassembly and delivery of the RLC SDUs. Further, the in-sequence delivery of the NR RLC devices may include reordering of RLC PDUs based on an RLC SN or a PDCP SN, recording of lost RLC PDUs through reordering, performing of status report for the lost RLC PDUs to a transmission side, and retransmission request for the lost PDCP PDUs. Further, the in-sequence delivery of the NR RLC devices may include in-sequence delivery of only RLC SDUs just before the lost RLC SDU to an upper layer if there is the lost RLC SDU, in-sequence delivery of all RLC SDUs received before a specific timer starts its operation to an upper layer if the timer has expired although there is the lost RLC SDU, or in-sequence delivery of all RLC SDUs received up to now to an upper layer if the timer has expired although there is the lost RLC SDU. Further, the NR RLC layer may process the RLC PDUs in the order of their reception (regardless of the order of sequence numbers, in the order of their arrival) and may transfer the RLC PDUs to a PDCP device in an out-of-sequence delivery. In case where a packet is segmented, the segments stored in a buffer or to be received later are received and reconfigured into one complete RLC PDU to be processed and transferred to the PDCP device. The NR RLC layer may not include a concatenation function, and the function may be performed by an NR MAC layer or may be replaced by a multiplexing function of the NR MAC layer.

As described above, the out-of-sequence delivery of the NR RLC device means a function of transferring the RLC SDUs received from a lower layer directly to an upper layer in an out-of-sequence delivery. If one RLC SDU is segmented into several RLC SDUs to be received, the out-of-sequence delivery may include reassembly and delivery of the RLC SDUs, and recording of lost RLC PDUs through storing and ordering the RLC SNs or PDCP SNs of the RLC PDUs.

The NR MAC 415 or 430 may be connected to several NR RLC layer devices configured in one terminal, and the main functions of the NR MAC may include parts of the following functions.

Mapping between logical channels and transport channels
Multiplexing/demultiplexing of MAC SDUs
Scheduling information reporting
HARQ function (error correction through HARQ)
Priority handling between logical channels of one UE
Priority handling between UEs by means of dynamic scheduling
MBMS service identification
Transport format selection
padding The NR physical layer 420 or 425 may perform channel coding and modulation of upper layer data to configure and transmit OFDM symbols to a radio channel, or may perform demodulation and channel decoding of the OFDM symbols received on the radio channel to transfer the demodulated and channel-decoded data to an upper layer.

Figure 5A:
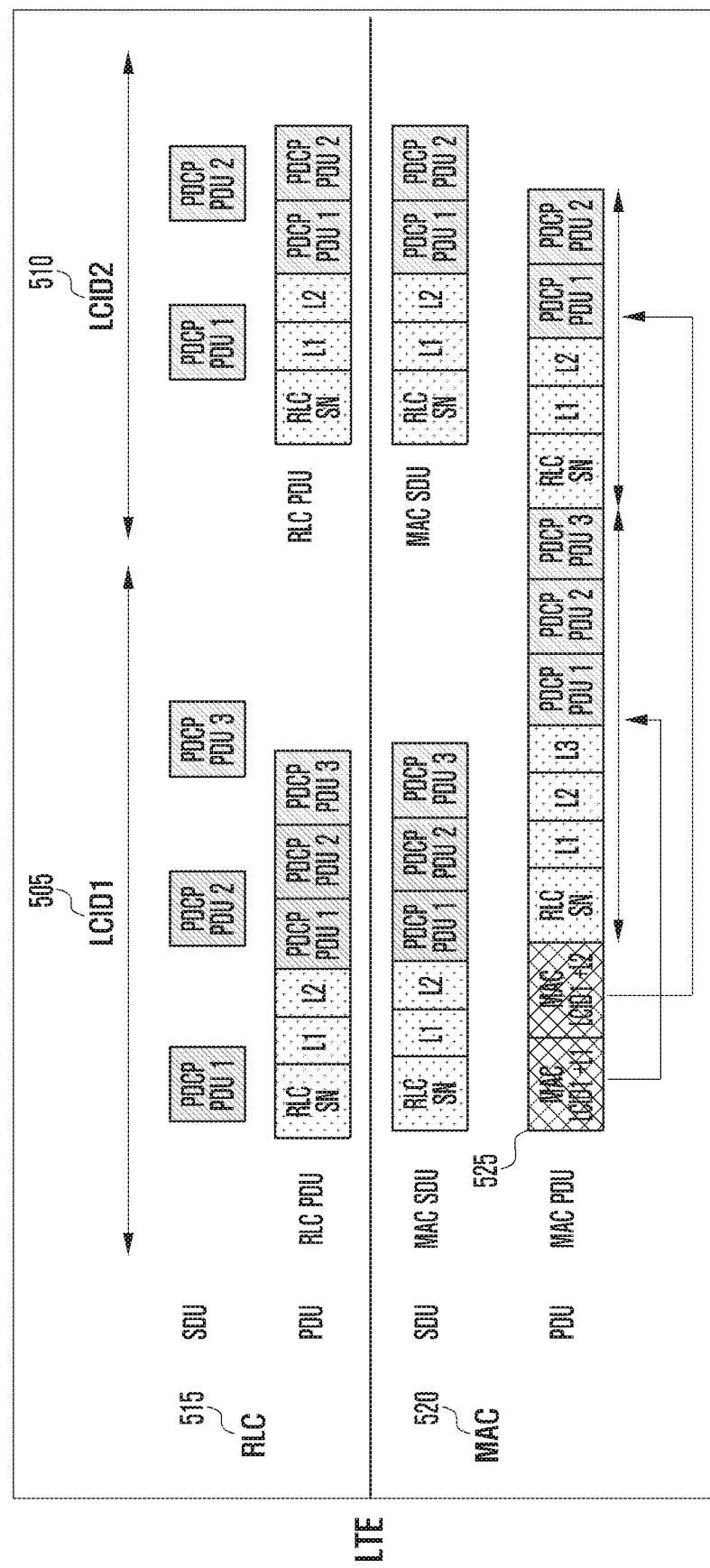
FIGS. 5A and 5B are diagrams illustrating a data processing structure in an LTE system according to an embodiment of the disclosure.
Figure 5B:
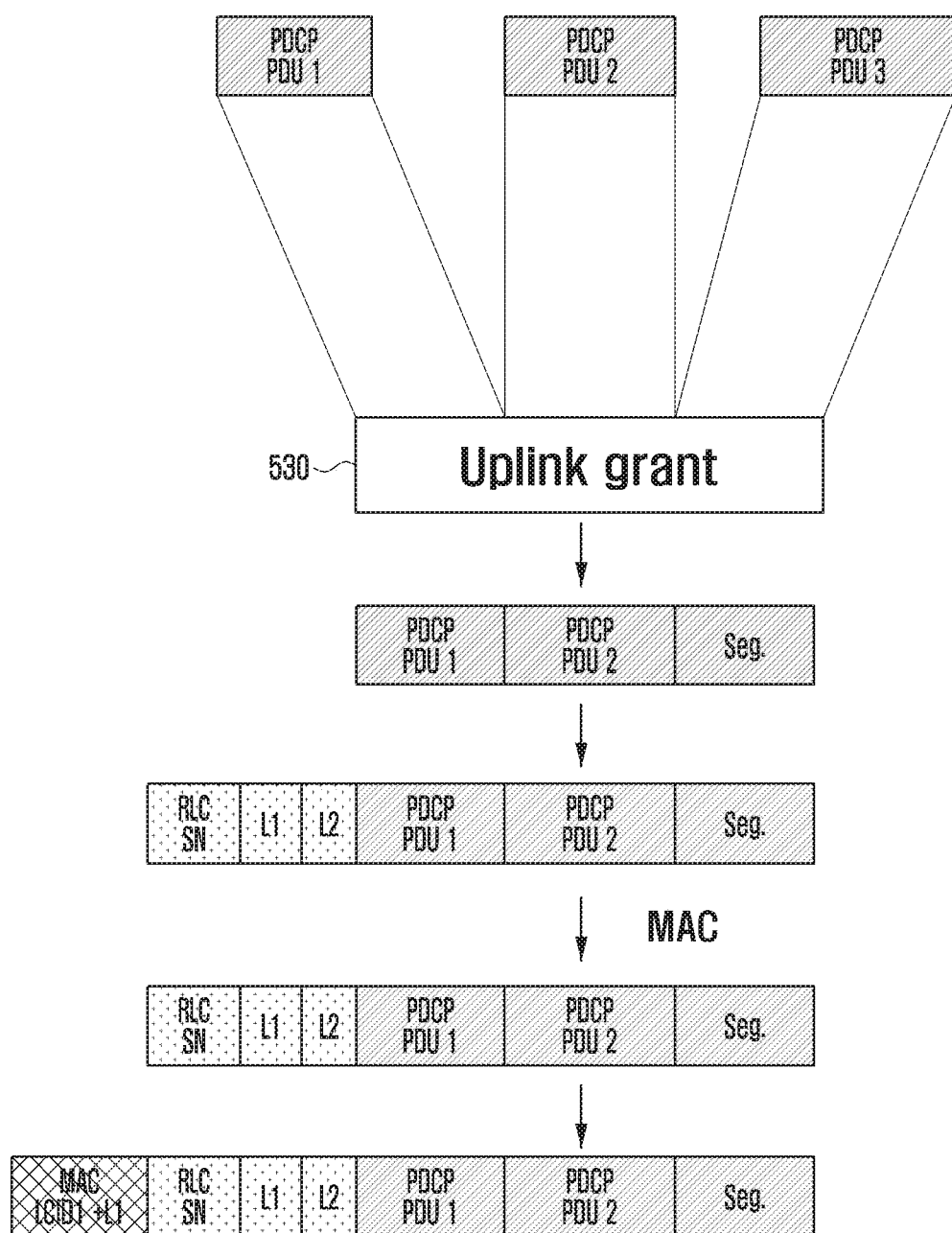

FIGS. 5A and 5B are diagrams illustrating a data processing structure in an LTE system according to an embodiment of the disclosure.

Referring to FIGS. 5A and 5B, an LTE system performs PDCP-layer and RLC-layer data processing for logical channels. That is, logical channel 1 505 and logical channel 2 510 have different PDCP layers and RLC layers, and perform independent data processing. Further, the LTE system transfers RLC PDUs generated from RLC layers of the respective logical channels to a MAC layer to configure one MAC PDU, and transmits the MAC PDU to a receiving end. In the LTE system, the PDCP layer, the RLC layer, and the MAC layer may include the functions as described above with reference to FIG. 2, and may perform operations corresponding to the functions.

In the LTE system, the RLC layer may concatenate PDCP PDUs. Further, in the LTE system, in a PDCP PDU structure as denoted by reference numeral 525, all MAC sub-headers are located in a front portion of the MAC PDU, and a MAC SDU portion is located in the rear portion of the MAC PDU. Due to that above-described features, in the LTE system, the RLC layer is unable to pre-perform or prepare data processing before a terminal receives uplink grant.

As shown in FIGS. 5A and 5B, if the uplink grant 530 is received, the terminal generates an RLC PDU by concatenating PDCP PDUs received from the PDCP layer to match the uplink grant. After the MAC layer 520 receives the uplink grant from a base station, the terminal performs logical channel prioritization (LCP), and divides the uplink grant for the respective logical channels. That is, the uplink grant 530 is an uplink transmission resource allocated from the base station to the MAC layer 520. If the size of the PDCP PDUs to be concatenated does not match the size of the uplink grant, the RLC layer 515 performs a segmentation procedure to make the PDCP PDUs match the uplink grant. The terminal may perform the above-described procedure for the respective logical channels, and each RLC device may configure an RLC header using the concatenated PDCP PDUs, and may transmit the completed RLC PDU to the MAC device.

As described above, the MAC device may configure the RLC PDUs (MAC SDUs) received from the respective RLC layers into one MAC PDU to transmit the MAC PDU to a physical device. If the RLC device performs the segmentation operation and includes segmentation information in the RLC header during configuration of the RLC header, it becomes possible to include length information of the respective concatenated PDCP PDUs in the header (this is to reassemble them at a receiving end).

As described above, the LTE system is featured so that the full-scale data processing of the RLC layer, the MAC layer, and the physical layer starts from the time when the uplink grant is received.

In the LTE system, the RLC layer may operate in an RLC AM, an RLC unacknowledged mode (UM), and an RLC transparent mode (TM).

In the RLC AM mode, the RLC layer supports an ARQ function, and a transmitting end may receive an RLC status report from the receiving end. Further, the transmitting end may perform retransmission of the unacknowledged RLC PDUs through the status report. Accordingly, an errorless reliably data transmission can be secured, and thus the RLC AM mode is suitable to services requiring high reliability.

In contrast, in the RLC UM mode, the ARQ function is not supported. Accordingly, in the RLC UM mode, the transmitting end does not receive the RLC status report, and does not perform the retransmission function. In the RLC UM mode, if the uplink grant is received, the RLC layer of the transmitting end serves to concatenate the PDCP PDUs (RLC SDUs) received from an upper layer and to continuously transfer the concatenated PDCP PDUs to a lower layer. Accordingly, continuous data transmission without transmission delay becomes possible, and thus the RLC UM mode is useful to services that are sensitive to the transmission delay. In the RLC TM mode, the RLC layer directly transmits the PDCP PDUs received from the upper layer to the lower layer without performing any process. That is, in the TM mode of the RLC layer, data from the upper layer is transparently transferred from the RLC layer to the lower layer. Accordingly, the RLC TM mode can be usefully used when transmitting system information or a paging message transmitted through a common channel such as a common control channel (CCCH).

In the disclosure, the PDCP layer and the RLC layer handle an efficient buffer management method and a retransmission acceleration method, and thus the RLC AM mode and the RLC UM mode excluding the mode in which the RLC layer does not perform any processing, such as the RLC TM mode, will now be described in detail.

Separate buffer structure of LTE system.

Figure 6:
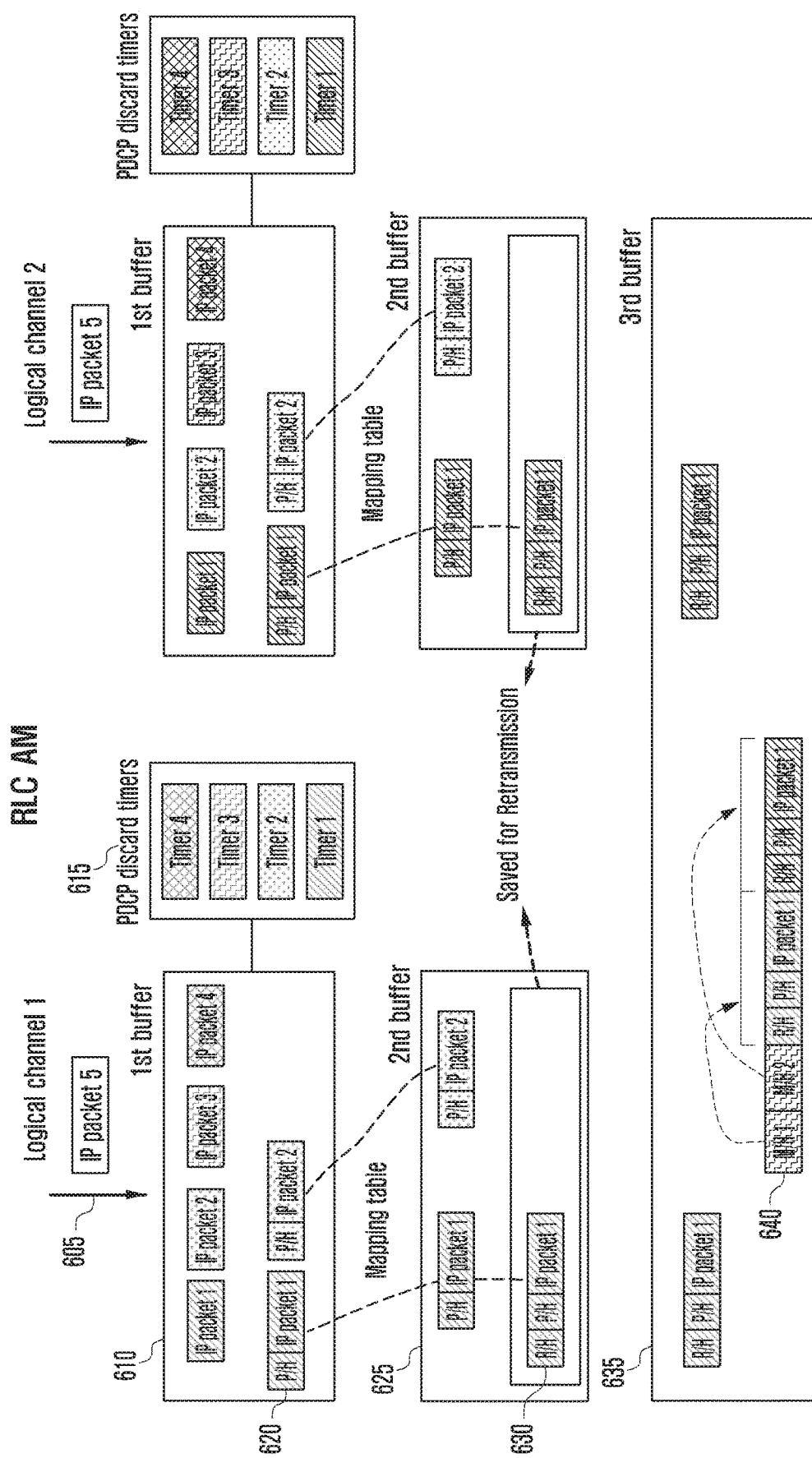
FIG. 6 is a diagram illustrating a first embodiment of an efficient buffer management method suitable when an LTE system terminal operates in a radio link control (RLC) acknowledged mode (AM) according to an embodiment of the disclosure.

FIG. 6 is a diagram illustrating an efficient buffer management method suitable when an LTE system terminal operates in an RLC AM according to an embodiment of the disclosure.

Referring to FIG. 6, a detailed mapping table and corresponding operations according to the first embodiment for the efficient buffer management method when the LTE system terminal operates in the RLC AM mode proposed in the disclosure.

Referring to FIG. 6, a terminal has a first buffer 610 and a second buffer 625 for respective logical channels, and a MAC layer has a third buffer 635. The first, second, and third buffers of the logical channels may be physically divided buffers, or physically the same, but logically divided buffers. In the disclosure, when actually implemented, the buffers include physically or logically dividable buffer structures, and are divided into, for example, first to third buffers in accordance with their roles. Preferably, the first buffer may be a PDCP buffer, the second buffer may be an RLC buffer, and the third buffer may be a MAC buffer.

The first buffer 610 may store IP packets (PDCP SDUs) 605 entering into a PDCP layer, generate a header of the PDCP SDUs, and generate a PDCP PDU 620 by configuring the header together with the PDCP SDUs to store the PDCP PDU therein. Further, the generated PDCP PDU may be transferred to the second buffer 625.

If an uplink grant is received from the base station, the terminal distributes the uplink grant to the respective logical channels by reflecting priorities or QoS for the respective logical channels. If the uplink grant is received, the respective logical channels concatenate the PDCP PDUs (RLC SDUs) in the RLC layer, input length information of the respective PDCP PDUs (RLC SDUs) to the header of the RLC PDUs, and configure the RLC PDUs 630. If the sizes of the RLC SDUs do not accurately coincide with each other when the RLC SDUs are concatenated to the uplink grant, the RLC layer may perform a segmentation operation. If the segmentation is performed with respect to the RLC SDUs, the RLC layer inputs the segmentation information to the header of the RLC PDUs. Further, the RLC layer may transmit the completed RLC PDUs to the MAC layer.

The MAC layer may configure one MAC PDU 640 by multiplexing the RLC PDUs received from the different logical channels, and may transmit the MAC PDU to the physical layer. Further, for HARQ processing, the MAC layer may store the MAC PDU, and may perform retransmission until an acknowledgement (ACK) is received.

Further detailed contents may be described below with reference to FIG. 7.

Figure 7:
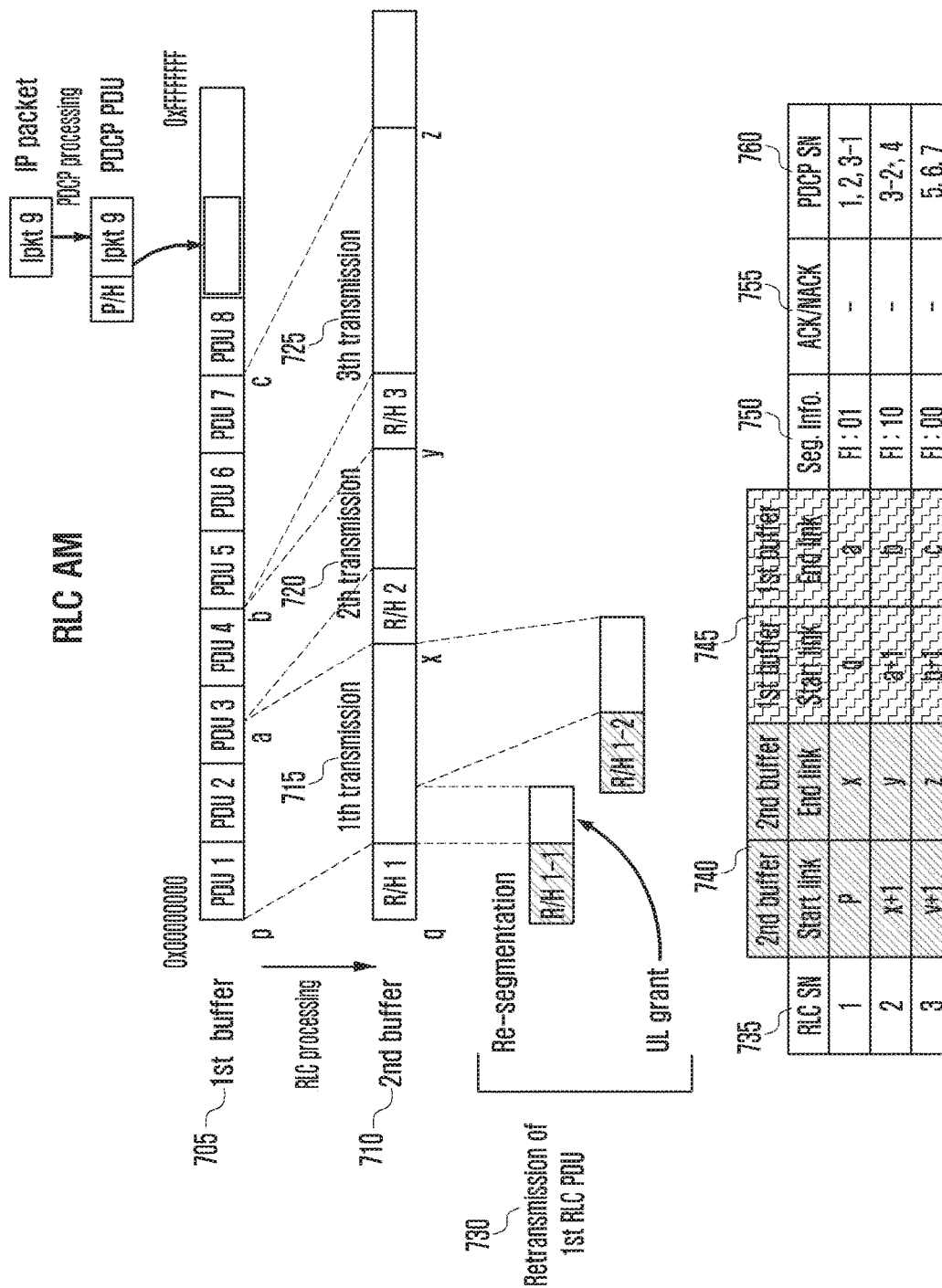
FIG. 7 is a diagram illustrating a mapping table and a corresponding operation of an efficient buffer management method when an LTE system terminal operates in an RLC AM mode according to an embodiment of the disclosure.

FIG. 7 is a diagram illustrating a mapping table and a corresponding operation of an efficient buffer management method when an LTE system terminal operates in an RLC AM mode according to an embodiment of the disclosure.

Referring to FIG. 7, if the PDCP PDUs (RLC SDUs) are received from the layer, the RLC layer may store them in a second buffer 710. Further, the RLC layer may not store the PDCP PDUs (RLC SDUs) in the second buffer 710, but may record memory addresses of the PDCP PDUs for reference.

If the size of the uplink grant is received, the RLC layer may configure one RLC PDU through concatenation of the PDCP PDUs (RLC SDUs). Once the RLC PDU is configured as described above, the RLC layer may configure a mapping table 735 based on RLC serial numbers and includes memory addresses 740 of a second buffer, memory addresses 745 of a first buffer, segment information 750, ACK/non-acknowledgment (NACK) information 755, and a PDCP serial number 760. For example, an address of the second buffer in which the RLC PDU corresponding to RLC serial number 1 is stored may be recorded, and a memory address 745 of a first buffer for the PDCP PDUs concatenated to record information on the PDCP PDUs concatenated to the RLC PDU may be recorded. The address of the buffer may be managed as a start link and an end link of the memory address. Further, if the RLC layer has performed a segmentation operation, segmentation information 750 may be recorded in the mapping table 735. In the segmentation information, as compared with the original RLC SDUs, if a portion excluding a header of the RLC PDU, that is, a payload, coincides with the foremost portion of the RLC SDUs, "0" may be recorded as the first bit of an FI field, whereas if the payload does not coincide with the foremost portion, "1" may be recorded as the second bit of the FI field. As described above, the segmentation information may be recorded. Further, the RLC layer of a transmitting end may identify the ACK/NACK result for the respective RLC serial numbers after receiving an RLC status report from the RLC layer of a receiving end, and may record the ACK/NACK information 755 for the respective RLC serial numbers. Further, information on what PDCP PDUs are concatenated to the RLC PDUs corresponding to the respective RLC serial numbers may be recorded. That is, information indicating that PDCP serial numbers 1 and 2 and a part of PDCP serial number 3 are concatenated to RLC serial number 1 may be recorded. In case of performing the segmentation operation in the RLC layer, information on respective segments may be marked on the last segment. The reason why the last segment is marked is to identify what PDCP serial numbers can be considered as an ACK when the ACK is received with respect to a certain RLC serial number. That is, if an ACK is received with respect to RLC serial number 2 after the RLC serial number 2, to which the last segment of PDCP serial number 3 and PDCP serial number 4 are concatenated, is transmitted, the RLC layer may receive an ACK with respect to the last segment of PDCP serial number 3, and thus may consider that it has received the ACK with respect to PDCP serial number 3 and PDCP serial number 4.

Whenever uplink grant is received, the RLC layer may make an RLC PDU through concatenation and segmentation of PDCP PDUs to transmit the RLC PDU to a lower layer. Further, the RLC layer may transmit and store RLC PDUs in due order, such as 715, 720, and 725, and may record the stored information as mapping table information, such as mapping table 735. If a NACK is received with respect to RLC serial number 1 in an RLC status report received from the RLC layer of the receiving end, the RLC layer of the transmitting end prepares retransmission. In this case, if the uplink grant for the retransmission is smaller than that at the beginning at operation 715, the RLC layer of the transmitting end performs re-segmentation, newly configures a header for the segmented RLC PDUs, transmits the configured RLC PDUs, and separately records corresponding information.

The operations of the first buffer and the second buffer are as follows.

If IP packets are received from an upper layer, the PDCP layer may store the respective IP packets in the first buffers 610 and 705 through allocation of memory addresses to the IP packets, and may drive and manage a PDCP discard timer 615 for each IP packet. A timer value may be configured by a network. For example, when the terminal configures an RRC connection, the timer value may be configured by the network through an RRC message. If the timer expires, the terminal discards the PDCP PDU or the PDCP SDU corresponding to the timer from the first buffer.

If the PDCP PDU corresponding to the timer is sent to the RLC layer, the PDCP layer may transmit a discard indicator corresponding to the PDCP PDU to the RLC layer. The discard indicator may indicate the memory address of the PDCP PDU sent to the RLC layer for the second buffer, the PDCP serial number, or mapping information on the PDCP PDU. Further, if ACK/NACK information on the PDCP PDUs is received from the PDCP layer of the receiving end through a PDCP status report, the PDCP layer may discard the acknowledged PDCP PDUs from the first buffer, and if an unexpired timer corresponding to the discarded PDCP PDUs exists, it may stop and discard the timer.

If the PDCP PDU corresponding to the discard indicator received from the PDCP layer has not yet become a part of the RLC PDU in the RLC layer or has not been mapped thereon, the RLC layer discards the corresponding information. That is, the RLC layer discards the PDCP PDU (RLC SDU) transferred to and stored in the RLC layer and related information, and mapping information from the second buffer. If the PDCP PDU indicated by the discard indicator has already become a part of the RLC PDU, the RLC layer does not discard the PDCP PDU and the related information from the second buffer. This is because if the PDCP PDU that has already become the part of the RLC PDU is discarded, a gap occurs in the RLC serial number to cause a transmission delay. That is, the receiving end is unable to discriminate whether the corresponding RLC serial number is lost in the transmission process or is discarded by the discard indicator in the transmitting end.

Further, if the RLC status report is received from the RLC layer of the receiving end, the RLC layer can identify the ACK/NACK result for each RLC serial number. Further, in case of the acknowledged RLC PDU, the RLC layer may discard the RLC PDU from the second buffer, and may discard the related mapping information. Further, the RLC layer prepares retransmission for the negatively acknowledged RLC PDU. If the uplink grant is sufficient in case where the RLC PDU for the retransmission is stored in the second buffer during performing of the retransmission, the RLC layer may immediately perform the retransmission. Further, if the uplink grant is insufficient, the RLC layer may perform re-segmentation to transmit the RLC PDU at operation 730. If the RLC PDU for the retransmission is not stored in the second buffer, but previously generated information (header information and information on concatenated PDCP PDUs) and mapping information are recorded, the RLC layer of the transmitting end may dynamically regenerate the RLC PDU based on this to perform the retransmission.

The RLC layer may identify the result of the ACK/NACK for the RLC serial number through the RLC status report, identify mapping table 735, and determine the ACK/NACK result for the corresponding PDCP serial number 760. If the ACK for the PDCP serial number is identified, the RLC layer can transfer the ACK information for the PDCP serial number to the PDCP layer. The PDCP layer may identify the ACK information, and may record the ACK/NACK information for PDCP serial numbers. The ACK information for the PDCP serial numbers may be used during a handover operation. That is, when a terminal handover occurs, the PDCP layer may perform retransmission to a target base station of the handover, starting from the acknowledged PDCP serial number after the lowest PDCP serial number in the order of serial numbers. If the network supports a selective retransmission during the handover, the PDCP layer may retransmit only negatively acknowledged PDCP PDUs to the target base station of the handover.

Figure 8A:
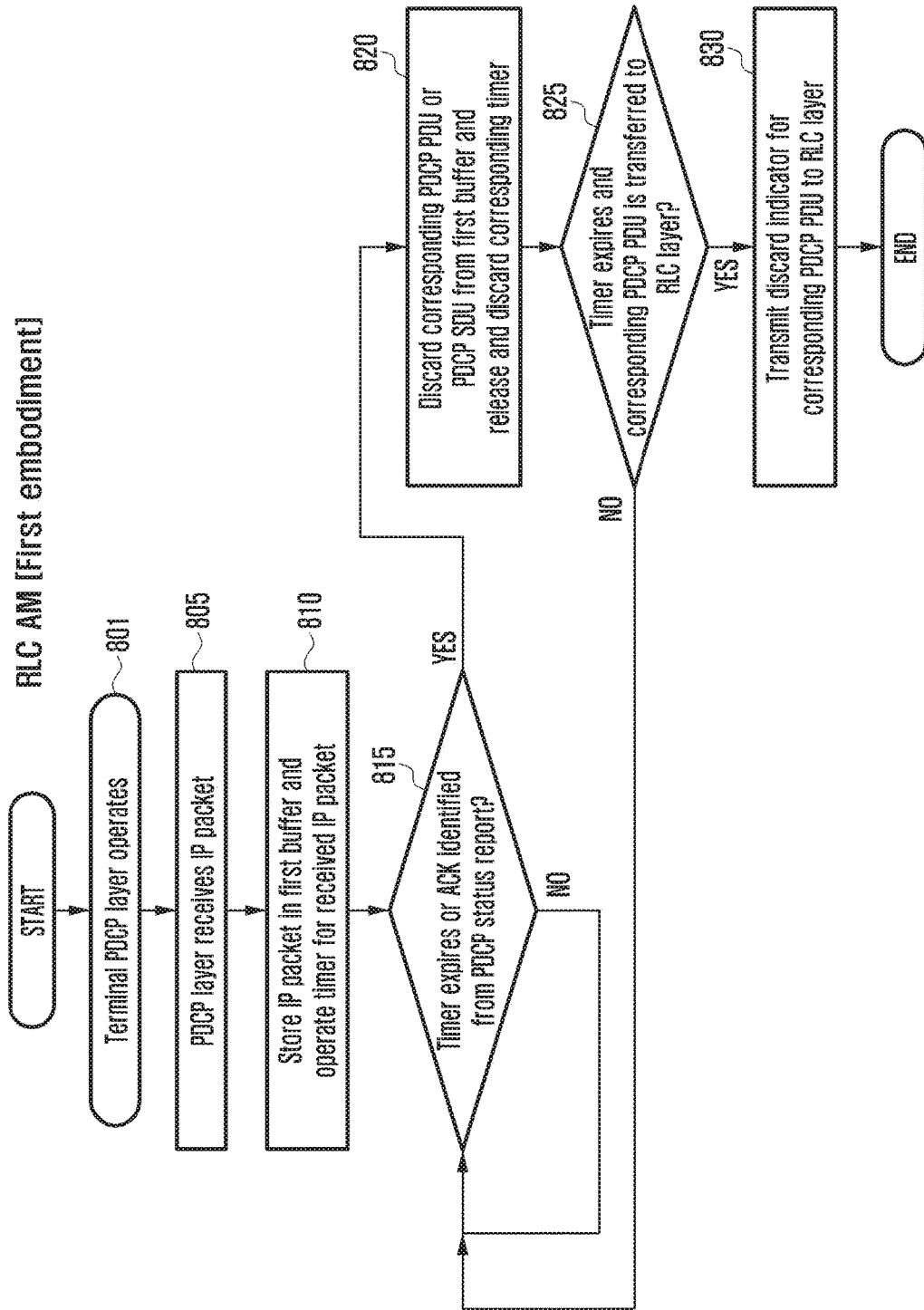

FIGS. 8A and 8B are diagrams illustrating the operation of a terminal in which an LTE system terminal manages buffers in an RLC AM mode according to an embodiment of the disclosure.

Referring to FIG. 8A, if IP packets are received from an upper layer, a terminal PDCP layer operates at operation 801, receives an IP packet at operation 805, and may store the respective IP packets in a first buffer through allocation of memory addresses to the IP packets at operation 810. Further, the terminal PDCP layer may drive and manage a PDCP discard timer for each IP packet at operation 815. If the timer expires, the terminal discards a PDCP PDU or a PDCP SDU corresponding to the timer from the first buffer at operation 820. If the PDCP PDU corresponding to the timer is sent to an RLC layer at operation 825, the PDCP layer may transmit a discard indicator corresponding to the PDCP PDU to the RLC layer at operation 830. The discard indicator may indicate a memory address of the PDCP PDU sent to the RLC layer for the second buffer, the PDCP serial number, or mapping information on the PDCP PDU. Further, if ACK/NACK information on the PDCP PDUs is received from the PDCP layer of the receiving end through a PDCP status report, the PDCP layer may discard the acknowledged PDCP PDUs from the first buffer, and if there exists an unexpired timer corresponding to the discarded PDCP PDUs, the PDCP layer may stop and discard the timer at operation 820.

Referring to FIG. 8B, the terminal layer RLC operates at operation 835. If the discard indicator is received from the PDCP layer at operation 840, a terminal RLC layer may determine whether to discard the information at operation 840. Specifically, if the PDCP PDU corresponding to the discard indicator has not yet become a part of the RLC PDU in the RLC layer or has not been mapped thereon at operation 845, the terminal RLC layer discards the corresponding information at operation 855. The contents of the discard indicator are transferred to the RLC layer, and the terminal RLC layer discards the stored PDCP PDU (RLC SDU), information related to this, and mapping information from the second buffer. If the PDCP PDU indicated by the discard indicator has already become a part of the RLC PDU (845), the terminal RLC layer 835 does not discard the PDCP PDU and the related information from the second buffer at operation 850.

If the RLC status report is received from the RLC layer of the receiving end, the RLC layer may identify the ACK/NACK result for each RLC serial number. Further, in case of the acknowledged RLC PDU at operation 860, the RLC layer discards the RLC PDU from the second buffer, and discards the related mapping information at operation 865. Further, the RLC layer prepares retransmission for the negatively acknowledged RLC PDU at operation 875. If the uplink grant is sufficient in case where the RLC PDU for the retransmission is stored in the second buffer during performing of the retransmission, the RLC layer may immediately perform the retransmission, whereas if the uplink grant is insufficient, the RLC layer may perform re-segmentation to transmit the RLC PDU. If the RLC PDU for the retransmission is not stored in the second buffer, but previously generated information (header information and information on concatenated PDCP PDUs) and mapping information are recorded, the RLC layer may dynamically regenerate the RLC PDU based on this to perform the retransmission.

The RLC layer may identify the result of the ACK/NACK for the RLC serial number through the RLC status report, identify mapping table information at operation 870, and determine the ACK/NACK result for the corresponding PDCP serial number. If the ACK for the PDCP serial number is identified, the RLC layer may transfer the ACK information for the PDCP serial number to the PDCP layer. The PDCP layer may identify the ACK information, and may record the ACK/NACK information for the PDCP serial numbers.

The first embodiment of an efficient buffer management method suitable when the LTE system terminal operates in an RLC AM mode according to the disclosure has proposed a method in which a PDCP layer manages the first buffer independently by a PDCP discard timer, and an RLC layer manages the second buffer independently by an RLC ACK.

A first embodiment of an efficient buffer management method suitable when the LTE system terminal operates in an RLC UM mode according to the disclosure is as follows.

When operating in the RLC UM mode, the terminal according to the disclosure has a structure as shown in FIG. 6, and operates in a similar manner to that as described above with reference to FIG. 7. However, different from the RLC AM mode, an ARQ function is not supported in the RLC UM mode, and thus the retransmission is not performed. Further, the RLC status report is not performed. Accordingly, for the retransmission, it is not necessary to record the already transmitted RLC PDU or information related to this, and mapping table information. This is the greatest difference between the RLC UM mode and the RLC AM mode.

In the disclosure, a first embodiment of a method in which an LTE system terminal in an RLC UM mode efficiently manages buffers is as follows.

If IP packets are received from an upper layer, the PDCP layer may store the respective IP packets in the first buffers 610 and 705 through allocation of memory addresses to the IP packets. Further, the PDCP layer may drive and manage a PDCP discard timer for each IP packet. A timer value may be configured by a network. That is, when the terminal configures an RRC connection, the timer value may be configured by the network through an RRC message. If the timer expires, the terminal discards the PDCP PDU or the PDCP SDU corresponding to the timer from the first buffer.

If the PDCP PDU corresponding to the timer is sent to the RLC layer, the PDCP layer may transmit a discard indicator corresponding to the PDCP PDU to the RLC layer. The discard indicator may indicate the memory address of the PDCP PDU sent to the RLC layer for the second buffer, the PDCP serial number, or mapping information on the PDCP PDU. Further, if ACK/NACK information on the PDCP PDUs is received from the PDCP layer of the receiving end through a PDCP status report, the PDCP layer may discard the acknowledged PDCP PDUs from the first buffer, and if an unexpired timer corresponding to the discarded PDCP PDUs exists, it may stop and discard the timer.

If the discard indicator is received from the PDCP layer, the RLC layer may discard the information. Specifically, if the PDCP PDU corresponding to the discard indicator has not yet become a part of the RLC PDU in the RLC layer or has not been mapped thereon, the RLC layer discards the corresponding information. The contents of the discard indicator are transferred to the RLC layer, and the RLC layer discards the stored PDCP PDU (RLC SDU), information related to this, and mapping information from the second buffer. If the PDCP PDU indicated by the discard indicator has already become a part of the RLC PDU, the RLC layer does not discard the PDCP PDU and the related information from the second buffer. This is because if the PDCP PDU that has already become the part of the RLC PDU is discarded, a gap occurs in the RLC serial number to cause a transmission delay. That is, the receiving end is unable to discriminate whether the corresponding RLC serial number is lost in the transmission process or is discarded by the discard indicator in the transmitting end.

Further, the RLC layer may receive uplink grant, and may configure RLC PDUs through concatenation and segmentation of the PDCP PDUs. Further, after completing and transferring the RLC PDUs to the MAC layer, the RLC layer discards the RLC PDUs from the second buffer, and discards the related information and the mapping information. Accordingly, in the RLC UM mode, the RLC layer transmits the RLC PDUs, and then discards them together with the related information without directly storing them in the second buffer. This is because the ARQ function is not supported in the RLC UM mode, and thus it is not necessary to record the information for the retransmission.

The first embodiment of an efficient buffer management method suitable when the LTE system terminal operates in an RLC UM mode according to the disclosure has proposed a method in which a PDCP layer manages the first buffer independently by a PDCP discard timer, and an RLC layer manages the second buffer independently in accordance with whether to transmit the RLC PDUs.

Figure 9A:
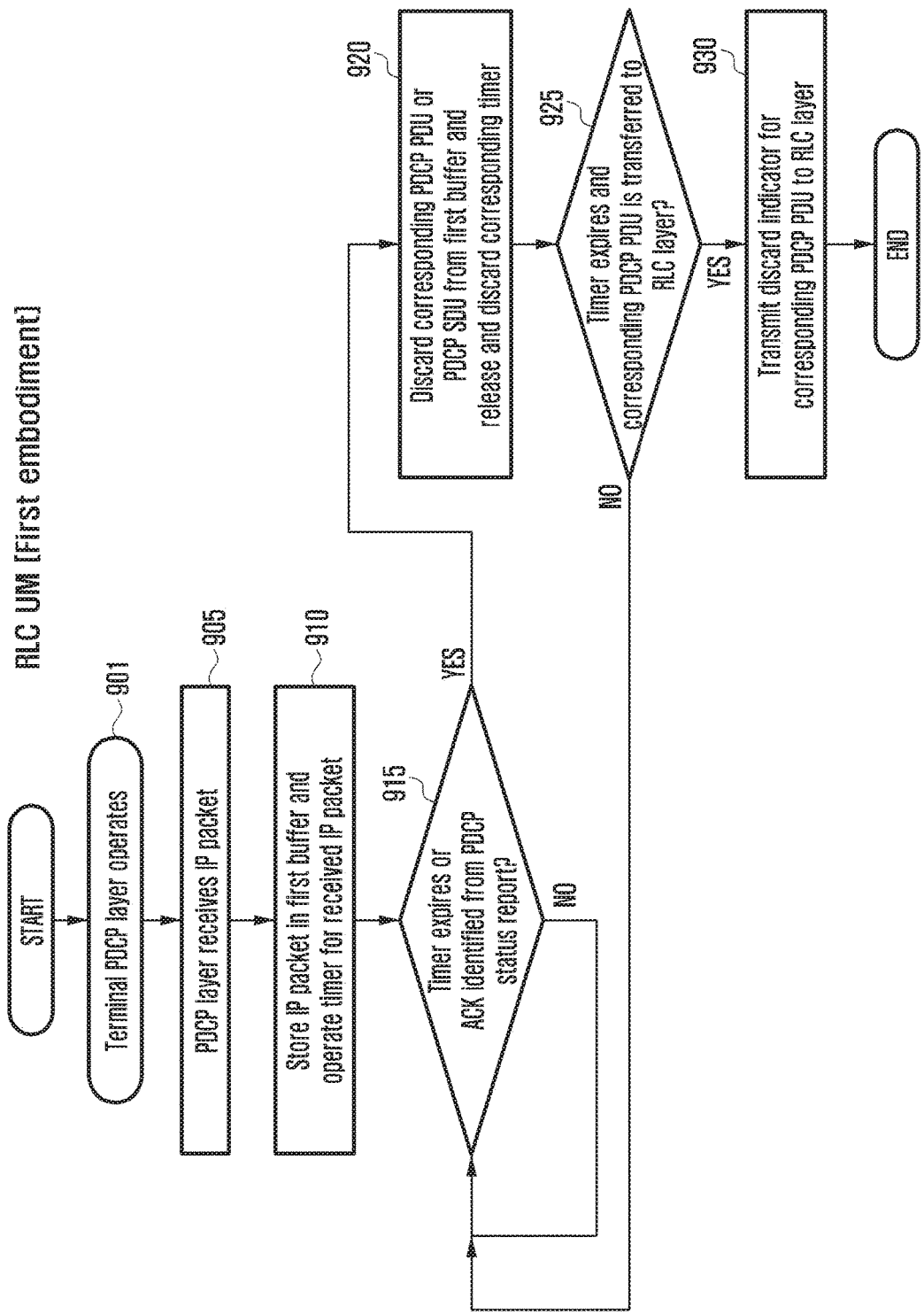
FIGS. 9A and 9B are diagrams illustrating the operation of a terminal in which an LTE system terminal manages buffers in an RLC unacknowledged mode (UM) in according to an embodiment of the disclosure.
Figure 9B:
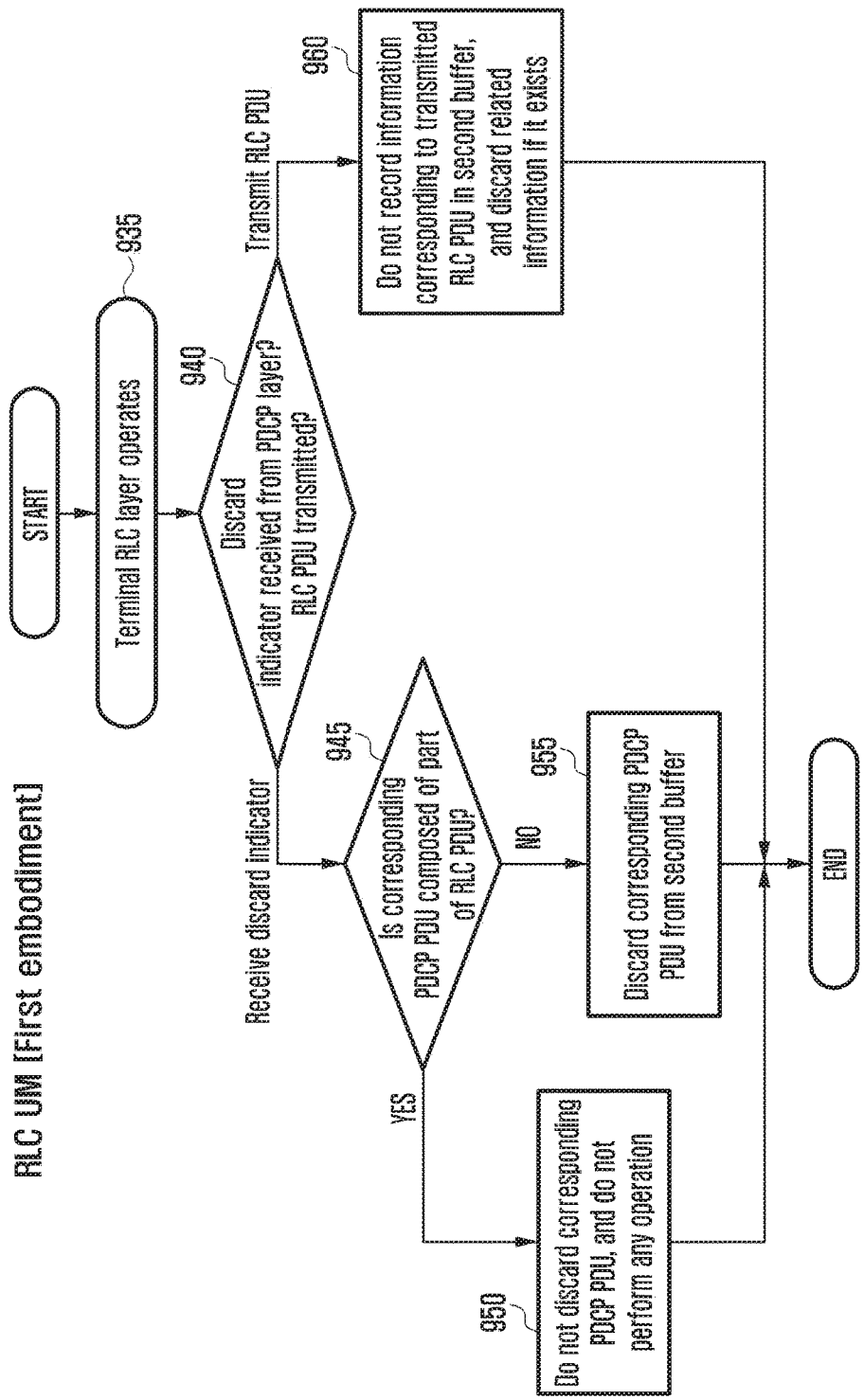

FIGS. 9A and 9B are diagrams illustrating the operation of a terminal in which an LTE system terminal manages buffers in an RLC UM mode according to an embodiment of the disclosure.

Referring to FIG. 9A, if IP packets are received from an upper layer, a terminal PDCP layer may operate at operation 901, the PDCP layer may receive an IP packet at operation 905, and the terminal may store the respective IP packets in a first buffer through allocation of memory addresses to the IP packets at operation 905. Further, the terminal PDCP layer may drive and manage a PDCP discard timer for each IP packet at operation 915. If the timer expires, the terminal discards a PDCP PDU or a PDCP SDU corresponding to the timer from the first buffer at operation 920. If the PDCP PDU corresponding to the timer is sent to an RLC layer at operation 925, the PDCP layer may transmit a discard indicator corresponding to the PDCP PDU to the RLC layer at operation 930. The discard indicator may indicate a memory address of the PDCP PDU sent to the RLC layer for the second buffer, the PDCP serial number, or mapping information on the PDCP PDU. Further, if ACK/NACK information on the PDCP PDUs is received from the PDCP layer of the receiving end through a PDCP status report, the PDCP layer may discard the acknowledged PDCP PDUs from the first buffer, and if there exists an unexpired timer corresponding to the discarded PDCP PDUs, the PDCP layer may stop and discard the timer at operation 920.

Referring to FIG. 9B, a terminal RLC layer may operate at operation 935. If the discard indicator is received from the PDCP layer at operation 940, a terminal RLC layer 935 may discard the information. Specifically, if the PDCP PDU corresponding to the discard indicator has not yet become a part of the RLC PDU in the RLC layer or has not been mapped thereon at operation 945, the terminal RLC layer discards the corresponding information at operation 955. The contents of the discard indicator are transferred to the RLC layer, and the terminal RLC layer discards the stored PDCP PDU (RLC SDU), information related to this, and mapping information from the second buffer. If the PDCP PDU indicated by the discard indicator has already become a part of the RLC PDU at operation 945, the terminal RLC layer does not discard the PDCP PDU and the related information from the second buffer at operation 950.

The RLC layer may receive uplink grant, and may configure RLC PDUs through concatenation and segmentation of the PDCP PDUs. After completing and transferring the RLC PDUs to the MAC layer at operation 940, the RLC layer discards the RLC PDUs from the second buffer, and discards the related information and the mapping information. That is, in the RLC UM mode, the RLC layer transmits the RLC PDUs, and then discards them together with the related information without directly storing them in the second buffer at operation 960. This is because the ARQ function is not supported in the RLC UM mode, and thus it is not necessary to record the information for the retransmission.

According to the first embodiment of an efficient buffer management method suitable when the LTE system terminal operates in an RLC AM mode and the first embodiment of an efficient buffer management method suitable when the LTE system terminal operates in an RLC UM mode proposed in the disclosure, the PDCP layer independently manages the first buffer, and the RLC layer independently manages the second buffer. Accordingly, implementation thereof is simple and is not complicated. However, in order to support a high data rate, more optimized buffer management method should be considered. For example, if the first buffer is not quickly emptied at a high data rate, a large buffer size may be required to prevent a buffer overflow due to the high data rate. If a small timer value is configured in order to prevent the buffer overflow, data may be lost before being transmitted to cause data throughput to deteriorate.

Hereinafter, a second embodiment of an efficient buffer management method suitable when the LTE system terminal operates in an RLC AM mode and a second embodiment of an efficient buffer management method suitable when the LTE system terminal operates in an RLC UM mode are proposed.

In the second embodiment of the efficient buffer management method suitable when the LTE system terminal operates in the RLC AM mode, the first buffer is not independently managed by the PDCP layer, but is managed by reflecting the RLC ACK result of the RLC layer. Further, in the second embodiment of the efficient buffer management method suitable when the LTE system terminal operates in the RLC UM mode, the first buffer is not independently managed by the PDCP layer, but is managed by reflecting whether to transmit the RLC PDU in the RLC layer.

If the RLC status report is received from the receiving end RLC device and the ACK for the RLC PDUs is received in the RLC AM mode, it is not necessary for the RLC device to have the acknowledged RLC PDUs, information corresponding to this, and mapping table information any further, and it is reasonable for the RLC device to discard them from the second buffer. Further, if the PDCP PDUs concatenated to the RLC PDUs having received the ACK exist in the first buffer, even such information is not to be used for the retransmission, and thus it is not necessary for the RLC layer to have them any further even if the PDCP discard timer has not yet expired. Accordingly, in the second embodiment of the efficient buffer management method suitable when the LTE system terminal according to the disclosure operates in the RLC AM mode, it is possible for the RLC layer to discard the RLC PDUs having received the RLC ACK from the second buffer. Further, if the RLC layer notifies the PDCP layer of the PDCP PDUs concatenated to the RLC PDUs, the corresponding PDCP PDUs are discarded from the first buffer, and information corresponding to the discarded PDCP PDU and the timer are released and discarded.

In contrast, in the RLC UM mode, the ARQ function is not supported, and thus it is not necessary to store the corresponding information after the RLC PDUs are transmitted for the retransmission. Accordingly, after transmitting the RLC PDUs, the RLC layer does not store the corresponding RLC PDUs in the second buffer, but discards the related information if any. Further, once the RLC PDUs are transmitted, it is not necessary for the RLC layer to have the PDCP PDUs concatenated to the RLC PDUs any further even if the PDCP discard timer has not yet expired. Accordingly, in the second embodiment of the efficient buffer management method suitable when the LTE system terminal according to the disclosure operates in the RLC UM mode, the RLC layer does not store the corresponding RLC PDUs in the second buffer after transmitting the RLC PDUs, but discards the related information if any. Further, if the information on the PDCP PDUs concatenated to the RLC PDUs is sent to the PDCP layer, the PDCP layer immediately discards the information on the PDCP PDUs from the first buffer even if the PDCP discard timer has not yet expired.

Figure 10B:
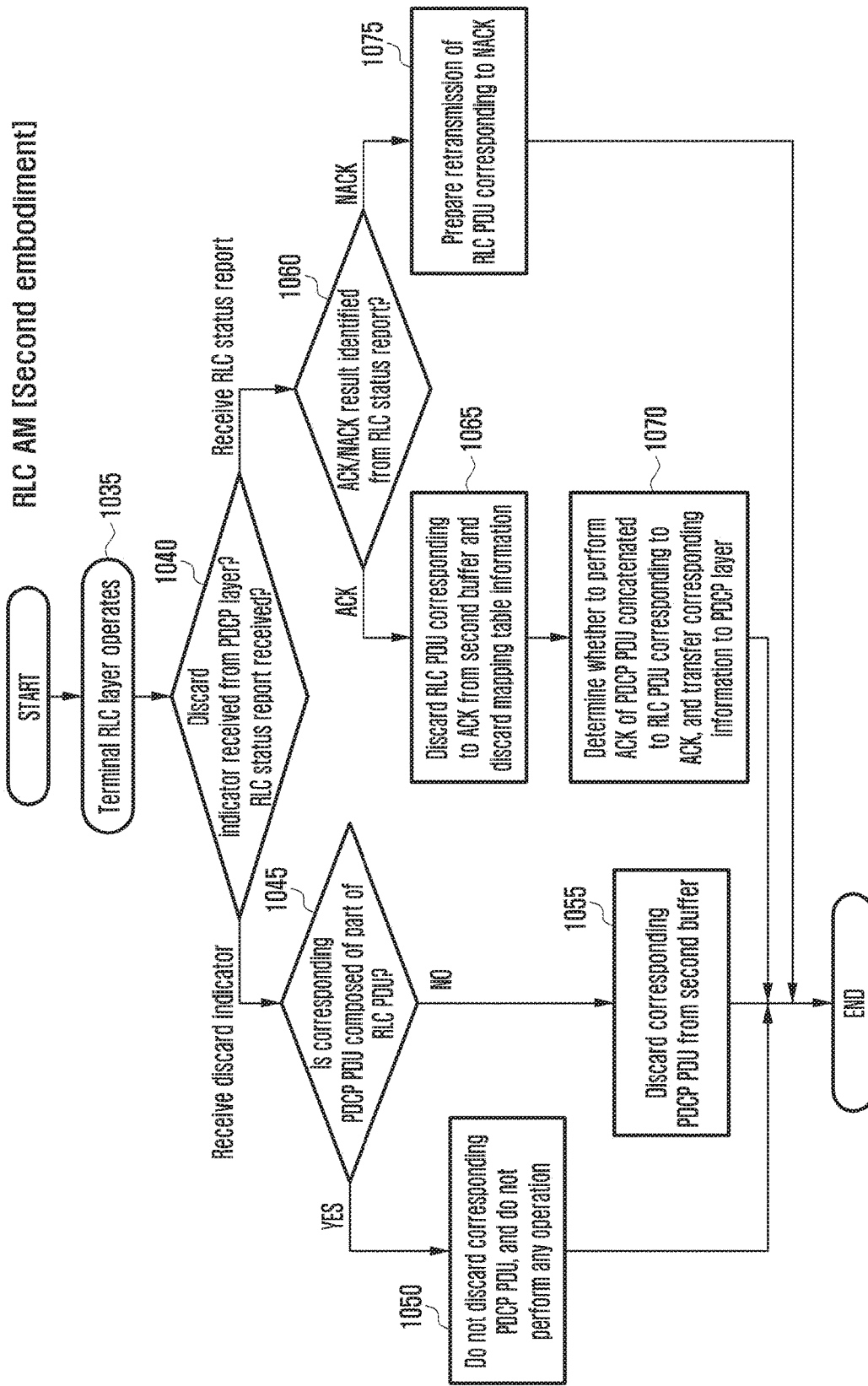

FIGS. 10A and 10B are diagrams illustrating operation of a terminal in which an LTE system terminal manages buffers in an RLC AM mode according to an embodiment of the disclosure.

Referring to FIG. 10A, if IP packets are received from an upper layer, a terminal PDCP layer may operate at operation 1001, the PDCP layer may receive an IP packet at operation 1005, and the terminal may store the respective IP packets in a first buffer through allocation of memory addresses to the IP packets at operation 1005. Further, the terminal PDCP layer may drive and manage a PDCP discard timer for each IP packet at operation 1015. If the timer expires, the terminal discards a PDCP PDU or a PDCP SDU corresponding to the timer from the first buffer at operation 1020. If the PDCP PDU corresponding to the timer is sent to an RLC layer at operation 1025, the PDCP layer may transmit a discard indicator corresponding to the PDCP PDU to the RLC layer at operation 1030. The discard indicator may indicate a memory address of the PDCP PDU sent to the RLC layer for the second buffer, the PDCP serial number, or mapping information on the PDCP PDU.

Further, if ACK/NACK information on the PDCP PDUs is received from the PDCP layer of the receiving end through a PDCP status report, the PDCP layer may discard the acknowledged PDCP PDUs from the first buffer. Further, if there exists an unexpired timer corresponding to the discarded PDCP PDUs, the PDCP layer may stop and discard the timer at operation 1020. Further, the PDCP layer may receive from the RLC layer information on the PDCP PDUs concatenated to the RLC PDUs having received the RLC ACK. Since the PDCP PDUs mean that they have been successfully transferred to the receiving end, it is not necessary to store them in the first buffer any more, and the PDCP layer discards them, the corresponding information, and the mapping table information. If there exists an unexpired timer, the PDCP layer may stop and discard the timer at operation 1020. In case of managing the first buffer based on the RLC ACK, it is significant to differently manage the first buffer in accordance with the PDCP layer operation of the terminal during a handover.

As a first case, the terminal may perform the PDCP layer operation with a network configuration in which the PDCP layer should retransmit the PDCP PDUs to a target base station of the handover again after the lowest PDCP serial number successfully transferred in order up to now during the handover. In this case, if information on the PDCP PDUs concatenated to the RLC PDUs having received the RLC ACK is received, the PDCP layer should store the lowest PDCP serial number having received all the ACKs in the order of PDCP serial numbers. Further, with respect to the PDCP serial numbers that are higher than the lowest PDCP serial number, the PDCP layer should not discard them even if the RLC layer has received the RLC ACK. That is, the PDCP PDUs of which the successful transfer has been identified based on the RLC ACK can be discarded only in the order of their PDCP serial numbers. For example, even if it is identified that PDCP serial numbers 1, 2, 3, 4, 5, 9, and 10 have been successfully transferred from the RLC ACK of the RLC layer, only the PDCP serial numbers 1, 2, 3, 4, and 5 can be discarded from the first buffer together with information related to the corresponding PDCP PDUs and mapping information.

As a second case, the terminal may perform the PDCP layer operation with a network configuration in which the PDCP layer should selectively retransmit the PDCP PDUs having not been successfully transferred up to now to the target base station of the handover. In this case, if information on the PDCP PDUs concatenated to the RLC PDUs having received the RLC ACK is received, the PDCP layer may discard the information corresponding to the PDCP PDUs and the mapping information from the first buffer, and may separately store the information on the PDCP serial numbers having received the ACK in order to use the information during the handover.

Referring to FIG. 10B, the terminal RLC layer operates at operation 1035. If the discard indicator is received from the PDCP layer at operation 1040, a terminal RLC layer may discard the information corresponding to the discard indicator. Specifically, if the PDCP PDU corresponding to the discard indicator has not yet become a part of the RLC PDU in the RLC layer or has not been mapped thereon at operation 1045, the terminal RLC layer discards the corresponding information at operation 1055. The contents of the discard indicator are transferred to the RLC layer, and the terminal RLC layer discards the stored PDCP PDU (RLC SDU), information related to this, and mapping information from the second buffer. If the PDCP PDU indicated by the discard indicator has already become the part of the RLC PDU (1045), the terminal RLC layer does not discard the PDCP PDU and the related information from the second buffer at operation 1050.

If the RLC status report is received from the RLC layer of the receiving end at operation 1040, the RLC layer may identify the ACK/NACK result for each RLC serial number. Further, in case of the acknowledged RLC PDU at operation 1060, the RLC layer discards the RLC PDU from the second buffer, and discards the related mapping information at operation 1065. The RLC layer prepares retransmission for the negatively acknowledged RLC PDU at operation 1075. If the uplink grant is sufficient in case where the RLC PDU for the retransmission is stored in the second buffer during performing of the retransmission, the RLC layer may immediately perform the retransmission, whereas if the uplink grant is insufficient, the RLC layer may perform re-segmentation to transmit the RLC PDU. If the RLC PDU for the retransmission is not stored in the second buffer, but previously generated information (header information and information on concatenated PDCP PDUs) and mapping information are recorded, the RLC layer may dynamically regenerate the RLC PDU based on this to perform the retransmission.

The RLC layer may identify the result of the ACK/NACK for the RLC serial number through the RLC status report, identify mapping table information at operation 1070, and determine the ACK/NACK result for the corresponding PDCP serial number. If the ACK for the PDCP serial number is identified, the RLC layer may transfer the ACK information for the PDCP serial number to the PDCP layer. The PDCP layer may identify the ACK information, and may use the ACK information to discard the corresponding PDCP PDUs from the first buffer.

Accordingly, in the second embodiment of the efficient buffer management method suitable when the LTE system terminal operates in the RLC AM mode, it is featured that the RLC layer discards the RLC PDUs having received the RLC ACK from the second buffer, notifies the PDCP layer of the PDCP PDUs concatenated to the RLC PDUs, discards the corresponding PDCP PDUs from the first buffer, and releases and discards the corresponding information and timer. Accordingly, the buffer can be efficiently managed even with a small-sized buffer to rapidly empty the first buffer, and thus efficiency can be maximized.

FIGS. 11A and 11B are diagrams illustrating operation of a terminal in which an LTE system terminal manages buffers in an RLC UM mode according to an embodiment of the disclosure.

Referring to FIG. 11A, if IP packets are received from an upper layer, a terminal PDCP layer may operate at operation 1101, a PDCP layer may receive an IP packet at operation 1105, the terminal may store the respective IP packets in a first buffer through allocation of memory addresses to the IP packets at operation 1110, and may drive and manage a PDCP discard timer for each IP packet at operation 1115. If the timer expires, the terminal discards a PDCP PDU or a PDCP SDU corresponding to the timer from the first buffer at operation 1120. If the PDCP PDU corresponding to the timer is sent to an RLC layer at operation 1125, the PDCP layer may transmit a discard indicator corresponding to the PDCP PDU to the RLC layer at operation 1130. The discard indicator may indicate a memory address of the PDCP PDU sent to the RLC layer for the second buffer, the PDCP serial number, or mapping information on the PDCP PDU. Further, if ACK/NACK information on the PDCP PDUs is received from the PDCP layer of the receiving end through a PDCP status report, the PDCP layer may discard the acknowledged PDCP PDUs from the first buffer, and if there exists an unexpired timer corresponding to the discarded PDCP PDUs, the PDCP layer may stop and discard the timer at operation 1120. Further, if the RLC PDU is transmitted from the RLC layer and the RLC layer transfers to the PDCP layer information on the PDCP PDUs concatenated to the transmitted RLC PDUs, the PDCP layer may discard the information on the transmitted PDCP PDUs from the first buffer, and if the corresponding timer has not expired, the PDCP layer may release and discard the timer.

Referring to FIG. 11B, a terminal RLC layer may operate at operation 1135. If the discard indicator is received from the PDCP layer at operation 1140, a terminal RLC layer 1135 may discard the information corresponding to the discard indicator. Specifically, if the PDCP PDU corresponding to the discard indicator has not yet become a part of the RLC PDU in the RLC layer or has not been mapped thereon at operation 1145, the terminal RLC layer discards the corresponding information at operation 1155. The contents of the discard indicator are transferred to the RLC layer, and the terminal RLC layer discards the stored PDCP PDU (RLC SDU), information related to this, and mapping information from the second buffer. If the PDCP PDU indicated by the discard indicator has already become a part of the RLC PDU at operation 1145, the terminal RLC layer does not discard the PDCP PDU and the related information from the second buffer at operation 1150.

The RLC layer may receive uplink grant, and may configure RLC PDUs through concatenation and segmentation of the PDCP PDUs. After completing and transferring the RLC PDUs to the MAC layer at operation 1140, the RLC layer discards the RLC PDUs from the second buffer, and discards the related information and the mapping information at operation 1160. That is, in the RLC UM mode, the RLC layer transmits the RLC PDUs, and then discards them together with the related information without directly storing them in the second buffer. This is because the ARQ function is not supported in the RLC UM mode, and thus it is not necessary to record the information for the retransmission. Further, the RLC layer may determine and transfer to the PDCP layer information on the PDCP PDUs concatenated to the transmitted RLC PDUs, and may use the information to manage the first buffer at operation 1165.

Accordingly, in the second embodiment of the efficient buffer management method suitable when the LTE system terminal operates in the RLC UM mode, it is featured that after transmitting the RLC PDUs, the RLC layer does not store the corresponding RLC PDUs in the second buffer, but discards the related information if any, and transmits to the PDCP layer information on the PDCP PDUs concatenated to the RLC PDUs. Even if the PDCP timer has not expired, the PDCP layer immediately discards the information on the PDCP PDUs from the first buffer.

Shared buffer structure of LTE system.

Figure 12:
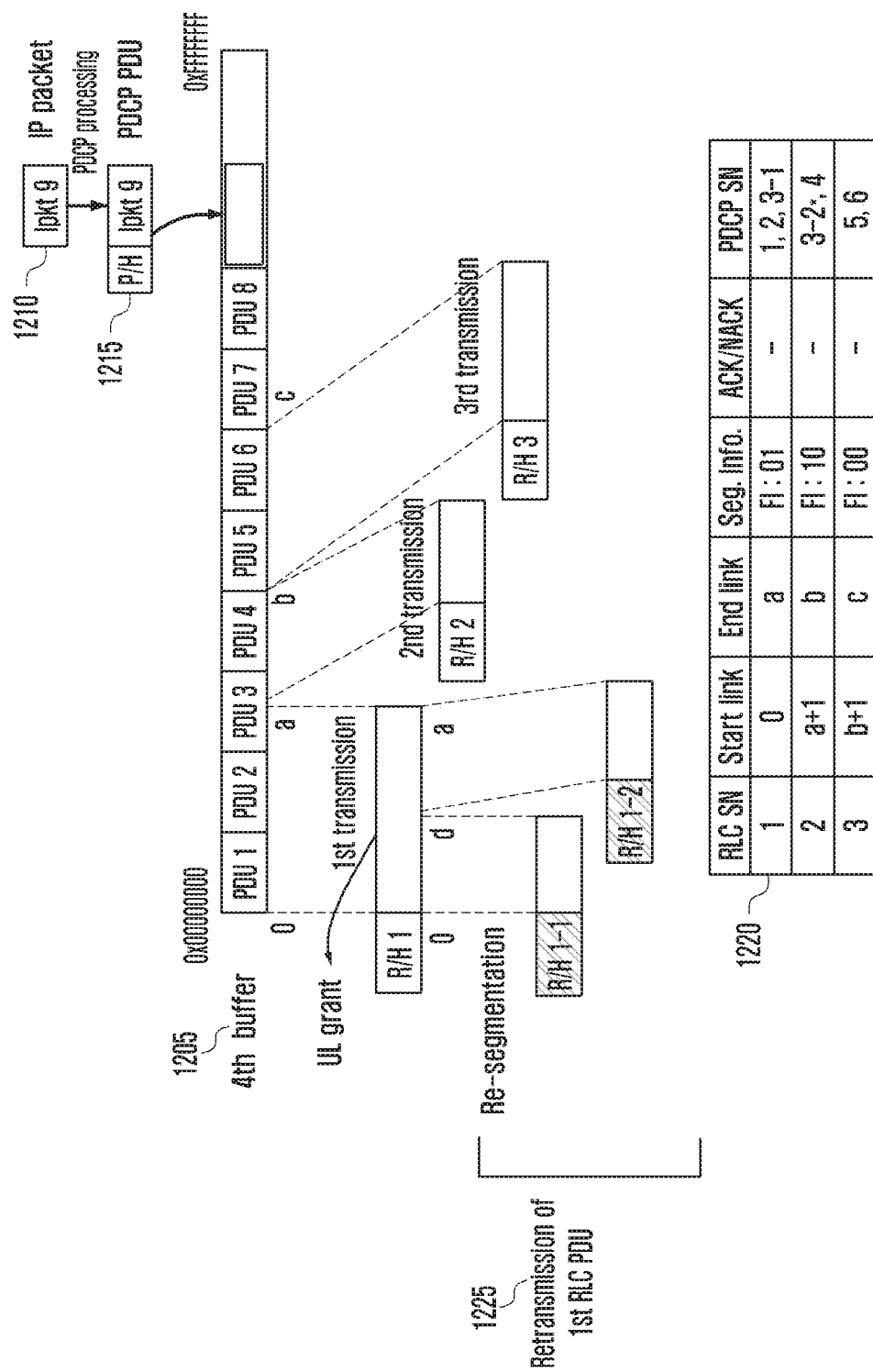
FIG. 12 is a diagram illustrating a mapping table and of a buffer management method suitable when an LTE system terminal operates in an RLC AM mode according to an embodiment of the disclosure.

FIG. 12 is a diagram illustrating mapping table and a buffer management method suitable when an LTE system terminal operates in an RLC AM mode according to an embodiment of the disclosure, and shows a detailed mapping table and a corresponding operation.

Referring to FIG. 12, a terminal has a fourth buffer for each logical channel. The fourth buffer may be an integrated buffer in which the first buffer and the second buffer as illustrated in FIGS. 6 and 7 are shared to be used. Preferably, the fourth buffer may be a shared buffer. Accordingly, through the use of the shared buffer, it is possible to manage the buffer more efficiently. The fourth buffers of the logical channels may be physically divided buffers, or physically the same, but logically divided buffers. In the disclosure, when actually implemented, the buffers include physically or logically dividable buffer structures.

The fourth buffer 1205 may store IP packets (PDCP SDUs) 1210 entering into a PDCP layer, generate a header of the PDCP SDUs, and make a PDCP PDU 1215 by configuring the header together with the PDCP SDUs to store the generated PDCP PDU therein. Further, if an uplink grant is received from the base station, the terminal distributes the uplink grant to the respective logical channels by reflecting the priority or QoS for each logical channel. If the uplink grant is received as described above, the RLC layer concatenates the PDCP PDUs (RLC SDUs) in the fourth buffer to the respective logical channels, inputs length information of the respective PDCP PDUs (RLC SDUs) to a header of the RLC PDUs, and dynamically configures the RLC PDUs 630. If the sizes of the RLC SDUs do not accurately coincide with the uplink grant when the RLC SDUs are concatenated to the uplink grant, the RLC layer may perform a segmentation operation. If the segmentation is performed with respect to the RLC SDUs, the RLC layer inputs the segmentation information to the header of the RLC PDUs. Further, the RLC layer may transmit the completed RLC PDUs to the MAC layer.

Further, the MAC layer may configure one MAC PDU by multiplexing the RLC PDUs received from different logical channels, and may transmit the MAC PDU to the physical layer. Further, for HARQ processing, the MAC layer may store the MAC PDU, and may perform retransmission thereof until an ACK is received.

If the size of the uplink grant is known, the fourth buffer may configure one RLC PDU through concatenation of the PDCP PDUs (RLC SDUs). In the third embodiment of the efficient buffer management method suitable when the LTE system terminal operates in the RLC AM mode proposed in the disclosure, the RLC PDU may not be stored for the retransmission after the RLC PDU is configured and transmitted. Accordingly, in the third embodiment, memory addresses of the concatenated PDCP PDUs during configuration of the RLC PDU in the fourth buffer, segmentation information, and header information are recorded in a mapping table, and if the retransmission is necessary, the RLC PDU is dynamically reconfigured and transmitted with reference to the recorded information.

Once the RLC PDU is configured as described above, the RLC layer may configure a mapping table 1220 based on RLC serial numbers. For example, in order to record information on the PDCP PDUs concatenated to the RLC PDUs corresponding to RLC serial number 1, the RLC layer may record a memory address of the fourth buffer for the concatenated PDCP PDUs. The address of the buffer may be composed of a start link and an end link of the memory address. Further, if the RLC layer has performed a segmentation operation, segmentation information may be recorded. In the segmentation information, as compared with the original RLC SDUs, if a portion excluding a header of the RLC PDU, that is, a payload, coincides with the foremost portion of the RLC SDUs, "0" may be recorded as the first bit of an FI field, whereas if the payload does not coincide with the foremost portion, "1" may be recorded as the first bit of the FI field. As compared with the original RLC SDUs, if the payload coincides with the rearmost portion of the RLC SDUs, "0" may be recorded as the second bit of the FI field, whereas if the payload does not coincide with the rearmost portion, "1" may be recorded as the second bit of the FI field. The RLC layer may record the segmentation information as described above.

Further, the RLC layer of a transmitting end may identify the ACK/NACK result for the respective RLC serial numbers after receiving an RLC status report from the RLC layer of a receiving end, and may record the ACK/NACK for the respective RLC serial numbers. Further, the RLC layer may record information on what PDCP PDUs are concatenated to the RLC PDUs corresponding to the respective RLC serial numbers. That is, information indicating that PDCP serial numbers 1 and 2 and a part of PDCP serial number 3 are concatenated to RLC serial number 1 may be recorded. In case of performing the segmentation operation in the RLC layer, information on respective segments may be marked on the last segment.

The reason why the last segment is marked is to identify what PDCP serial numbers can be considered as an ACK when the ACK is received with respect to a certain RLC serial number. That is, if an ACK is received with respect to RLC serial number 2 after the RLC serial number 2, to which the last segment of PDCP serial number 3 and PDCP serial number 4 are concatenated, is transmitted, the RLC layer may receive an ACK with respect to the last segment of PDCP serial number 3, and thus may consider that it has received the ACK with respect to PDCP serial number 3 and PDCP serial number 4.

Whenever the uplink grant is received, the RLC layer may make an RLC PDU through concatenation and segmentation of PDCP PDUs to transmit the RLC PDU to a lower layer. Further, the RLC layer may transmit and store RLC PDUs in due order. For example, the RLC layer may record the information as mapping table information, such as mapping table 1220. If a NACK is received with respect to RLC serial number 1 in an RLC status report received from the RLC layer of the receiving end, the RLC layer prepares retransmission. In this case, if the uplink grant for the retransmission is smaller than that at the beginning, the RLC layer performs re-segmentation, newly configures a header for the segmented RLC PDUs, and transmits the configured RLC PDUs. Further, the RLC layer may separately record information on the retransmitted RLC PDU at operation 1225.

The operation of the fourth buffer is as follows.

If IP packets are received from an upper layer, the PDCP layer may store the respective IP packets in the fourth buffer through allocation of memory addresses to the respective IP packets. Further, the PDCP layer may drive and manage a PDCP discard timer for each IP packet. A timer value may be configured by a network. That is, when the terminal configures an RRC connection, the timer value may be configured by the network through an RRC message. If the timer expires, the terminal discards the PDCP PDU or the PDCP SDU corresponding to the timer from the fourth buffer. If the PDCP PDU corresponding to the timer is sent to the RLC layer, the PDCP layer may transmit a discard indicator corresponding to the PDCP PDU to the RLC layer. The discard indicator may indicate the PDCP PDU serial number transmitted to the RLC layer or mapping information for the PDCP PDU. Further, if ACK/NACK information on the PDCP PDUs is received from the PDCP layer of the receiving end through a PDCP status report, the PDCP layer may discard the acknowledged PDCP PDUs from the fourth buffer, and if an unexpired timer corresponding to the discarded PDCP PDUs exists, it may stop and discard the timer. Further, the PDCP layer may receive from the RLC layer information on the PDCP PDUs concatenated to the RLC PDUs having received the RLC ACK. Since the PDCP PDUs mean that they have been successfully transferred to the receiving end, it is not necessary to store them in the fourth buffer any more. Accordingly, the information stored in the fourth buffer may be discarded. Specifically, information corresponding to the PDCP PDUs successfully transferred to the receiving end and mapping table information may be discarded, and if there exists an unexpired timer, the timer may also be stopped and discarded. In case of managing the fourth buffer based on the RLC ACK, it is significant to differently manage the fourth buffer in accordance with the PDCP layer operation of the terminal during a handover.

As a first case, the terminal may perform the PDCP layer operation with a network configuration in which the PDCP layer should retransmit the PDCP PDUs to a target base station of the handover again after the lowest PDCP serial number successfully transferred in order up to now during the handover. In this case, if information on the PDCP PDUs concatenated to the RLC PDUs having received the RLC ACK is received, the PDCP layer should store the lowest PDCP serial number having received all the ACKs in the order of PDCP serial numbers. Further, with respect to the PDCP serial numbers that are higher than the lowest PDCP serial number, the PDCP layer should not discard them even if the RLC layer has received the RLC ACK. That is, the PDCP PDUs of which the successful transfer has been identified based on the RLC ACK can be discarded only in the order of their PDCP serial numbers. For example, even if it is identified that PDCP serial numbers 1, 2, 3, 4, 5, 9, and 10 have been successfully transferred from the RLC ACK of the RLC layer, only the PDCP serial numbers 1, 2, 3, 4, and 5 can be discarded from the fourth buffer together with information related to the corresponding PDCP PDUs and mapping information.

As a second case, the terminal may perform the PDCP layer operation with a network configuration in which the PDCP layer should selectively retransmit the PDCP PDUs having not been successfully transferred up to now to the target base station of the handover. In this case, if information on the PDCP PDUs concatenated to the RLC PDUs having received the RLC ACK is received, the PDCP layer may discard the information corresponding to the PDCP PDUs and the mapping information from the fourth buffer, and may separately store the information on the PDCP serial numbers having received the ACK in order to use the information during the handover.

If the discard indicator is received from the PDCP layer, the RLC layer may discard the corresponding information in a state where the PDCP PDU corresponding to the discard indicator has not yet become a part of the RLC PDU or has not been mapped thereon. Specifically, the RLC layer discards information related to the PDCP PDU (RLC SDU) transferred to and stored in the RLC layer and mapping information. If the PDCP PDU indicated by the discard indicator has already become the part of the RLC PDU, the RLC layer does not discard the PDCP PDU and the related information. This is because if the PDCP PDU that has already become the part of the RLC PDU is discarded, a gap occurs in the RLC serial number to cause a transmission delay. The receiving end is unable to discriminate whether the corresponding RLC serial number is lost in the transmission process or is discarded by the discard indicator in the transmitting end.

If the RLC status report is received from the RLC layer of the receiving end, the RLC layer may identify the ACK/NACK result for each RLC serial number, and in case of the acknowledged RLC PDU, the RLC layer discards the mapping information related to this. The RLC layer prepares retransmission for the negatively acknowledged RLC PDU. If the uplink grant is sufficient in case where the retransmission is performed, the RLC layer may dynamically regenerate and retransmit the RLC PDU using the mapping table information, whereas if the uplink grant is insufficient, the RLC layer may perform re-segmentation at operation 1225 and dynamically regenerate and transmit the RLC PDUs.

The RLC layer may identify the result of the ACK/NACK for the RLC serial number through the RLC status report, identify mapping table information 1220, and determine the ACK/NACK result for the corresponding PDCP serial number. If the ACK for the PDCP serial number is identified, the RLC layer may transfer the ACK information for the PDCP serial number to the PDCP layer. The PDCP layer may identify the ACK information, and may record the ACK/NACK information for each PDCP serial number. The ACK information for the PDCP serial numbers may be used during a handover. When a terminal handover occurs, the PDCP layer may perform retransmission to a target base station of the handover, starting from the PDCP serial number after the lowest PDCP serial number having received all the ACKs in the order of serial numbers. If the network supports a selective retransmission during the handover, the PDCP layer may retransmit only negatively acknowledged PDCP PDUs to the target base station of the handover.

In a fourth embodiment of an efficient buffer management method suitable when an LTE system terminal operates in an RLC AM mode according to the disclosure, it is featured that the fourth buffer is not independently managed by the PDCP layer, but is managed by reflecting the RLC ACK result of the RLC layer. Further, in a fourth embodiment of an efficient buffer management method suitable when the LTE system terminal operates in an RLC UM mode, it is featured that the fourth buffer is not independently managed by the PDCP layer, but is managed by reflecting whether to transmit the RLC PDU in the RLC layer.

If an RLC status report is received from the receiving end RLC device and an ACK for RLC PDUs is received in an RLC AM mode, it is not necessary for the RLC device to have information corresponding to the acknowledged RLC PDUs and mapping table information any further, and it is reasonable for the RLC device to discard them from the fourth buffer. Further, if the PDCP PDUs concatenated to the RLC PDUs having received the ACK exist in the fourth buffer, even such information is not to be used for retransmission, and thus it is not necessary for the RLC layer to have them any further even if a PDCP discard timer has not yet expired.

Accordingly, in the third embodiment of the efficient buffer management method suitable when the LTE system terminal according to the disclosure operates in the RLC AM mode, it is featured that the RLC layer discards information on the RLC PDUs having received the RLC ACK from a mapping table, notifies the PDCP layer of the PDCP PDUs concatenated to the RLC PDUs, discards the corresponding PDCP PDUs from the fourth buffer, releases and discards the corresponding information and timer.

A third embodiment of an efficient buffer management method suitable when an LTE system terminal having the structure as shown in FIG. 12 operates in an RLC UM mode is as follow.

When operating in the RLC UM mode, the terminal according to the disclosure has the structure as shown in FIG. 12, and operates in a similar manner to that as described above with reference to FIG. 12. However, different from the RLC AM mode, an ARQ function is not supported in the RLC UM mode, and thus retransmission is not performed. Further, an RLC status report is not performed. Accordingly, it is not necessary to record already transmitted RLC PDUs or related information, and mapping table information for the retransmission. This is the greatest difference between the RLC UM mode and the RLC AM mode.

In the disclosure, a third embodiment of a method in which an LTE system terminal in an RLC UM mode efficiently manages buffers is as follows.

If IP packets are received from an upper layer, the PDCP layer may store the respective IP packets in the fourth buffer 1205 through allocation of memory addresses to the IP packets. Further, the PDCP layer may drive and manage a PDCP discard timer for each IP packet. A timer value may be configured by a network. For example, when the terminal configures an RRC connection, the timer value may be configured by the network through an RRC message. If the timer expires, the terminal discards the PDCP PDU or the PDCP SDU corresponding to the timer from the fourth buffer. If the PDCP PDU corresponding to the timer is sent to the RLC layer, the PDCP layer may transmit a discard indicator corresponding to the PDCP PDU to the RLC layer. The discard indicator may indicate the memory address of the PDCP PDU sent to the RLC layer or mapping information on the PDCP PDU.

Further, if ACK/NACK information on the PDCP PDUs is received from the PDCP layer of the receiving end through a PDCP status report, the PDCP layer may discard the acknowledged PDCP PDUs from the fourth buffer, and if an unexpired timer corresponding to the discarded PDCP PDUs exists, it may stop and discard the timer.

If the discard indicator is received from the PDCP layer, the RLC layer may discard the information corresponding to the discard indicator. Specifically, if the PDCP PDU corresponding to the discard indicator has not yet become a part of the RLC PDU in the RLC layer or has not been mapped thereon, the RLC layer discards the corresponding information. The contents of the discard indicator are transferred to the RLC layer, and the RLC layer discards information related to the stored PDCP PDU (RLC SDU) and mapping information.

If the PDCP PDU indicated by the discard indicator has already become a part of the RLC PDU, the RLC layer does not discard the related information. This is because if the PDCP PDU that has already become the part of the RLC PDU is discarded, a gap occurs in the RLC serial number to cause a transmission delay. That is, the receiving end is unable to discriminate whether the corresponding RLC serial number is lost in the transmission process or is discarded by the discard indicator in the transmitting end.

The RLC layer may receive uplink grant, and may configure RLC PDUs through concatenation and segmentation of the PDCP PDUs. Further, after completing and transferring the RLC PDUs to a MAC layer, the RLC layer discards information related to the RLC PDUs and mapping information. In the RLC UM mode, the RLC layer transmits the RLC PDUs, and then discards them together with the related information without storing them. This is because the ARQ function is not supported in the RLC UM mode, and thus it is not necessary to record the information for the retransmission.

In the RLC UM mode, the ARQ function is not supported, and thus it is not necessary to store the corresponding information after the RLC PDUs are transmitted for the retransmission. Accordingly, after transmitting the RLC PDUs, the RLC layer does not store the corresponding RLC PDUs in the fourth buffer, but discards the related information if any. Further, once the RLC PDUs are transmitted, it is not necessary for the RLC layer to have the PDCP PDUs concatenated to the RLC PDUs any further even if the PDCP discard timer has not yet expired.

Accordingly, in the third embodiment of the efficient buffer management method suitable when the LTE system terminal according to the disclosure operates in the RLC UM mode, the RLC layer may not store the corresponding RLC PDUs in the fourth buffer and the mapping table after transmitting the RLC PDUs. Further, if the related information exists, the RLC layer discards the information, and may transmit information on the PDCP PDUs concatenated to the RLC PDUs to the PDCP layer. If the information on the PDCP PDUs is received, the PDCP layer immediately discards the information on the PDCP PDUs from the fourth buffer even if the PDCP discard timer has not yet expired.

Figure 13A:
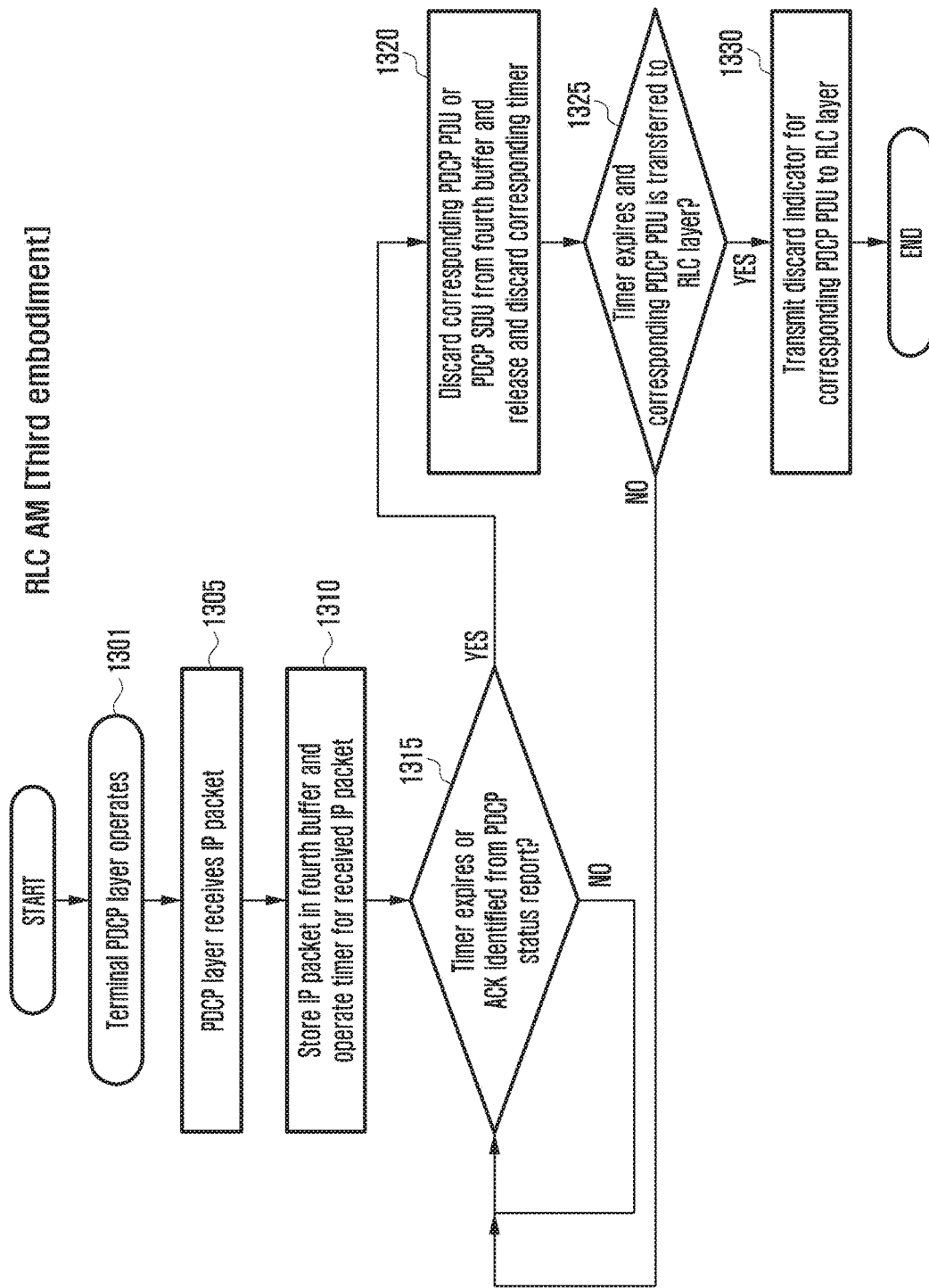
FIGS. 13A and 13B are diagrams illustrating operation of a terminal in which an LTE system terminal manages buffers in an RLC AM mode according to an embodiment of the disclosure.
Figure 13B:
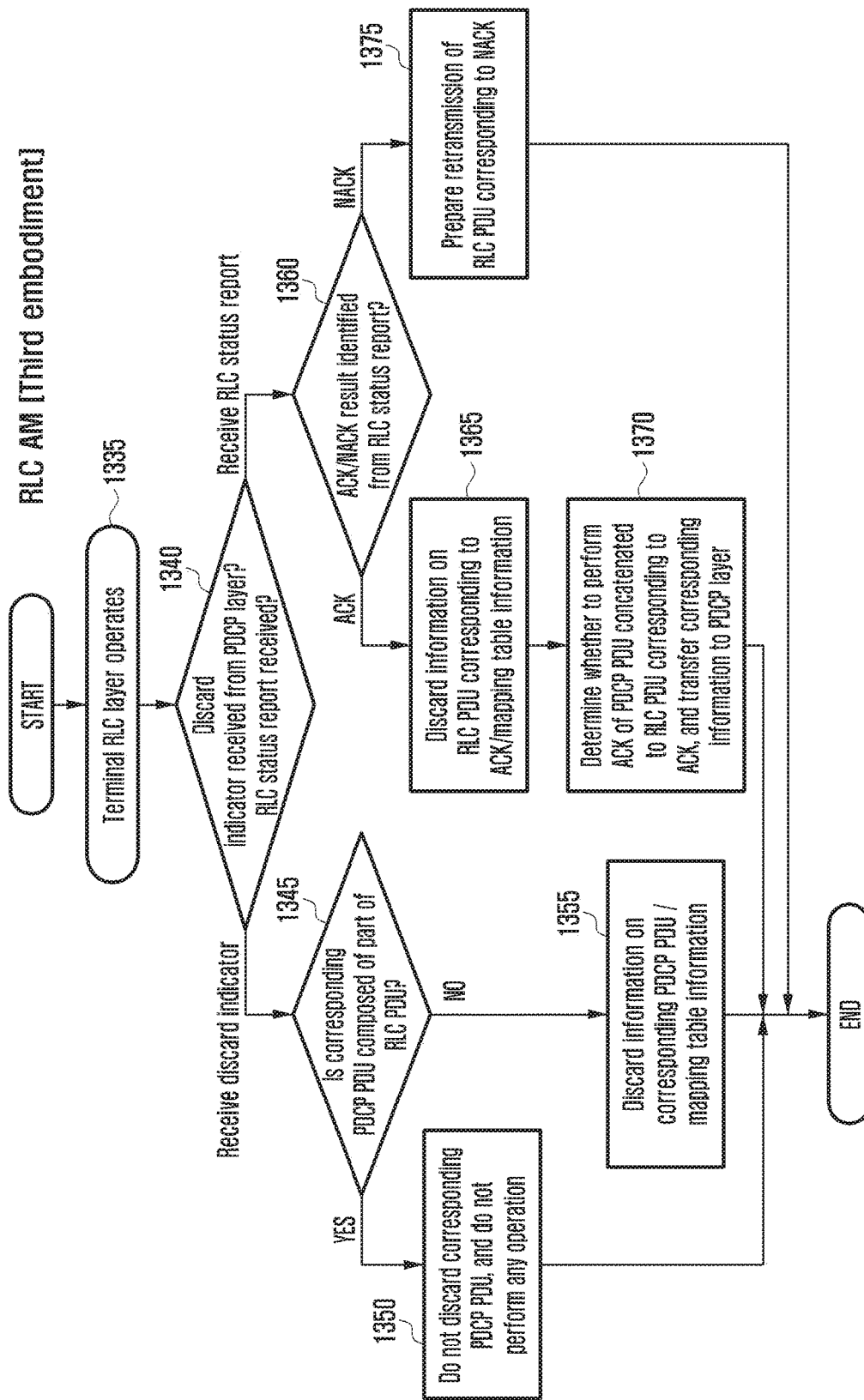

FIGS. 13A and 13B are diagrams illustrating operation of a terminal in which an LTE system terminal manages buffers in an RLC AM mode according to an embodiment of the disclosure.

Referring to FIG. 13A, if IP packets are received from an upper layer, a terminal PDCP layer may operate at operation 1301, the PDCP layer may receive an IP packet at operation 1305, and the terminal may store the respective IP packets in a fourth buffer through allocation of memory addresses to the IP packets at operation 1310. Further, the terminal PDCP layer may drive and manage a PDCP discard timer for each IP packet at operation 1315. If the timer expires, the terminal discards a PDCP PDU or a PDCP SDU corresponding to the timer from the first buffer at operation 1320. If the PDCP PDU corresponding to the timer is transmitted to an RLC layer at operation 1325, the PDCP layer may transmit a discard indicator corresponding to the PDCP PDU to the RLC layer at operation 1330. The discard indicator may indicate the PDCP PDU serial number transmitted to the RLC layer, or mapping information on the PDCP PDU.

Further, if ACK/NACK information on the PDCP PDUs is received from the PDCP layer of the receiving end through a PDCP status report, the PDCP layer may discard the acknowledged PDCP PDUs from the fourth buffer. Further, if there exists an unexpired timer corresponding to the discarded PDCP PDUs, the PDCP layer may stop and discard the timer at operation 1320. Further, the PDCP layer may receive from the RLC layer information on the PDCP PDUs concatenated to the RLC PDUs having received the RLC ACK. Since the PDCP PDUs mean that they have been successfully transferred to the receiving end, it is not necessary to store them in the fourth buffer any more, and the PDCP layer may discard them.

Further, the PDCP layer discards information corresponding to the discarded PDCP PDU and mapping table information. If there exists an unexpired timer, the PDCP layer may stop and discard the timer at operation 1320. In case of managing the fourth buffer based on the RLC ACK, it is significant to differently manage the fourth buffer in accordance with the PDCP layer operation of the terminal during a handover.

As a first case, the terminal may perform the PDCP layer operation with a network configuration in which the PDCP layer should retransmit the PDCP PDUs to a target base station of the handover again after the lowest PDCP serial number successfully transferred in order up to now during the handover. In this case, if information on the PDCP PDUs concatenated to the RLC PDUs having received the RLC ACK is received, the PDCP layer should store the lowest PDCP serial number having received all the ACKs in the order of PDCP serial numbers. Further, with respect to the PDCP serial numbers that are higher than the lowest PDCP serial number, the PDCP layer should not discard them even if the RLC layer has received the RLC ACK. That is, the PDCP PDUs of which the successful transfer has been identified based on the RLC ACK can be discarded only in the order of their PDCP serial numbers. For example, even if it is identified that PDCP serial numbers 1, 2, 3, 4, 5, 9, and 10 have been successfully transferred from the RLC ACK of the RLC layer, only the PDCP serial numbers 1, 2, 3, 4, and 5 can be discarded from the fourth buffer together with information related to the corresponding PDCP PDUs and mapping information.

As a second case, the terminal may perform the PDCP layer operation with a network configuration in which the PDCP layer should selectively retransmit the PDCP PDUs having not been successfully transferred up to now to the target base station of the handover. In this case, if information on the PDCP PDUs concatenated to the RLC PDUs having received the RLC ACK is received, the PDCP layer may discard the information corresponding to the PDCP PDUs and the mapping information from the fourth buffer, and may separately store the information on the PDCP serial numbers having received the ACK in order to use the information during the handover.

Referring to FIG. 13B, a terminal RLC layer may operate at operation 1335. If the discard indicator is received from the PDCP layer at operation 1340, a terminal RLC layer may discard the information corresponding to the discard indicator. Specifically, if the PDCP PDU corresponding to the discard indicator has not yet become a part of the RLC PDU in the RLC layer or has not been mapped thereon at operation 1345, the terminal RLC layer discards the corresponding information at operation 1355. The contents of the discard indicator are transferred to the RLC layer, and the terminal RLC layer discards information related to the stored PDCP PDU (RLC SDU) and mapping information. If the PDCP PDU indicated by the discard indicator has already become the part of the RLC PDU at operation 1345, the terminal RLC layer does not discard the information related to the PDCP PDU at operation 1350.

If the RLC status report is received from the RLC layer of the receiving end at operation 1340, the RLC layer may identify the ACK/NACK result for each RLC serial number. Further, in case of the acknowledged RLC PDU at operation 1360, the RLC layer discards the related mapping information at operation 1365. The RLC layer prepares retransmission for the negatively acknowledged RLC PDU at operation 1375. If the uplink grant for the retransmission is sufficient during performing of the retransmission, the RLC layer may dynamically regenerate and retransmit the RLC PDU based on the mapping information for the RLC PDU and header information. Further, if the uplink grant is insufficient, the RLC layer may perform re-segmentation at operation 730 to dynamically generate and transmit the RLC PDUs. The RLC layer may identify the result of the ACK/NACK for the RLC serial number through the RLC status report, identify mapping table information at operation 1370, and determine the ACK/NACK result for the corresponding PDCP serial number. If the ACK for the PDCP serial number is identified, the RLC layer may transfer the ACK information for the PDCP serial number to the PDCP layer. The PDCP layer may identify the ACK information, and may use the ACK information to discard the corresponding PDCP PDUs from the fourth buffer.

Accordingly, in the third embodiment of the efficient buffer management method suitable when the LTE system terminal operates in the RLC AM mode according to the disclosure, the RLC layer can discard information on the RLC PDUs having received the RLC ACK and mapping table information. Further, if the RLC layer notifies the PDCP layer of the PDCP PDUs concatenated to the RLC PDUs, the PDCP layer discards the corresponding PDCP PDUs from the fourth buffer, and releases and discards the corresponding information and timer. Accordingly, the buffer can be efficiently managed even with a small-sized buffer to rapidly empty the fourth buffer, and thus efficiency can be maximized.

Figure 14A:
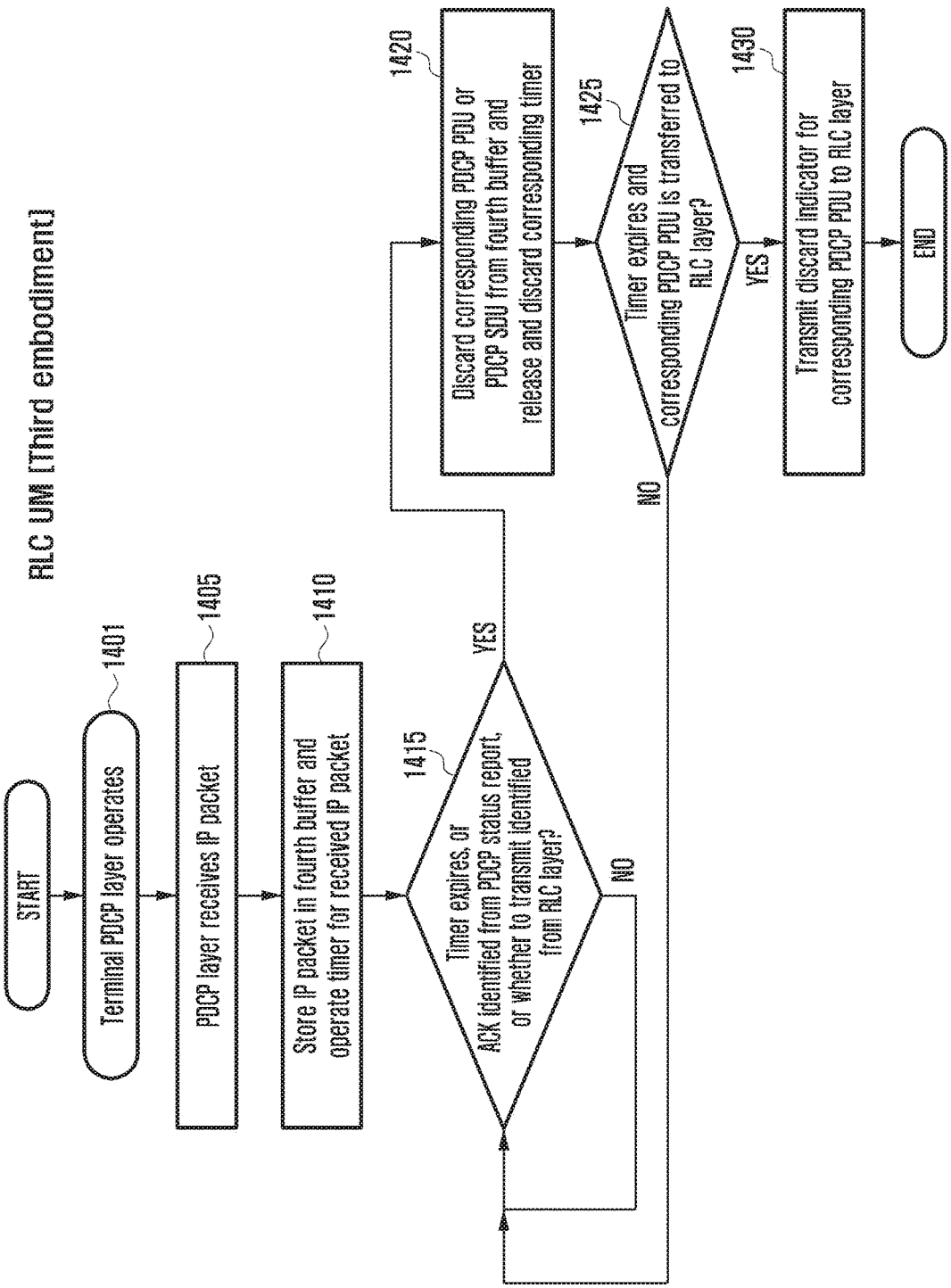

FIGS. 14A and 14B are diagrams illustrating operation of a terminal in which an LTE system terminal manages buffers in an RLC UM mode according to an embodiment disclosure.

Referring to FIG. 14A, if IP packets are received from an upper layer, a terminal PDCP layer may operate at operation 1401, the terminal PDCP layer may receive an IP packet at operation 1405, and the terminal may store the respective IP packets in a fourth buffer through allocation of memory addresses to the IP packets at operation 1410. Further, the terminal PDCP layer may drive and manage a PDCP discard timer for each IP packet at operation 1415. If the timer expires, the terminal discards a PDCP PDU or a PDCP SDU corresponding to the timer from the fourth buffer at operation 1420. If the PDCP PDU corresponding to the timer is transmitted to an RLC layer at operation 1425, the PDCP layer may transmit a discard indicator corresponding to the PDCP PDU to the RLC layer at operation 1430. The discard indicator may indicate a PDCP PDU serial number transmitted to the RLC layer or mapping information on the PDCP PDU.

Further, if ACK/NACK information on the PDCP PDUs is received from the PDCP layer of the receiving end through a PDCP status report, the PDCP layer may discard the acknowledged PDCP PDUs from the fourth buffer, and if there exists an unexpired timer corresponding to the discarded PDCP PDUs, the PDCP layer may stop and discard the timer at operation 1420. Further, if the RLC PDU is transmitted from the RLC layer and the RLC layer transfers to the PDCP layer information on the PDCP PDUs concatenated to the transmitted RLC PDUs, the PDCP layer may discard the information on the transmitted PDCP PDUs from the fourth buffer, and if the corresponding timer has not expired, the PDCP layer may release and discard the timer.

Referring to FIG. 14B, a terminal RLC layer may operate at operation 1435. If the discard indicator is received from the PDCP layer at operation 1440, the terminal RLC layer 1435 may discard the information corresponding to the discard indicator is received at operation 1440. Specifically, if the PDCP PDU corresponding to the discard indicator has not yet become a part of the RLC PDU in the RLC layer or has not been mapped thereon at operation 1445, the terminal RLC layer discards the corresponding information at operation 1455. The contents of the discard indicator are transferred to the RLC layer, and the terminal RLC layer discards information related to the stored PDCP PDU (RLC SDU) and mapping information. If the PDCP PDU indicated by the discard indicator has already become a part of the RLC PDU at operation 1445, the terminal RLC layer does not discard the information related to the PDCP PDU at operation 1450.

The RLC layer may receive uplink grant, and may configure RLC PDUs through concatenation and segmentation of the PDCP PDUs. After completing and transferring the RLC PDUs to a MAC layer at operation 1440, the RLC layer discards information related to the RLC PDUs and mapping information at operation 1460. In the RLC UM mode, the RLC layer transmits the RLC PDUs, and then discards the related information, if any, without storing them. This is because the ARQ function is not supported in the RLC UM mode, and thus it is not necessary to record the information for the retransmission. Further, the RLC layer may determine and transfer to the PDCP layer information on the PDCP PDUs concatenated to the transmitted RLC PDUs, and may use the information to manage the fourth buffer at operation 1465.

Accordingly, in the third embodiment of the efficient buffer management method suitable when the LTE system terminal operates in the RLC UM mode, the RLC layer transmits the RLC PDUs, and then discards related information, if any, without storing the corresponding RLC PDUs. Further, the RLC layer may transmit to the PDCP layer information on the PDCP PDUs concatenated to the RLC PDUs. Even if the PDCP timer has not expired, the PDCP layer immediately discards the information on the PDCP PDUs from the fourth buffer.

Buffer structure of next-generation mobile communication system and retransmission acceleration.

In the fore portion of the disclosure, methods for efficiently managing buffers in an LTE system have been proposed and described. In the remaining portion of the disclosure, structures and methods for efficiently managing buffers and accelerating retransmission in a next-generation mobile communication system are proposed.

Figure 15A:
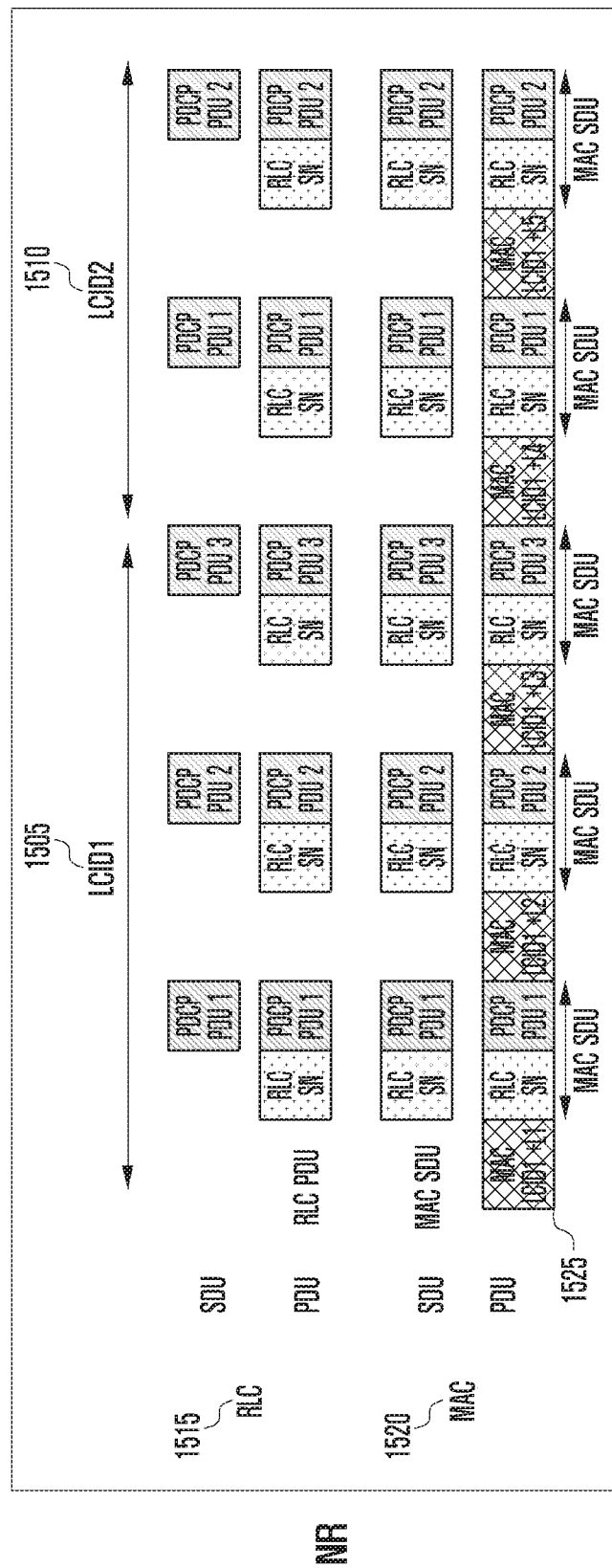
FIGS. 15A and 15B are diagrams illustrating a data processing structure in a next-generation mobile communication system according to an embodiment of the disclosure.
Figure 15B:
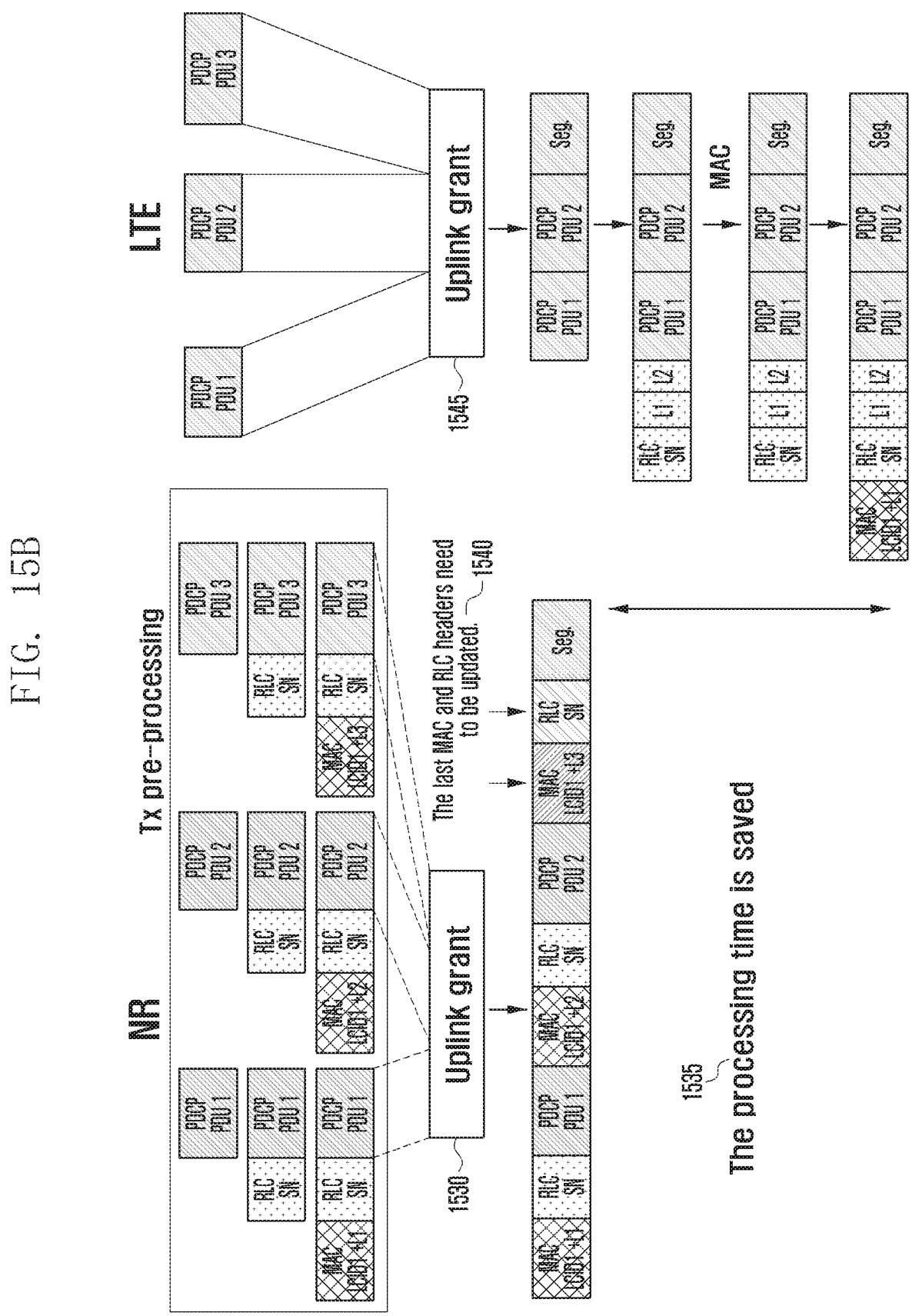

FIGS. 15A and 15B are diagrams illustrating a data processing structure in a next-generation mobile communication system according to an embodiment of the disclosure.

Referring to FIGS. 15A and 15B, a next-generation mobile communication system performs PDCP-layer and RLC-layer data processing for logical channels. That is, logical channel 1 1505 and logical channel 2 1510 have different PDCP layers and RLC layers, and perform independent data processing. Further, the next-generation mobile communication system transfers RLC PDUs generated from RLC layers 1515 of the respective logical channels to a MAC layer 1520 to configure one MAC PDU, and transmits the MAC PDU to a receiving end. In the next-generation mobile communication system, the PDCP layer, the RLC layer, and the MAC layer may include the functions as described above with reference to FIG. 4, and may perform operations corresponding to the functions.

In the next-generation mobile communication system, it is featured that the RLC layer does not concatenate the PDCP PDUs. Further, in the next-generation mobile communication system, a MAC PDU structure, such as reference numeral 1525, is featured to have a structure having MAC sub-headers for each MAC SDU, in other words, a structure in which the MAC sub-headers are repeated in the unit of MAC SDU. Accordingly, in the next-generation mobile communication system, data preprocessing may be performed before uplink grant is received at operation 1530.

For example, if the PDCP layer receives IP packets, a terminal of the next-generation mobile communication system, before receiving uplink grant, may perform PDCP processing (ciphering) and integrity protection with respect to the received IP packets, and may generate a PDCP PDU through generation of a PDCP header. Further, the terminal may configure an RLC PDU by configuring an RLC header through transfer of the PDCP PDUs to the RLC layer, and may pre-configure a MAC sub-header and MAC SDUs by transferring the RLC PDU to the MAC layer.

If the terminal receives the uplink grant at operation 1530, it may configure a MAC PDU by bring the MAC sub-header and MAC SDUs to the extent that matches the size of the uplink grant. In contrast, if the uplink grant is insufficient, the terminal may perform a segmentation operation in order to fill up full and efficiently use transmission resources. The terminal may update the RLC header (segmented information or length information) and the MAC header (L field, length changed) corresponding to the segmented data at operation 1540. Accordingly, as compared with the LTE system, if it is assumed that the uplink grant, such as operation 1530 and operation 1545, is received at the same time, the next-generation mobile communication system can have a great gain in processing time, such as reference numeral 1535. If needed, or if configured in the network, the RLC layer and the PDCP layer may use one common serial number.

The preprocessing may be performed for each logical channel, and RLC PDUs preprocessed for each logical channel may be preprocessed again as MAC SDUs and a MAC sub-header by the MAC layer. Further, if the MAC layer receives the uplink grant at operation 1530, the terminal may multiplex the pre-generated MAC SDUs and a MAC sub-header by allocating the uplink grant for each logical channel.

After the MAC layer receives the uplink grant from a base station, the terminal may perform LCP, and may divide the uplink grant for each logical channel. Further, the terminal may configure one MAC PDU by multiplexing MAC SDUs and a MAC sub-header generated for each logical channel, and transfer the MAC PDU to a physical layer. If the uplink grant allocated to each logical channel is insufficient, segmentation may be requested with respect to the RLC layer. Accordingly, if the RLC layer performs the segmentation operation, segmentation information included in a header may be updated. Further, if the RLC layer transfers the updated information to the MAC layer again, the MAC layer may update the corresponding MAC header. As described above, the next-generation mobile communication system has a feature that data processing of the PDCP layer, RLC layer, and MAC layer starts before the uplink grant is received.

Since the next-generation mobile communication system has the above-described structure, several RLC PDUs may enter into one MAC PDU. In the LTE system, since the RLC layer has a concatenation function, several PDCP PDUs are concatenated to make one RLC PDU to be sent to the MAC layer, and one MAC PDU normally includes RLC PDUs as many as the number of logical channels (in the LTE system, the number of logical channels is generally about 2 to 4).

However, in the next-generation mobile communication system, the RLC layer does not have an RLC concatenation function, and thus one PDCP PDU is generated as one RLC PDU. Accordingly, one MAC PDU may include RLC PDUs the number of which corresponds to multiplication of the number of IP packets (PDCP SDUs) by the number of logical channels. Through a simple arithmetic calculation, one MAC PDU may include about 4 RLC PDUs at most in the LTE system, whereas one MAC PDU may include not less than 500 RLC PDUs in the next-generation mobile communication system. Accordingly, in the next-generation mobile communication system, if one MAC PDU is lost, it becomes necessary to retransmit several hundreds of RLC PDUs. Accordingly, the RLC layer should retransmit several hundreds of RLC PDUs, and this may cause a severe transmission delay. Accordingly, in the disclosure, structures and methods capable of accelerating the retransmission in the next-generation mobile communication system are proposed.

In the next-generation mobile communication system, the RLC layer may operate in an RLC acknowledged mode (RLC AM), an RLC unacknowledged mode (RLC UM), and an RLC transparent mode (RLC TM). IN the RMC AM mode, the RLC layer supports an ARQ function, the transmitting end can receive an RLC status report from the receiving end, and the transmitting end can retransmit negatively acknowledged RLC PDUs using the status report. Accordingly, errorless reliable data transmission is guaranteed. Accordingly, the RLC AM mode is suitable to services requiring high reliability.

In contrast, in the RLC UM mode, the ARQ function is not supported. Accordingly, in the RLC UM mode, the transmitting end does not receive the RLC status report from the receiving end, and does not perform the retransmission function. In the RLC UM mode, if the uplink grant is received, the RLC layer of the transmitting end serves to concatenate the PDCP PDUs (RLC SDUs) received from an upper layer and to continuously transfer the concatenated PDCP PDUs to a lower layer. Accordingly, continuous data transmission without transmission delay becomes possible, and thus the RLC UM mode is useful to services that are sensitive to the transmission delay. In the RLC TM mode, the RLC layer directly transmits the PDCP PDUs received from the upper layer to the lower layer without performing any process. In the TM mode of the RLC layer, data from the upper layer is transparently transferred from the RLC layer to the lower layer. Accordingly, the RLC TM mode can be usefully used when transmitting system information or a paging message transmitted through a common channel such as a CCCH.

In the disclosure, the PDCP layer and the RLC layer handle an efficient buffer management method and a retransmission acceleration method, and thus the RLC AM mode and the RLC UM mode excluding the mode in which the RLC layer does not perform any processing, such as the RLC TM mode, will now be described in detail.

Buffer structure in RLC AM/TM of next-generation mobile communication system and retransmission acceleration.

Figure 16:
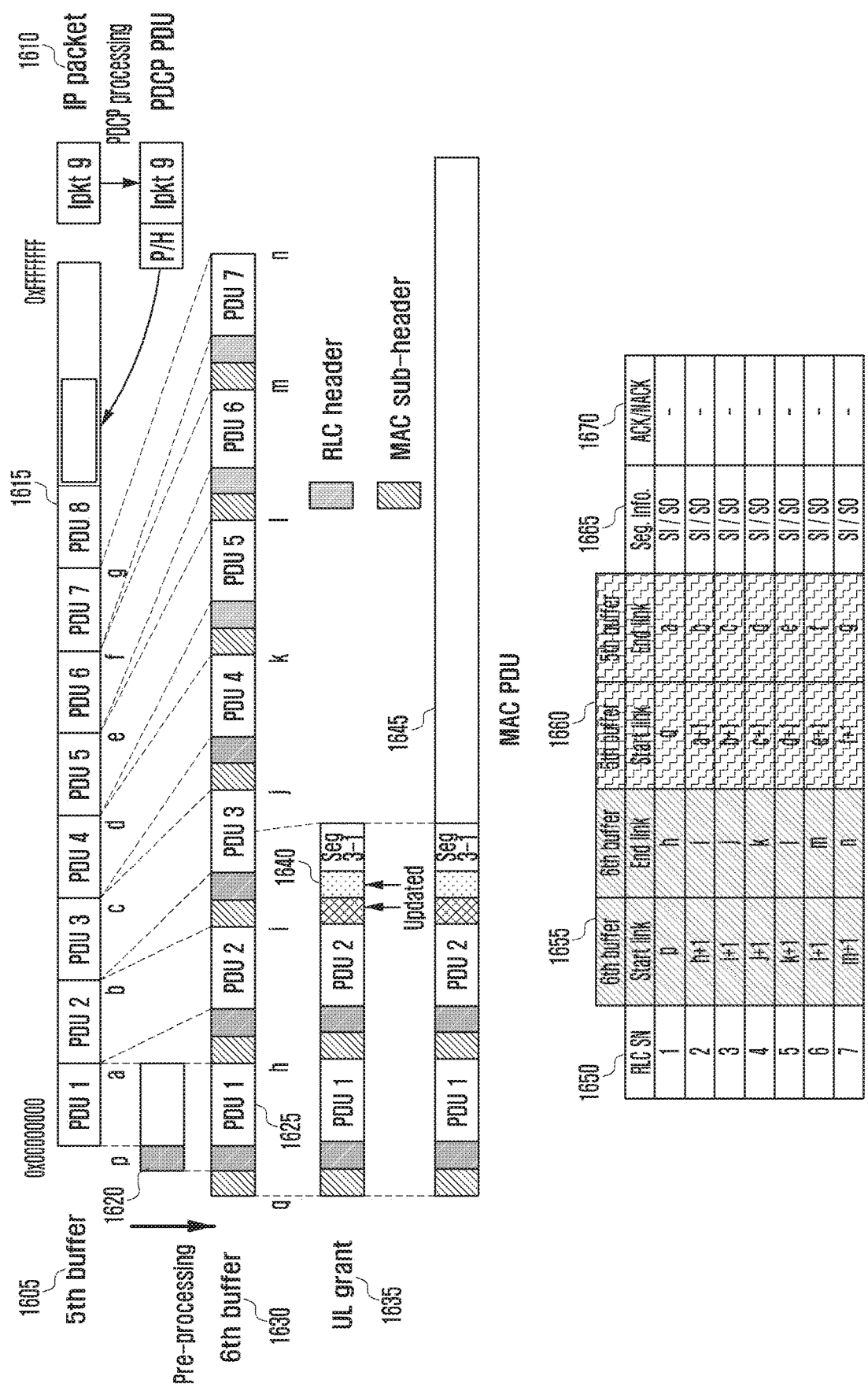
FIG. 16 is a diagram illustrating a mapping table and a retransmission acceleration method suitable when a next-generation mobile communication system terminal operates in an RLC AM mode proposed according to an embodiment of the disclosure.

FIG. 16 is a diagram illustrating a mapping table and a retransmission acceleration method suitable when a next-generation mobile communication system terminal operates in an RLC AM mode according to an embodiment of the disclosure.

Referring to FIG. 16, a terminal has a fifth buffer and a sixth buffer for respective logical channels. For convenience, FIG. 16 explains one logical channel. The fifth and sixth buffers of the logical channels may be physically divided buffers, or physically the same, but logically divided buffers. Preferably, the fifth buffer may be a PDCP buffer, and the sixth buffer may be a MAC buffer. In the disclosure, when actually implemented, the buffers include physically or logically dividable buffer structures.

The terminal may store IP packets (PDCP SDUs) 1610 entering into a PDCP layer, and may generate a header of the PDCP SDUs. Further, the terminal may make a PDCP PDU 1615 by configuring the generated header together with the PDCP SDUs to store them in the fifth buffer 1605. Further, the terminal may perform data preprocessing before receiving uplink grant from the base station. Specifically, the terminal may configure an RLC PDU 1620 by generating an RLC header with respect to the PDCP PDUs in the fifth buffer, configure MAC sub-headers with respect to the RLC PDUs (MAC SDUs), and store the MAC SDUs and the MAC sub-headers together in the sixth buffer 1630 at operation 1625. However, if all the PDCP PDUs are preprocessed to the MAC SDUs and MAC sub-headers, the sixth buffer may require a large capacity. Accordingly, in the disclosure, the data preprocessing of the PDCP PDUs may be performed only up to the maximum transport block (TB) size supported by the terminal and the network.

For example, the terminal may preprocess data only up to a moment when the sum of sizes of the data-preprocessed MAC SDUs and MAC sub-headers exceeds the maximum TB size (this is because the size of the PDECP PDU is variable, and thus the sum of the sizes of the MAC SDUs and MAC sub-headers may not coincide with the maximum TB size). Further, the terminal may preprocess data only to the extent approximating the maximum TB size. For example, if the size of the data-preprocessed MAC SDUs and MAC sub-headers (stored for being transmitted to the sixth buffer) approximately becomes the maximum TB size, the terminal may not perform the data preprocessing any further.

If the RLC PDU is generated during the data preprocessing, the terminal may allocate an RLC serial number, preprocess a memory address 1655 of the fifth buffer for the PDCP PDUs constituting the RLC PDU and the MAC SDUs and MAC sub-headers corresponding to the RLC PDU, and store a memory address 1660 of the sixth buffer in the mapping table 1650. If necessary, the terminal may store the corresponding PDCP serial number. However, in the next-generation mobile communication system, if the PDCP serial number and the RLC serial number are the same, the PDCP serial number or the RLC serial number may be omitted. Further, in the next-generation mobile communication system, even if the PDCP layer and the RLC layer use one common serial number, the PDCP serial number or the RLC PDCP serial number may be omitted.

If an uplink grant is received, the terminal distributes the uplink grant to the respective logical channels by reflecting priorities or QoS for the respective logical channels. If the uplink grant 1635 is received, the terminal configures a part of a MAC PDU 1645 by bringing data to the extent corresponding to the uplink grant in the unit of MAC sub-header and MAC SDU from the sixth buffer. Further, with respect to other logical channels, the terminal may complete one MAC PDU 1645 by multiplexing the MAC sub-header 1640 and MAC SDUs received through the above-described procedure, and may transmit the MAC PDU to a physical layer.

If the sizes of the MAC sub-headers and the MAC SDUs do not accurately coincide with each other when data is added to the uplink grant in the unit of the MAC sub-header and MAC SDU for each logical channel, the RLC layer may perform a segmentation operation with respect to the last RLC SDU that becomes inconsistent with the sizes. If the segmentation is performed with respect to the RLC SDUs, the RLC layer may newly input and update the segmentation information to the header of the RLC PDUs. Further, with respect to the completed RLC PDU, the MAC layer may newly update a new MAC sub-headers and may configure MAC sub-headers and MAC SDUs to match the uplink grant.

If the RLC layer performs the segmentation operation as described above, information on a header field for the segmentation operation may be recorded in a mapping table at operation 1665. However, if unnecessary, such recording may be omitted. The RLC SDU segmentation operation as described above is featured so that the segmented RLC PDU has a segmentation information field indicating whether the segmented segment is the first, intermediate, or last segment in a state where the segmented RLC PDUs maintain the same RLC serial number, and a field including an offset indicating what location of the original RLC SDU the segment corresponds to.

If an ACK/NACK is identified through an RLC status report received from the RLC layer of the receiving end, the terminal may record this information in the mapping table at operation 1670. If it is necessary to retransmit the negatively acknowledged RLC PDUs, the RLC layer of the transmitting end may immediately perform the retransmission by accessing memory addresses of the previously made and transmitted MAC SDUs and MAC sub-headers corresponding to the RLC PDUs using memory address information of the sixth buffer in mapping table 1650. If the uplink grant is large enough to include all the RLC PDUs for which the retransmission should be performed, the retransmission may be performed using the MAC SDUs and MAC sub-headers stored in the sixth buffer. In contrast, if the uplink is unable to include all the RLC PDUs for which the retransmission should be performed, the RLC layer performs the segmentation operation with respect to the last MAC SDU (RLC PDU), and the RLC header and the MAC layer perform a procedure of updating the MAC header to perform the retransmission. Further, if it is required to retransmit several successive RLC PDUs at a time, the terminal can perform rapid retransmission with small memory accesses by using the memory address of the sixth buffer in the mapping table 1650. For example, the MAC PDUs can be configured by bringing the several RLC PDUs from the sixth buffers at a time with reference to a start link of the first RLC PDU and an end link of the last RLC PDU among the several successive RLC PDUs. For example, if it is required to retransmit RLC serial numbers 1 to 6, the terminal may identify the memory address 1655 of the sixth buffer from the mapping table 1650, and perform the retransmission using memory addresses 0 to m of the sixth buffer with reference to the start link p of the sixth buffer for the RLC serial number 1 and the end link m for the RLC serial number 6.

In a fourth embodiment of an efficient buffer management method and a retransmission acceleration method suitable when a terminal of the next-generation mobile communication system operates in an RLC AM mode proposed in the disclosure, the terminal may store in the sixth buffer the MAC sub-headers and MAC SDUs for which the data preprocessing of the PDCP PDU stored in the fifth buffer has been performed, and may configure the mapping table based on the RLC serial number for managing them. Further, in the fourth embodiment, if it is necessary to perform the retransmission, it is featured to immediately perform the retransmission using the mapping table information in the sixth buffer having been pre-generated and stored without the necessity of regenerating the RLC headers and MAC sub-headers.

Accordingly, even if it is necessary to perform the retransmission of several hundreds of RLC PDUs in the next-generation mobile communication system, the terminal can rapidly retransmit the RLC PDUs data-preprocessed and stored in the sixth buffer using the mapping table information without the necessity of newly configuring several hundreds of RLC headers and MAC sub-headers. If a segmentation operation is necessary for each logical channel, it is enough to update only one RLC header and one MAC header corresponding to the last MAC SDU, and thus the transmission delay is greatly reduced.

The operations of the fifth buffer and the sixth buffer are as follows.

If IP packets are received from an upper layer, the PDCP layer may store the respective IP packets in the fifth buffer 1605 through allocation of memory addresses to the IP packets. Further, the PDCP layer may drive and manage a PDCP discard timer for each IP packet. A timer value may be configured by a network. For example, when the terminal configures an RRC connection, the timer value may be configured by the network through an RRC message. If the timer expires, the terminal discards the PDCP PDU or the PDCP SDU corresponding to the timer from the fifth buffer. If the PDCP PDU corresponding to the timer is transmitted to the RLC layer, the PDCP layer transmits a discard indicator corresponding to the PDCP PDU to the RLC layer. The discard indicator may indicate a PDCP PDU serial number transmitted to the RLC layer or mapping information on the PDCP PDU.

Further, if ACK/NACK information on the PDCP PDUs is received from the PDCP layer of the receiving end through a PDCP status report, the PDCP layer may discard the acknowledged PDCP PDUs from the fifth buffer. Further, if an unexpired timer corresponding to the discarded PDCP PDUs exists, it may stop and discard the timer. Further, the PDCP layer may receive from the RLC layer information on the PDCP PDUs corresponding to the RLC PDUs having received the RLC ACK. Since the PDCP PDUs mean that they have been successfully transferred to the receiving end, it is not necessary to store them in the fifth buffer any more. Accordingly, the corresponding information and mapping table information may be discarded, and if there exists an unexpired timer, the timer may also be stopped and discarded. In case of managing the fifth buffer based on the RLC ACK, it is significant to differently manage the fifth buffer in accordance with the PDCP layer operation of the terminal during a handover.

As a first case, the terminal may perform the PDCP layer operation with a network configuration in which the PDCP layer should retransmit the PDCP PDUs to a target base station of the handover again after the lowest PDCP serial number successfully transferred in order up to now during the handover. In this case, if information on the PDCP PDUs corresponding to the RLC PDUs having received the RLC ACK is received, the PDCP layer should store the lowest PDCP serial number having received all the ACKs in the order of PDCP serial numbers. Further, with respect to the PDCP serial numbers that are higher than the lowest PDCP serial number, the PDCP layer should not discard them even if the RLC layer has received the RLC ACK. That is, the PDCP PDUs of which the successful transfer has been identified based on the RLC ACK can be discarded only in the order of their PDCP serial numbers. For example, even if it is identified that PDCP serial numbers 1, 2, 3, 4, 5, 9, and 10 have been successfully transferred from the RLC ACK of the RLC layer, only the PDCP serial numbers 1, 2, 3, 4, and 5 can be discarded from the fifth buffer together with information related to the corresponding PDCP PDUs and mapping information.

As a second case, the terminal may perform the PDCP layer operation with a network configuration in which the PDCP layer should selectively retransmit the PDCP PDUs having not been successfully transferred up to now to the target base station of the handover. In this case, if information on the PDCP PDUs concatenated to the RLC PDUs having received the RLC ACK is received, the PDCP layer may discard the information corresponding to the PDCP PDUs and the mapping information from the fifth buffer, and may separately store the information on the PDCP serial numbers having received the ACK in order to use the information during the handover.

If the discard indicator is received from the PDCP layer, the RLC layer may discard the corresponding information in a state where the PDCP PDU corresponding to the discard indicator has not yet become a part of the RLC PDU, data preprocessing has not been performed with the MAC SDUs and the MAC sub-header, or the PDCP PDU has not been mapped thereon. For example, the RLC layer discards information related to the PDCP PDU (RLC SDU) transferred to and stored in the RLC layer and mapping information. If the PDCP PDU indicated by the discard indicator has already become the part of the RLC PDU, the RLC layer does not discard the information related to the PDCP PDU in case where the data preprocessing has been performed with the MAC SDUs and the MAC sub-header. This is because if the PDCP PDU that has already become the part of the RLC PDU is discarded, a gap occurs in the RLC serial number to cause a transmission delay.

The receiving end is unable to discriminate whether the corresponding RLC serial number is lost in the transmission process or is discarded by the discard indicator in the transmitting end. If the RLC status report is received from the RLC layer of the receiving end, the RLC layer may identify the ACK/NACK result for each RLC serial number. Further, in case of the acknowledged RLC PDU, the RLC layer may discard the mapping table 1650 related to this. The RLC layer transfers information on the PDCP PDU corresponding to the acknowledged RLC PDU, and discards the corresponding MAC sub-header and MAC SDUs from the sixth buffer storing the acknowledged preprocessed RLC PDU.

In case of the negatively acknowledged RLC PDU, the RLC layer prepares retransmission thereof. If the uplink grant is sufficient in case where the retransmission is performed, the RLC layer may perform the retransmission with reference to the MAC sub-header and the MAC SDUs from the sixth buffer using mapping table information. Further, if the uplink grant is insufficient, the RLC layer may perform re-segmentation with respect to the MAC sub-header and the RLC SDU of the last one of the MAC SDUs in the sixth buffer, and may update and retransmit the RLC header and the MAC header.

The RLC layer may identify the result of the ACK/NACK for the RLC serial number through the RLC status report, identify mapping table information (1670), and determine the ACK/NACK result for the corresponding PDCP serial number. If the ACK for the PDCP serial number is identified, the RLC layer may transfer the ACK information for the PDCP serial number to the PDCP layer. The PDCP layer may identify the ACK information, record the ACK/NACK information for each PDCP serial number, and use the ACK information to discard the PDCP PDU of the fifth buffer. The ACK information for the PDCP serial numbers may be used during a handover. When a terminal handover occurs, the PDCP layer may perform retransmission to a target base station of the handover, starting from the PDCP serial number after the lowest PDCP serial number having received all the ACKs in the order of serial numbers. If the network supports a selective retransmission during the handover, the PDCP layer may retransmit only negatively acknowledged PDCP PDUs to the target base station of the handover.

In the fourth embodiment of an efficient buffer management method and a retransmission acceleration method suitable when a terminal of the next-generation mobile communication system operates in an RLC AM mode proposed in the disclosure, it is featured that the fifth buffer is not independently managed by the PDCP layer, but the fifth buffer and the sixth buffer are managed by reflecting the RLC ACK result of the RLC layer. Further, in a fourth embodiment of an efficient buffer management method and a retransmission acceleration method suitable when the terminal of the next-generation mobile communication system operates in an RLC UM mode, it is featured that the fifth buffer is not independently managed by the PDCP layer, but the fifth buffer and the sixth buffer are managed by reflecting whether to transmit the RLC PDU in the RLC layer.

If an RLC status report is received from the receiving end RLC device and an ACK for RLC PDUs is received in an RLC AM mode, it is not necessary for the RLC device to have information corresponding to the acknowledged RLC PDUs and mapping table information any further, and it is reasonable for the RLC device to discard them from the fifth buffer. Further, if the PDCP PDUs corresponding to the RLC PDUs having received the ACK exist in the fifth buffer, and data-preprocessed MAC SDUs and MAC sub-headers exist in the sixth buffer, such information is not to be used for retransmission, and thus it is not necessary for the RLC layer to have them any further even if a PDCP discard timer has not yet expired. Accordingly, in the fourth embodiment of the efficient buffer management method and the retransmission acceleration method suitable when the terminal of the next-generation mobile communication system according to the disclosure operates in the RLC AM mode, it is featured that the RLC layer discards information on the RLC PDUs having received the RLC ACK from the mapping table, notifies the PDCP layer of the PDCP PDUs corresponding to the RLC PDUs, discards the corresponding PDCP PDUs from the fifth buffer, discards the data-preprocessed MAC sub-header and the MAC SDUs from the sixth buffer, releases and discards the corresponding information and timer.

A fourth embodiment of an efficient buffer management method suitable when a terminal of a next-generation mobile communication system according to the disclosure having the structure as shown in FIG. 16 operates in an RLC UM mode is as follow.

When operating in the RLC UM mode, the terminal according to the disclosure has the structure as shown in FIG. 16, and operates in a similar manner to that as described above with reference to FIG. 16. However, different from the RLC AM mode, an ARQ function is not supported in the RLC UM mode, and thus retransmission is not performed. Further, an RLC status report is not performed. Accordingly, it is not necessary for the transmitting end to record already transmitted RLC PDUs or related information, and mapping table information for the retransmission. This is the greatest difference between the RLC UM mode and the RLC AM mode. That is, in case of completing the transmission, it is not necessary to store an RLC PDU through data preprocessing of a PDCP PDU, MAC SDU, and MAC sub-headers for the retransmission.

In the disclosure, a fourth embodiment of a method in which a terminal of a next-generation mobile communication system in an RLC UM mode efficiently manages buffers is as follows.

If IP packets are received from an upper layer, the PDCP layer may store the respective IP packets in the fifth buffer 1605 through allocation of memory addresses to the IP packets. Further, the PDCP layer may drive and manage a PDCP discard timer for each IP packet. A timer value may be configured by a network. For example, when the terminal configures an RRC connection, the timer value may be configured by the network through an RRC message. If the timer expires, the terminal discards the PDCP PDU or the PDCP SDU corresponding to the timer from the fifth buffer. If the PDCP PDU corresponding to the timer is transmitted to the RLC layer, the PDCP layer may transmit a discard indicator corresponding to the PDCP PDU to the RLC layer. The discard indicator may indicate a PDCP PDU serial number transmitted to the RLC layer or mapping information on the PDCP PDU. Further, if ACK/NACK information on the PDCP PDUs is received from the PDCP layer of the receiving end through a PDCP status report, the PDCP layer may discard the acknowledged PDCP PDUs from the fifth buffer. Further, if an unexpired timer corresponding to the discarded PDCP PDUs exists, the PDCP layer may stop and discard the timer.

If the discard indicator is received from the PDCP layer, the RLC layer may discard the corresponding information in a state where the PDCP PDU corresponding to the discard indicator has not yet become a part of the RLC PDU in the RLC layer or has not been mapped thereon. For example, the RLC layer discards information related to the PDCP PDU (RLC SDU) transferred to and stored in the RLC layer and mapping information. If the PDCP PDU indicated by the discard indicator has already become a part of the RLC PDU, the RLC layer does not discard the information related to the PDCP PDU indicated by the discard indicator. This is because if the PDCP PDU that has already become the part of the RLC PDU is discarded, a gap occurs in the RLC serial number to cause a transmission delay. The receiving end is unable to discriminate whether the corresponding RLC serial number is lost in the transmission process or is discarded by the discard indicator in the transmitting end.

The RLC layer may configure RLC PDUs through data preprocessing of the PDCP PDUs before receiving uplink grant, and complete and transfer the RLC PDUs to a MAC layer to store MAC sub-header and MAC SDUs in the sixth buffer. After completing and transferring the RLC PDUs to the MAC layer, the RLC layer discards information related to the RLC PDUs, mapping information, MAC sub-header, and MAC SDUs. In other words, in the RLC UM mode, the RLC layer transmits the RLC PDUs, and then discards them together with the related information, if any, without storing them. This is because the ARQ function is not supported in the RLC UM mode, and thus it is not necessary to record the information for the retransmission.

In the RLC UM mode, the ARQ function is not supported, and thus it is not necessary to store the corresponding information after the RLC PDUs are transmitted for the retransmission. Accordingly, after transmitting the RLC PDUs, the RLC layer does not store in the sixth buffer the corresponding RLC PDUs, MAC sub-header, MAC SDUs, and related mapping information, but discards the related information, if any. Further, once the RLC PDUs are transmitted, it is not necessary for the RLC layer to have the PDCP PDUs corresponding to the RLC PDUs any further even if the PDCP discard timer has not yet expired.

Accordingly, in the fourth embodiment of the efficient buffer management method suitable when the LTE system terminal according to the disclosure operates in the RLC UM mode, the RLC layer may not store the corresponding RLC PDUs, MAC sub-headers, and MAC SDUs in the sixth buffer and the mapping table after transmitting the RLC PDUs, but may discard the related information and mapping information, if any. Further, information on the PDCP PDUs corresponding to the RLC PDUs is sent to the PDCP layer, and the PDCP layer discards the information on the PDCP PDUs from the fifth buffer even if the PDCP timer has not expired.

Terminal data preprocessing and retransmission.

The embodiments of the disclosure as described above may apply a data preprocessing process to the next-generation mobile communication system. The data preprocessing process may be performed as large as the amount of data capable of being maximally transmitted in one TTI or once transmission. That is, the data preprocessing can be performed as much as the maximum allowable UL grant or the largest UL grant. Further, the time when the data preprocessing is performed may include one or more of the following cases.

1. The data preprocessing can be performed if the amount of the currently preprocessed data becomes smaller than the maximum allowable UL grant as described above.

2. The data preprocessing can be periodically performed based on a specific time.

3. The data preprocessing can be performed at a time when the MAC layer configures MAC PDUs using uplink grant and transfers data to the physical layer.

4. The data preprocessing can be performed after new data is transmitted.

5. Data reception can be performed if an indicator to perform the data preprocessing is received from a lower layer.

At one of the above-described time points, the terminal can perform the data preprocessing. Further, if necessary, the terminal can perform the data preprocessing in accordance with several time points as described above.

In case of an RLC control PDU dynamically generated in the RLC layer, for example, in case of generating an RLC status report (RLC status PDU), the terminal may first generate the RLC status report at a time when the data preprocessing is performed, and may perform the data preprocessing with respect to the RLC status report preferentially to other general RLC PDUs. Further, the terminal may also preferentially perform the data preprocessing with respect to RLC PDUs to be retransmitted.

That is, at the time when the above-described data preprocessing is performed, the terminal may perform the data preprocessing in the order of the RLC status report, the retransmitted data RLC PDU, and the data RLC PDU.

Terminal segmentation performing method.

In the above-described process, it is necessary to further specify the procedure for the terminal to perform the segmentation. That is, if the uplink grant is received in a state where the terminal stores the data-preprocessed MAC SDUs and MAC sub-headers for each logical channel, the terminal may perform a (LCP procedure in consideration of logical channel priority, priority bit rate (PBR), numerology, and TTI values, and may allocate the uplink grant for each logical channel. If an integer number of sums of the data-preprocessed MAC SDU and MAC sub-header units exceeds the uplink grant when the uplink grant is allocated for each logical channel, it may be necessary to perform the segmentation.

A first embodiment of the segmentation is as follows.

In the first embodiment, the RLC layer may store the RLC PDUs transferred to the MAC layer for the segmentation. The MAC layer may compare the uplink grant allocated for each logical channel with the integer number of sums of the data-preprocessed MAC SDU and MAC sub-header units, and if the uplink grant is insufficient, the MAC layer may transfer to the RLC layer information on the RLC serial number corresponding to the last MAC SDU (RLC PDU).

The RLC layer may perform the segmentation with respect to the RLC PDU corresponding to the transferred RLC serial number, and may transfer the segmented RLC PDU segments to the MAC layer.

The MAC layer may configure MAC sub-headers with respect to the transferred RLC PDU segments, and may perform data multiplexing or concatenation to match the uplink grant. The RLC layer may perform the data preprocessing and the segmentation in accordance with the uplink grant, and in this case, the RLC layer perform the segmentation to match the size of the uplink grant allocated for each logical channel in consideration of the size of the RLC header considering added fields, such as a segmentation offset (SO) field, that may be added to the RLC header, and the size of the MAC sub-header to be updated later.

A second embodiment of the segmentation is as follows.

In the second embodiment, the RLC layer may not store the RLC PDUs transferred to the MAC layer for the segmentation. The MAC layer may compare the uplink grant allocated for each logical channel with the integer number of sums of the data-preprocessed MAC SDU and MAC sub-header units, and if the uplink grant is insufficient, the MAC layer may transfer to the RLC layer information on the RLC serial number corresponding to the last MAC SDU (RLC PDU). The RLC layer may dynamically regenerate the RLC PDU corresponding to the transferred RLC serial number based on the PDCP PDUs using the mapping table information, perform the segmentation with respect to the generated RLC PDU, and transfer the segmented RLC PDU segments to the MAC layer. The MAC layer may configure MAC sub-headers with respect to the transferred RLC PDU segments, and may perform data multiplexing or concatenation to match the uplink grant. The RLC layer may perform the data preprocessing and the segmentation in accordance with the uplink grant, and in this case, the RLC layer perform the segmentation to match the size of the uplink grant allocated for each logical channel in consideration of the size of the RLC header considering added fields, such as a SO field, that may be added to the RLC header, and the size of the MAC sub-header to be updated later.

A third embodiment of the segmentation is as follows.

In the third embodiment, the RLC layer may not store the RLC PDUs transferred to the MAC layer for the segmentation. The MAC layer may compare the uplink grant allocated for each logical channel with the integer number of sums of the data-preprocessed MAC SDU and MAC sub-header units, and if the uplink grant is insufficient, the MAC layer may transfer the last MAC SDU (RLC PDU) to the RLC layer. Then, the RLC layer may perform the segmentation with respect to the transferred RLC PDU, and may transfer the segmented RLC PDU segments to the MAC layer. The MAC layer may configure MAC sub-headers with respect to the transferred RLC PDU segments, and may perform data multiplexing or concatenation to match the uplink grant. The RLC layer may perform the data preprocessing and the segmentation in accordance with the uplink grant, and in this case, the RLC layer perform the segmentation to match the size of the uplink grant allocated for each logical channel in consideration of the size of the RLC header considering added fields, such as a SO field, that may be added to the RLC header, and the size of the MAC sub-header to be updated later.

A fourth embodiment of the segmentation is as follows.

In the fourth embodiment, the RLC layer may not store the RLC PDUs transferred to the MAC layer for the segmentation. The MAC layer may compare the uplink grant allocated for each logical channel with the integer number of sums of the data-preprocessed MAC SDU and MAC sub-header units, and if the uplink grant is insufficient, the MAC layer may transfer mapping information (e.g., memory address) for the last MAC SDU (RLC PDU) to the RLC layer using a mapping table. Then, the RLC layer may bring the stored RLC PDU using the mapping information, perform the segmentation with respect to the RLC PDU, and may transfer the segmented RLC PDU segments to the MAC layer. The MAC layer may configure MAC sub-headers with respect to the transferred RLC PDU segments, and may perform data multiplexing or concatenation to match the uplink grant.

The RLC layer may perform the data preprocessing and the segmentation in accordance with the uplink grant, and in this case, the RLC layer perform the segmentation to match the size of the uplink grant allocated for each logical channel in consideration of the size of the RLC header considering added fields, such as a SO field, that may be added to the RLC header, and the size of the MAC sub-header to be updated later.

A fifth embodiment of the segmentation is as follows.

In the fifth embodiment, the RLC layer may not store the RLC PDUs transferred to the MAC layer for the segmentation. The MAC layer may compare the uplink grant allocated for each logical channel with the integer number of sums of the data-preprocessed MAC SDU and MAC sub-header units, and if the uplink grant is insufficient, the MAC layer may transfer mapping information (e.g., memory address) for the last MAC SDU (RLC PDU) to the RLC layer using a mapping table. Then, the RLC layer may regenerate the RLC PDU based on the PDCP PDUs using the transferred mapping information, perform the segmentation with respect to the RLC PDU, and may transfer the segmented RLC PDU segments to the MAC layer. The MAC layer may configure MAC sub-headers with respect to the transferred RLC PDU segments, and may perform data multiplexing or concatenation to match the uplink grant.

The RLC layer may perform the data preprocessing and the segmentation in accordance with the uplink grant, and in this case, the RLC layer perform the segmentation to match the size of the uplink grant allocated for each logical channel in consideration of the size of the RLC header considering added fields, such as a SO field, that may be added to the RLC header, and the size of the MAC sub-header to be updated later.

Terminal data preprocessing performing method for multi-connectivity.

In order to perform data preprocessing in a multi-connectivity or dual-connectivity environment, the terminal should be able to predetermine whether a master cell group or a secondary cell group is to transmit data of a PDCP layer. That is, since it is required to allocate an RLC serial number in the data preprocessing process, it should be predetermined what cell group is to perform the transmission in order to perform the data preprocessing. In the dual-connectivity environment, methods for pre-allocating the PDCP layer data to the master cell group and the secondary cell group are as follows.

Figure 21:
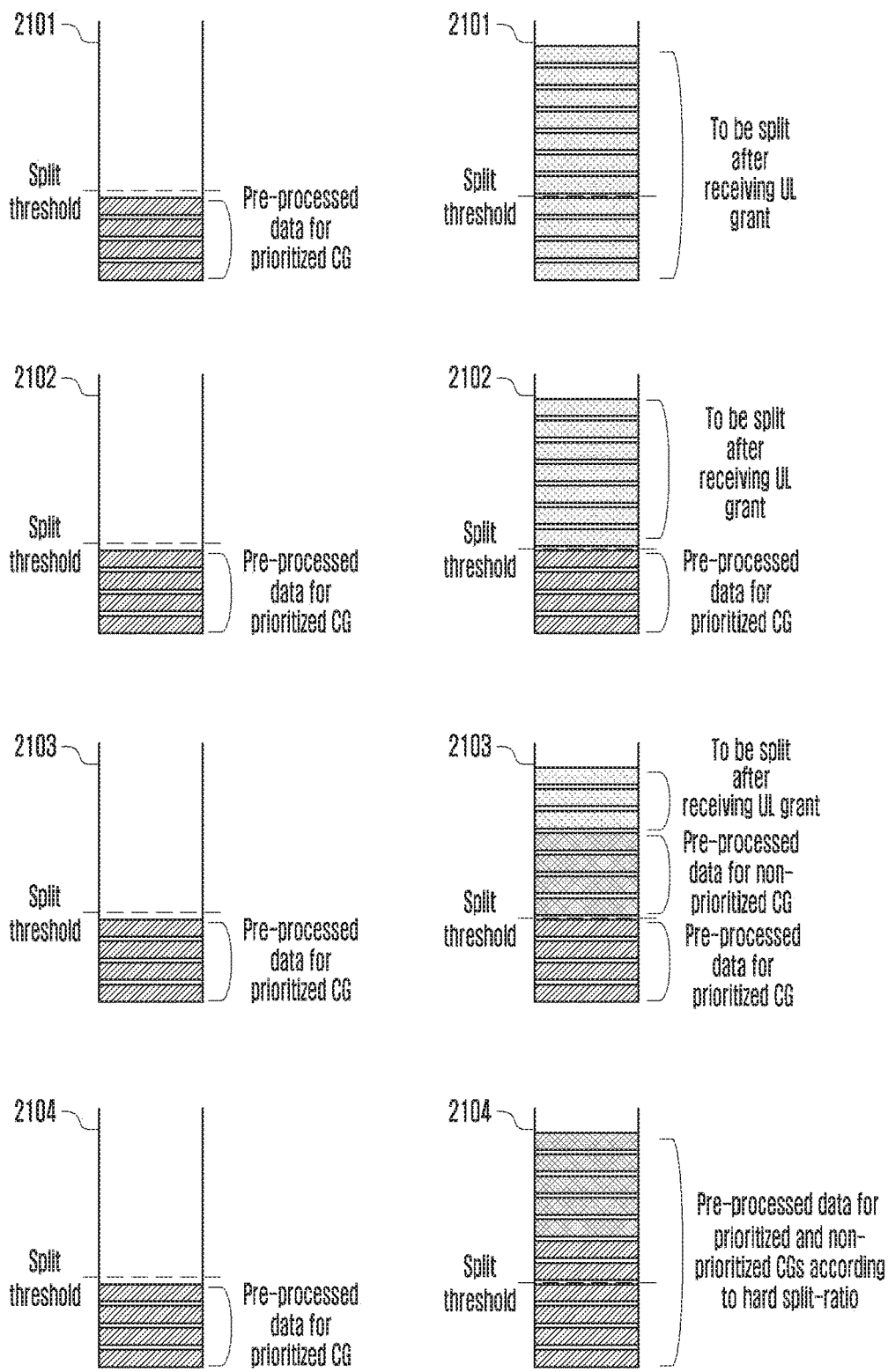
FIG. 21 is a diagram illustrating a method for preprocessing data of a multi-connection terminal according to an embodiment of the disclosure.

FIG. 21 is a diagram illustrating a method for preprocessing data of a multi-connection terminal according to an embodiment of the disclosure.

1. First allocation method at operation 2101: If the amount of data of the PDCP layer is smaller than a predetermined threshold value, the terminal does not pre-allocate the data of the PDCP layer to a master cell group and a secondary cell group. The data within the threshold value is preprocessed only in the master cell group (or secondary cell group).

Further, if the amount of data of the PDCP layer becomes larger than the threshold value, the terminal does not perform the data preprocessing with respect to the data of which the amount is larger than the threshold value, but performs buffer status report to the master cell group and the secondary cell group with respect to the current amount of data of the PDCP layer. Further, if the uplink grant is received with respect to each cell group, the terminal may allocate the PDCP layer data to the master cell group and the secondary cell group in accordance with the uplink grant, and may perform data preprocessing to transmit the data. The threshold value may be allocated as a value capable of indicating a low data rate or small data, and may be configured when the network (or base station) performs RRC connection configuration.

2. The (1-1)-th allocation method at operation 2102: If the amount of data of the PDCP layer is smaller than a predetermined threshold value, the terminal does not pre-allocate the data of the PDCP layer to a master cell group and a secondary cell group. The data within the threshold value is preprocessed only in the master cell group (or secondary cell group). Further, if the amount of data of the PDCP layer becomes larger than the threshold value, the terminal may preprocess data as much as the threshold value only with respect to the master cell group, and may perform buffer status report to the master cell group and the secondary cell group with respect to the data exceeding the threshold value. Further, if the uplink grant is received with respect to each cell group, the terminal may allocate the PDCP layer data to the master cell group and the secondary cell group in accordance with the uplink grant, and may perform data preprocessing to transmit the data. The threshold value may be allocated as a value capable of indicating a low data rate or small data, and may be configured when the network (or base station) performs RRC connection configuration.

3. The (1-2)-th allocation method at operation 2103: If the amount of data of the PDCP layer is smaller than a predetermined threshold value, the terminal does not pre-allocate the data of the PDCP layer to a master cell group and a secondary cell group. The data within the threshold value is preprocessed only in the master cell group (or secondary cell group). Further, if the amount of data of the PDCP layer becomes larger than the threshold value, the terminal may preprocess data as much as the threshold value with respect to the master cell group, and may preprocess data exceeding the threshold value with respect to the secondary cell group as much as the size of the uplink grant that can be maximally allocated of the secondary cell group. Further, with respect to the remaining data, the terminal may perform buffer status report, and if the uplink grant is received with respect to each cell group, the terminal may allocate the PDCP layer data to the master cell group and the secondary cell group in accordance with the uplink grant, and may perform data preprocessing to transmit the data. The threshold value may be allocated as a value capable of indicating a low data rate or small data, and may be configured when the network (or base station) performs RRC connection configuration.

4. Second allocation method at operation 2104: If the amount of data of the PDCP layer is smaller than a predetermined threshold value, the terminal does not pre-allocate the data of the PDCP layer to a master cell group and a secondary cell group. The data within the threshold value is preprocessed only in the master cell group (or secondary cell group). Further, if the amount of data of the PDCP layer becomes larger than the threshold value, the terminal may pre-allocate the current overall data of the PDCP layer to the master cell group and the secondary cell group in accordance with a specific split ratio configured by the network or base station (or with respect to the data as much as the threshold value, data preprocessing is performed for the master cell group, and with respect to the data exceeding the threshold value, data preprocessing is performed after the data is pre-allocated to the master cell group and the secondary cell group in accordance with the specific split ratio). Further, with respect to the pre-allocated data, the terminal may perform the data preprocessing for the respective cell groups before the respective cell groups are allocated with the uplink grant. The threshold value may be configured as a value capable of indicating a low data rate or small data, when RRC connection configuration is performed by the network (or base station), and the specific ratio may be configured when the network (or base station) performs the RRC connection configuration in consideration of the network and base station resource situations.

In the disclosure, the terminal in the dual-connectivity environment can perform the data preprocessing by applying one of four methods as described above.

A procedure in which the PDCP layer of the terminal determines the amount of data based on the threshold value and pre-allocates data to the master cell group and the secondary cell group may start at one or plural time points described as follows.

1. When it is intended to perform the data preprocessing in a state where the amount of the currently preprocessed data becomes smaller than the amount of uplink grant capable of being maximally allocated 2. Periodically based on a constant time 3. At a time when the MAC layer configures the MAC PDU using the uplink grant and transfers data to the physical layer 4. After transmitting new data 5. When an indicator for performing the data preprocessing is received from the lower layer and it is intended to perform the data preprocessing 6. Whenever new data is received in the PDCP layer 7. When an indicator to perform data allocation to the master cell group and the secondary cell group is received from the lower layer 8. When the amount of data becomes larger than a specific threshold value in the PDCP layer Whenever the amount of data of the PDCP layer is compared with the threshold value, the amount of data of the PDCP layer may be calculated by the following methods.

1. First calculation method: This method calculates the size of the overall data corresponding to the sum of the data amount of the PDCP data layer that is not transmitted and is not preprocessed, the data amount that is not transmitted and is preprocessed in the master cell group, and the data amount that is not transmitted and is preprocessed in the secondary cell group, and compares the calculated value with the threshold value.

2. Second calculation method: This method calculates the size of the data amount of the PDCP data layer that is not transmitted and is not preprocessed, and compares the calculated value with the threshold value.

3. Third calculation method: This method calculates the size of the data amount that is not transmitted and is newly received excluding the data calculated when being compared with the previous threshold value, and compares the calculated value with the threshold value.

4. Fourth calculation method: This method calculates the size of the overall data corresponding to the sum of the data amount that is not transmitted and is preprocessed in the master cell group and the data amount that is not transmitted and is preprocessed in the secondary cell group, and compares the calculated value with the threshold value.

Using one of the four methods as described above, the size of the data of the PDCP layer to be compared with the threshold value through the terminal in the dual-connectivity environment can be calculated.

The terminal in the dual-connectivity environment may make it a rule to allocate the successive PDCP serial numbers so that the respective cell groups maximally have them when the data of the PDCP layer is pre-allocated to the master cell group and the secondary cell group. If the PDCP serial numbers are not split to the respective cell groups, but are allocated to the groups of the successive PDCP serial numbers, the processing time and burden occurring when the PDCP layer of the receiving side realigns the order of the PDCP serial numbers can be reduced.

In the method for performing data preprocessing of the terminal in the dual-connectivity environment, the data preprocessing can be performed by applying the method for performing data preprocessing of the terminal in a single-connectivity environment to each cell group. That is, when performing the data preprocessing in the respective cell groups, the terminal can perform the data preprocessing as much as the maximum transport block size, the maximum allowable UL grant, or the size of the data maximally transmittable in one TTI. That is, although the data preprocessing is performed as much as the above-described size, it is possible to obtain the maximum data preprocessing gain for the next data transmission.

In the method for performing the data preprocessing of the terminal in the dual-connectivity environment, the threshold value or the specific split ratio can be configured from the base station to the terminal through an RRC message (RRCConnectionSetup or RRCConnectionReconfiguration), or may be dynamically reconfigured through the RRC message (RRCConnectionReconfiguration). Further, in order to dynamically allocate the threshold value or the specific split ratio, the threshold value or the specific split ratio may be updated using a newly defined PDCP control PDU.

In the method for performing the data preprocessing of the terminal in the dual-connectivity environment, it is necessary for the base station to configure the threshold value so that the threshold value becomes larger than the maximum transport block size of the master cell group, the maximum allowable UL grant, or the data size maximally transmittable in one TTI. This is because it becomes possible to obtain the maximum data preprocessing gain for the next data transmission by configuring the threshold value so that it becomes larger than the maximum transport block size, the maximum allowable UL grant, or the data size maximally transmittable in one TTI.

In the dual-connectivity environment as described above, the terminal may configure the data of the PDCP layer to transmit them to different cell groups through packet duplication, and this configuration may be activated or inactivated by the RRC message or the newly defined PDCP control PDU.

Figure 17A:
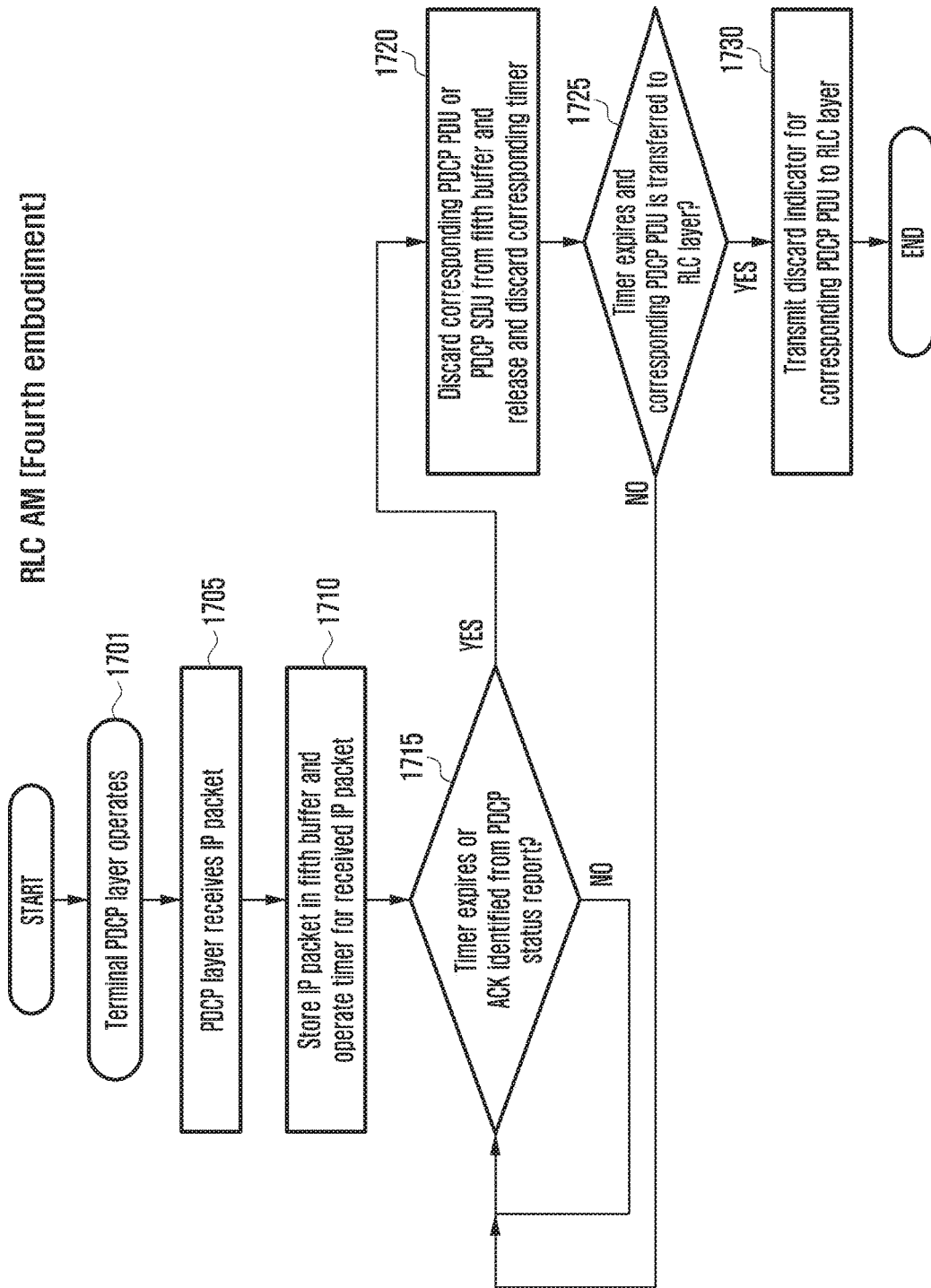
FIGS. 17A and 17B are diagrams illustrating operation of a terminal in which a next-generation mobile communication system terminal manages buffers in an RLC AM mode according to an embodiment of the disclosure.
Figure 17B:
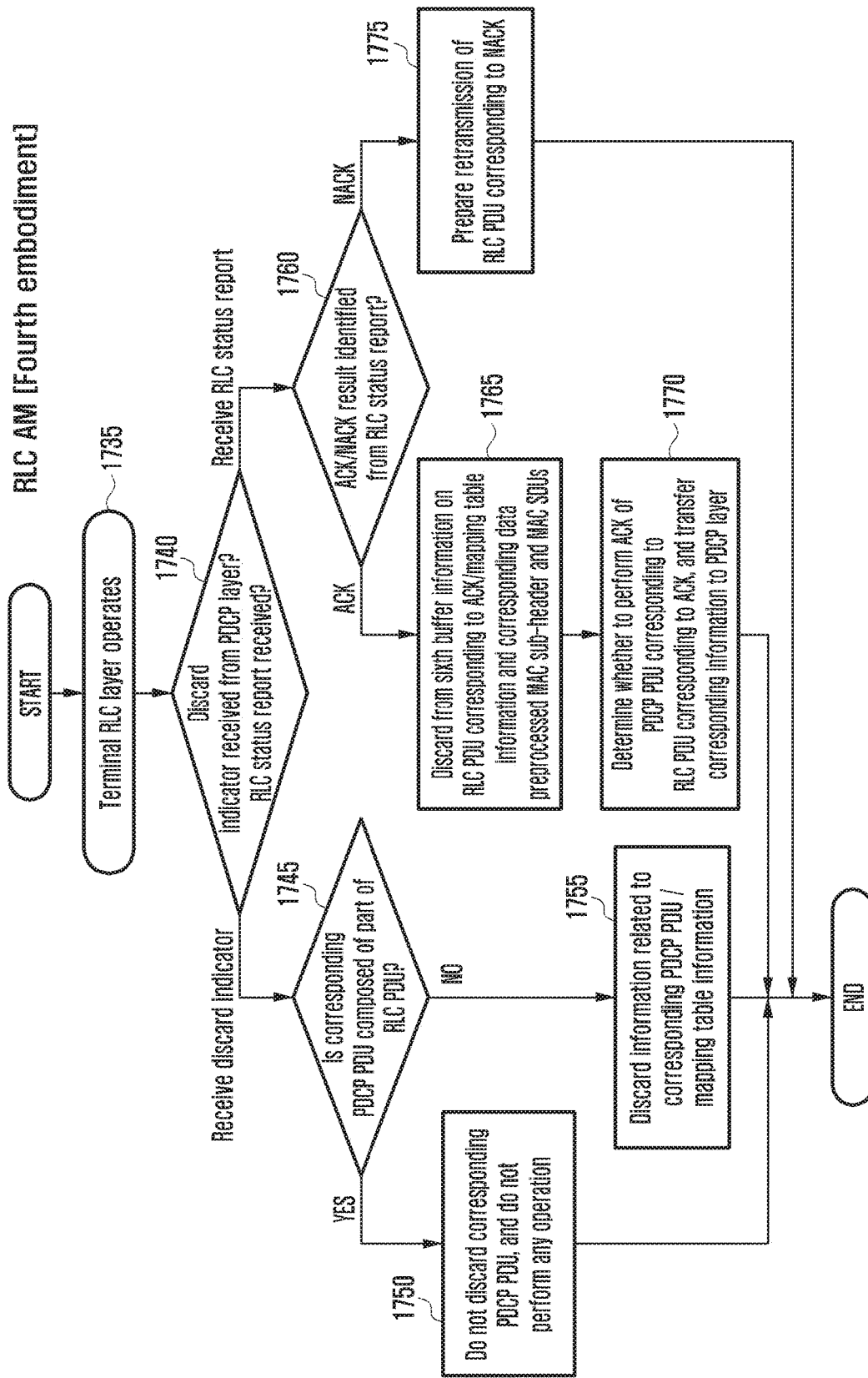

FIGS. 17A and 17B are diagrams illustrating operation of a terminal in which a next-generation mobile communication system terminal manages buffers in an RLC AM mode according to an embodiment of the disclosure.

Referring to FIG. 17A, if IP packets are received from an upper layer, a terminal PDCP layer may operate at operation 1701, the terminal PDCP layer may receive an IP packet at operation 1705, and may store the respective IP packets in a fifth buffer through allocation of memory addresses to the IP packets at operation 1710. Further, the terminal PDCP layer may drive and manage a PDCP discard timer for each IP packet at operation 1715. If the timer expires, the terminal discards a PDCP PDU or a PDCP SDU corresponding to the timer from the fifth buffer at operation 1720. If the PDCP PDU corresponding to the timer is transmitted to an RLC layer at operation 1725, the PDCP layer may transmit a discard indicator corresponding to the PDCP PDU to the RLC layer at operation 1730. The discard indicator may indicate the PDCP PDU serial number transmitted to the RLC layer, or mapping information on the PDCP PDU. Further, if ACK/NACK information on the PDCP PDUs is received from the PDCP layer of the receiving end through a PDCP status report, the PDCP layer may discard the acknowledged PDCP PDUs from the fifth buffer. Further, if there exists an unexpired timer corresponding to the discarded PDCP PDUs, the PDCP layer may stop and discard the timer at operation 1720.

Further, the PDCP layer may receive from the RLC layer information on the PDCP PDUs concatenated to the RLC PDUs having received the RLC ACK. Since the PDCP PDUs mean that they have been successfully transferred to the receiving end, it is not necessary to store them in the fifth buffer any more, and the PDCP layer may discard them. The PDCP layer discards information corresponding to the discarded PDCP PDU and mapping table information, and if there exists an unexpired timer, the PDCP layer may stop and discard the timer at operation 1720. In case of managing the fifth buffer based on the RLC ACK, it is significant to differently manage the fifth buffer in accordance with the PDCP layer operation of the terminal during a handover.

As a first case, the terminal may perform the PDCP layer operation with a network configuration in which the PDCP layer should retransmit the PDCP PDUs to a target base station of the handover again after the lowest PDCP serial number successfully transferred in order up to now during the handover. In this case, if information on the PDCP PDUs concatenated to the RLC PDUs having received the RLC ACK is received, the PDCP layer should store the lowest PDCP serial number having received all the ACKs in the order of PDCP serial numbers. Further, with respect to the PDCP serial numbers that are higher than the lowest PDCP serial number, the PDCP layer should not discard them even if the RLC layer has received the RLC ACK. That is, the PDCP PDUs of which the successful transfer has been identified based on the RLC ACK can be discarded only in the order of their PDCP serial numbers. For example, even if it is identified that PDCP serial numbers 1, 2, 3, 4, 5, 9, and 10 have been successfully transferred from the RLC ACK of the RLC layer, only the PDCP serial numbers 1, 2, 3, 4, and 5 can be discarded from the fifth buffer together with information related to the corresponding PDCP PDUs and mapping information.

As a second case, the terminal may perform the PDCP layer operation with a network configuration in which the PDCP layer should selectively retransmit the PDCP PDUs having not been successfully transferred up to now to the target base station of the handover. In this case, if information on the PDCP PDUs concatenated to the RLC PDUs having received the RLC ACK is received, the PDCP layer may discard the information corresponding to the PDCP PDUs and the mapping information from the fifth buffer, and may separately store the information on the PDCP serial numbers having received the ACK in order to use the information during the handover.

Referring to FIG. 17B, a terminal RLC layer operates at operation 1735. If the discard indicator is received from the PDCP layer at operation 1740, a terminal RLC layer may discard the corresponding information at operation 1755 when the PDCP PDU corresponding to the discard indicator has not yet become a part of the RLC PDU in the RLC layer or has not been mapped thereon at operation 1745. That is, the terminal RLC layer discards information related to PDCP PDU (RLC SDU) transferred to and stored in the RLC layer and mapping information. If the PDCP PDU indicated by the discard indicator has already become the part of the RLC PDU at operation 1745, the terminal RLC layer does not discard the information related to the PDCP PDU at operation 1750.

If the RLC status report is received from the RLC layer of the receiving end at operation 1740, the RLC layer may identify the ACK/NACK result for each RLC serial number. Further, in case of the acknowledged RLC PDU at operation 1760, the RLC layer discards from the six buffer the mapping information related to the acknowledged RLC PDU, the MAC sub-headers and MAC SDUs in which the RLC PDU/PDCP PDU are preprocessed and stored at operation 1765. In contrast, with respect to the negatively acknowledged RLC PDU, the RLC layer prepares retransmission at operation 1775.

If the uplink grant for the retransmission is sufficient during performing of the retransmission, the RLC layer may rapidly perform the retransmission using the MAC sub-headers and MAC SDUs data-preprocessed by the sixth buffer based on the mapping information for the RLC PDU. In contrast, if the uplink grant is insufficient, the RLC layer may perform re-segmentation to update the RLC headers and MAC sub-headers for the last MAC sub-header and MAC SDU, and may perform the retransmission. The RLC layer may identify the result of the ACK/NACK for the RLC serial number through the RLC status report, identify mapping table information at operation 1770, and determine the ACK/NACK result for the corresponding PDCP serial number. If the ACK for the PDCP serial number is identified, the RLC layer may transfer the ACK information for the PDCP serial number to the PDCP layer. The PDCP layer may identify the ACK information, and may use the ACK information to discard the corresponding PDCP PDUs from the fifth buffer.

Accordingly, in the fourth embodiment of the efficient buffer management method and the retransmission acceleration method suitable when the terminal of the next-generation mobile communication system operates in the RLC AM mode according to the disclosure, the RLC layer may discard from the fifth buffer information on the RLC PDUs having received the RLC ACK and mapping table information/the data-preprocessed MAC sub-headers and MAC SDUs, and the PDCP PDUs corresponding to the RLC PDUs of which the RLC layer has notified the PDCP layer, and release and discard the corresponding information and the timer. Accordingly, the buffer can be efficiently managed even with a small size so as to rapidly empty the fifth and sixth buffers, and thus efficiency can be maximized and the retransmission can be accelerated.

FIGS. 18A and 18B are diagrams illustrating operation of a terminal in which a next-generation mobile communication system terminal manages buffers in an RLC UM mode according to an embodiment of the disclosure.

Referring to FIG. 18A, if IP packets are received from an upper layer, a terminal PDCP layer may operation at operation 1801, the terminal PDCP layer may receive an IP packet at operation 1805, and may store the respective IP packets in a fifth buffer through allocation of memory addresses to the IP packets at operation 1810. Further, the terminal PDCP layer may drive and manage a PDCP discard timer for each IP packet at operation 1815. If the timer expires, the terminal discards a PDCP PDU or a PDCP SDU corresponding to the timer from the fourth buffer at operation 1820. If the PDCP PDU corresponding to the timer is transmitted to an RLC layer at operation 1825, the PDCP layer may transmit a discard indicator corresponding to the PDCP PDU to the RLC layer at operation 1830. The discard indicator may indicate a PDCP PDU serial number transmitted to the RLC layer or mapping information on the PDCP PDU. Further, if ACK/NACK information on the PDCP PDUs is received from the PDCP layer of the receiving end through a PDCP status report, the PDCP layer may discard the acknowledged PDCP PDUs from the fifth buffer, and if there exists an unexpired timer corresponding to the discarded PDCP PDUs, the PDCP layer may stop and discard the timer at operation 1820. Further, if the RLC PDU is transmitted from the RLC layer and the RLC layer transfers to the PDCP layer information on the PDCP PDUs concatenated to the transmitted RLC PDUs, the PDCP layer may discard the information on the transmitted PDCP PDUs from the fifth buffer, and if the corresponding timer has not expired, the PDCP layer may release and discard the timer.

Referring to FIG. 18B, the terminal layer operates at operation 1835. If the discard indicator is received from the PDCP layer at operation 1840, a terminal RLC layer may discard the corresponding information in case where the PDCP PDU corresponding to the discard indicator has not yet become a part of the RLC PDU in the RLC layer or has not been mapped thereon at operation 1845. That is, the terminal RLC layer discards the information related to the PDCP PDU (RLC SDU) transferred to and stored in the RLC layer and mapping information at operation 1855. If the PDCP PDU indicated by the discard indicator has already become a part of the RLC PDU at operation 1845, the terminal RLC layer does not discard the information related to the PDCP PDU at operation 1850.

The RLC layer may configure RLC PDUs through data preprocessing of the PDCP PDUs before receiving the uplink grant, and may complete and transfer the RLC PDU to the MAC layer to store MAC sub-headers and MAC SDUs in the sixth buffer. Further, if the RLC PDU transmission is completed through reception of the uplink grant, the RLC layer discards information related to the RLC PDUs, mapping information, MAC sub-headers, and MAC SDUs (discarded from the sixth buffer) at operation 1860. In other words, in the RLC UM mode, the RLC layer transmits the RLC PDUs, and then discards the related information, if any, without storing the RLC PDUs. This is because the ARQ function is not supported in the RLC UM mode, and thus it is not necessary to record the information for the retransmission. Further, the RLC layer may determine and transfer to the PDCP layer information on the PDCP PDUs corresponding to the transmitted RLC PDUs, and may use the information to manage the fifth buffer at operation 1865.

Accordingly, in the fourth embodiment of the efficient buffer management method suitable when the terminal of the next-generation mobile communication system operates in the RLC UM mode, the RLC layer transmits the RLC PDUs, and then may discard related information and corresponding data-preprocessed MAC sub-headers and MAC SDUs, if any, in the sixth buffer, without storing the corresponding RLC PDUs. Further, in the fourth embodiment, the RLC layer may transmit to the PDCP layer information on the PDCP PDUs corresponding to the transmitted RLC PDUs, and the PDCP layer immediately discards the information on the PDCP PDUs from the fifth buffer even if the PDCP timer has not expired.

The first to fourth embodiments of the disclosure have proposed the buffer structure when the terminal transmits data and the retransmission acceleration method. In the disclosure, when the terminal receives data, the RLC layer may have a separate buffer for storing the RLC PDUs. The RLC PDUs can indicate only the segmented RLC PDU segments rather than the complete RLC PDU (non-segmented RLC PDU or RLC PDU that is not the segment). That is, if the RLC layer receives the complete RLC PDUs when the terminal receives data, it may directly transfer them to an upper layer without storing them, whereas if the RLC PDU segments are received, the RLC layer stores them in a separate buffer for reassembly, and if a specific condition is satisfied, it assembles the RLC PDU segments into one complete RLC PDU to transfer the complete RLC PDU to the upper layer. The RLC PDU segments having not been assembled into one complete RLC PDU may be all discarded. The specific condition may be a case where a timer for the reassembly has expired or a case where a window based on the RLC layer serial number moves to trigger the reassembly.

Figure 19:
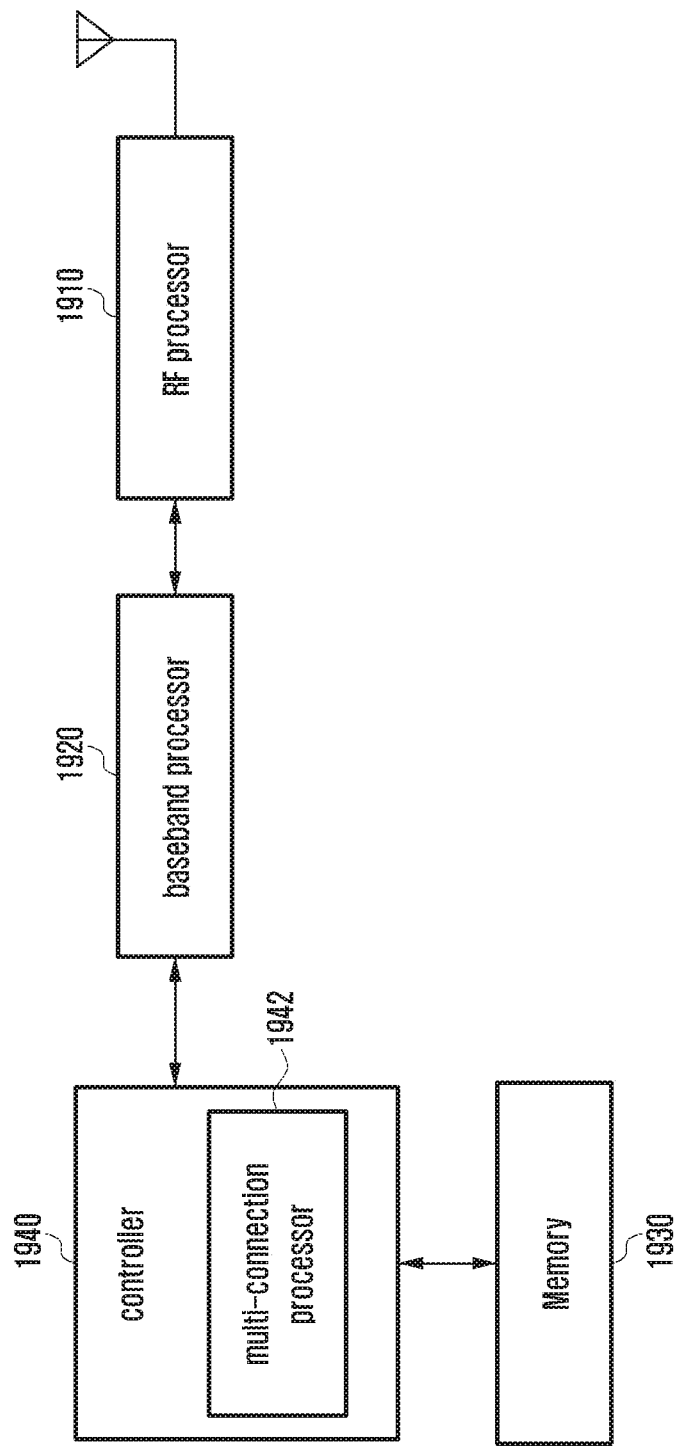
FIG. 19 is a block diagram of a terminal according to an embodiment of the disclosure.

FIG. 19 is a block diagram of a terminal according to an embodiment of the disclosure.

Referring to FIG. 19, the terminal includes a radio frequency (RF) processor 1910, a baseband processor 1920, a memory 1930, and a controller 1940.

The RF processor 1910 performs a function for transmitting and receiving a signal on a radio channel, such as signal band conversion and amplification. That is, the RF processor 1910 performs up-conversion of a baseband signal provided from the baseband processor 1920 into an RF-band signal to transmit the converted signal to an antenna, and performs down-conversion of the RF-band signal received through the antenna into a baseband signal. For example, the RF processor 1910 may include a transmission filter, a reception filter, an amplifier, a mixer, an oscillator, a digital-to-analog converter (DAC), and an analog-to-digital converter (ADC). Although only one antenna is illustrated in the drawing, the terminal may be provided with a plurality of antennas. Further, the RF processor 1910 may include a plurality of RF chains. Further, the RF processor 1910 may perform beamforming. For the beamforming, the RF processor 1910 may adjust phases and sizes of signals transmitted or received through the plurality of antennas or antenna elements. Further, the RF processor may perform MIMO, and may receive several layers during performing of a MIMO operation. The RF processor 1910 may perform reception beam sweeping through proper configuration of the plurality of antennas or antenna elements under the control of the controller, or may control the direction and the beam width of the reception beam so that the reception beam is synchronized with the transmission beam.

The baseband processor 1920 performs conversion between a baseband signal and a bit string in accordance with the physical layer standard of the system. For example, during data transmission, the baseband processor 1920 generates complex symbols by encoding and modulating a transmitted bit string. Further, during data reception, the baseband processor 1920 restores a received bit string by demodulating and decoding the baseband signal provided from the RF processor 1910. For example, in the case of following an OFDM method, during data transmission, the baseband processor 1920 generates complex symbols by encoding and modulating a transmitted bit string, performs mapping of the complex symbols on subcarriers, and then configures OFDM symbols through the inverse fast Fourier transform (IFFT) operation and cyclic prefix (CP) insertion. Further, during data reception, the baseband processor 1920 divides the baseband signal provided from the RF processor 1910 in the unit of OFDM symbols, restores the signals mapped on the subcarriers through the fast Fourier transform (FFT) operation, and then restores the received bit string through demodulation and decoding.

The baseband processor 1920 and the RF processor 1910 transmit and receive the signals as described above. Accordingly, the baseband processor 1920 and the RF processor 1910 may be called a transmitter, a receiver, a transceiver, or a transceiver. Further, in order to support different radio connection technologies, at least one of the baseband processor 1920 and the RF processor 1910 may include a plurality of communication modules. Further, in order to process signals of different frequency bands, at least one of the baseband processor 1920 and the RF processor 1910 may include different communication modules. For example, the different radio connection technologies may include an LTE network and an NR network. Further, the different frequency bands may include super high frequency (SHF) (e.g., 2.5 GHz or 5 GHz) band and millimeter wave (mmWave) (e.g., 60 GHz) band.

The memory 1930 stores therein a basic program for an operation of the terminal, application programs, and data of configuration information. The memory 1930 provides stored data in accordance with a request from the controller 1940.

The controller 1940 controls the whole operation of the terminal. For example, the controller 1940 transmits and receives signals through the baseband processor 1920 and the RF processor 1910. Further, the controller 1940 records or reads data in or from the memory 1930. For this, the controller 1940 may include at least one processor that executes instruction to implement a multi-connection processor 19 that executes instruction to implement a multi-connection processor 204242. For example, the controller 1940 may include a communication processor (CP) performing a control for communication and an application processor (AP) controlling an upper layer, such as an application program.

Figure 20:
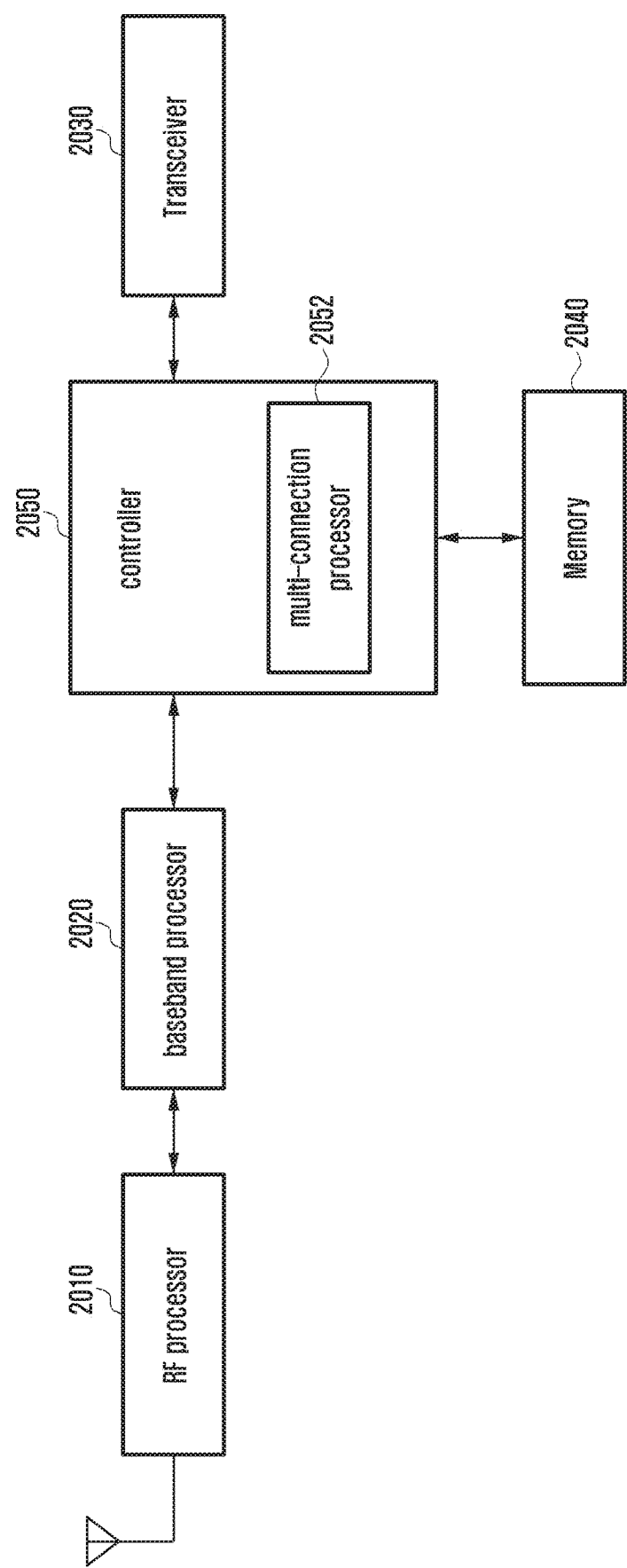
FIG. 20 is a block diagram of a transmission and reception point (TRP) in a wireless communication system according to an embodiment of the disclosure.

FIG. 20 is a block configuration of a transmission and reception point (TRP) according to an embodiment of the disclosure.

Referring to FIG. 20, the base station includes an RF processor 2010, a baseband processor 2020, a transceiver 2030, a memory 2040, and a controller 2050.

The RF processor 2010 performs a function for transmitting and receiving a signal on a radio channel, such as signal band conversion and amplification. That is, the RF processor 2010 performs up-conversion of a baseband signal provided from the baseband processor 2020 into an RF-band signal to transmit the converted signal to an antenna, and performs down-conversion of the RF-band signal received through the antenna into a baseband signal. For example, the RF processor 2010 may include a transmission filter, a reception filter, an amplifier, a mixer, an oscillator, a DAC, and an ADC. Although only one antenna is illustrated in the drawing, the first connection node may be provided with a plurality of antennas. Further, the RF processor 2010 may include a plurality of RF chains. Further, the RF processor 2010 may perform beamforming. For the beamforming, the RF processor 2010 may adjust phases and sizes of signals transmitted or received through the plurality of antennas or antenna elements. Further, the RF processor may perform down MIMO operation through transmission of one or more layers.

The baseband processor 2020 performs conversion between a baseband signal and a bit string in accordance with the physical layer standard of the first radio connection technology. For example, during data transmission, the baseband processor 2020 generates complex symbols by encoding and modulating a transmitted bit string. Further, during data reception, the baseband processor 2020 restores a received bit string by demodulating and decoding the baseband signal provided from the RF processor 2010. For example, in the case of following an OFDM method, during data transmission, the baseband processor 2020 generates complex symbols by encoding and modulating a transmitted bit string, performs mapping of the complex symbols on subcarriers, and then configures OFDM symbols through the IFFT operation and CP insertion. Further, during data reception, the baseband processor 2020 divides the baseband signal provided from the RF processor 2010 in the unit of OFDM symbols, restores the signals mapped on the subcarriers through the FFT operation, and then restores the received bit string through demodulation and decoding. The baseband processor 2020 and the RF processor 2010 transmit and receive the signals as described above. Accordingly, the baseband processor 2020 and the RF processor 2010 may be called a transmitter, a receiver, a transceiver, a transceiver, or a wireless transceiver.

The transceiver 2030 provides an interface for performing communication with other nodes in the network.

The memory 2040 stores therein a basic program for an operation of the main base station, application programs, and data of configuration information. In particular, the memory 2040 may store information on a bearer allocated to the connected terminal and the measurement result reported from the connected terminal. Further, the memory 2040 may store information that becomes a basis of determination whether to provide or suspend a multi-connection to the terminal. Further, the memory 2040 provides stored data in accordance with a request from the controller 2050.

The controller 2050 controls the whole operation of the main base station. For example, the controller 2050 transmits and receives signals through the baseband processor 2020 and the RF processor 2010 or through the transceiver 2030. Further, the controller 2050 records or reads data in or from the memory 2040. For this, the controller 2050 may include at least one processor that executes instruction to implement a multi-connection processor 2052.

In the drawings explaining the method according to the disclosure, the order of explanations may not inevitably correspond to the order of executions, and the processes may be executed in a reverse order or in parallel.

Further, in the drawings explaining the method according to the disclosure, only parts of constituent elements may be included with omission of other parts of the constituent elements without departing from the subject matter of the disclosure.

Although preferred embodiments of the disclosure have been described in the specification and drawings and specific wordings have been used, these are merely used as general meanings to assist those of ordinary skill in the art to gain a comprehensive understanding of the disclosure, and do not limit the scope of the disclosure. It will be apparent to those of ordinary skill in the art to which the disclosure pertains that various modifications are possible based on the technical concept of the disclosure in addition to the embodiments disclosed herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method by an apparatus in a communication system, the method comprising:
   receiving, in a radio link control (RLC) layer associated with the apparatus, RLC packet data units (PDUs) for an RLC unacknowledged mode (UM) from a lower layer;
   identifying whether the received RLC PDUs are complete RLC PDUs that are non-segmented RLC PDUs;
   in case that the received RLC PDUs are the complete RLC PDUs, transmitting the complete RLC PDUs to an upper layer without storing the complete RLC PDUs in a buffer; and
   in case that the received RLC PDUs are non-complete RLC PDUs:
      storing the non-complete RLC PDUs in the buffer,
      in case that the non-complete RLC PDUs are reassembled into a complete RLC PDU, transmitting the complete RLC PDU to the upper layer, and
      discarding the non-complete RLC PDUs that are not reassembled and stored in the buffer based on a reassembly window in case that the reassembly window is updated based on an RLC PDU sequence number.

2. The method of claim 1, wherein the lower layer is a medium access control (MAC) layer and the upper layer is a packet data convergence protocol (PDCP) layer.

3. The method of claim 1, wherein discarding the non-complete PDUs further comprises discarding the non-complete RLC PDUs in case that a reassembly timer expires.

4. The method of claim 1,
   wherein the buffer is a first buffer, and
   wherein transmitting the complete RLC PDUs to the upper layer further comprises discarding a MAC subheader and a MAC service data unit (SDU), which correspond to the received RLC PDUs, stored in a second buffer.

5. The method of claim 1, wherein the complete RLC PDUs that are transmitted to the upper layer are reordered by the upper layer.

6. An apparatus in a communication system, the apparatus comprising:
   a transceiver; and
   a controller configured to:
      receive, in a radio link control (RLC) layer associated with the apparatus, RLC packet data units (PDUs) for an RLC unacknowledged mode (UM) from a lower layer,
      identify whether the received RLC PDUs are complete RLC PDUs that are non-segmented RLC PDUs,
      in case that the received RLC PDUs are the complete RLC PDUs, transmit the complete RLC PDUs to an upper layer without storing the complete RLC PDUs in a buffer, and
      in case that the received RLC PDUs are non-complete RLC PDUs:
         store the non-complete RLC PDUs in the buffer,
         in case that the non-complete RLC PDUs are reassembled into a complete RLC PDU, transmitting the complete RLC PDU to the upper layer, and discard the non-complete RLC PDUs that are not reassembled and stored in the buffer based on a reassembly window in case that the reassembly window is updated based on an RLC PDU sequence number.

7. The apparatus of claim 6, wherein the lower layer is a medium access control (MAC) layer and the upper layer is a packet data convergence protocol (PDCP) layer.

8. The apparatus of claim 6, wherein the controller is further configured to discard the non-complete RLC PDUs in case that a reassembly timer expires.

9. The apparatus of claim 6,
wherein the buffer is a first buffer, and
wherein the controller is further configured to discard a MAC subheader and a MAC service data unit (SDU), which correspond to the received RLC PDUs, stored in a second buffer.

10. The apparatus of claim 6, wherein the complete RLC PDUs that are transmitted to the upper layer are reordered by the upper layer.

* * * * *